US010700549B2

(12) United States Patent
Livadaras et al.

(10) Patent No.: US 10,700,549 B2
(45) Date of Patent: Jun. 30, 2020

(54) SYSTEM AND METHOD FOR MONITORING AND CONTROL OF APPLIANCES

(71) Applicant: CARBONTRACK PTY LTD, Hawthorn, Victoria (AU)

(72) Inventors: Spyridon Livadaras, Malvern (AU); Evan Neil Harridge, South Melbourne (AU); Shavaj Kallamkote, Ivanhoe (AU)

(73) Assignee: CARBONTRACK PTY LTD (AU)

( * ) Notice: Subject to any disclaimer, the term of this patent is extended or adjusted under 35 U.S.C. 154(b) by 285 days.

(21) Appl. No.: 14/767,871

(22) PCT Filed: Feb. 13, 2014

(86) PCT No.: PCT/AU2014/000119
§ 371 (c)(1),
(2) Date: Aug. 13, 2015

(87) PCT Pub. No.: WO2014/124490
PCT Pub. Date: Aug. 21, 2014

(65) Prior Publication Data
US 2015/0372539 A1 Dec. 24, 2015

Related U.S. Application Data

(60) Provisional application No. 61/764,352, filed on Feb. 13, 2013.

(51) Int. Cl.
*H02J 13/00* (2006.01)
*H04W 4/00* (2018.01)
(Continued)

(52) U.S. Cl.
CPC .............. *H02J 13/00* (2013.01); *G05B 15/02* (2013.01); *G06Q 10/06* (2013.01); *G06Q 50/06* (2013.01); *H02J 13/0079* (2013.01); *H04W 4/80* (2018.02)

(58) Field of Classification Search
CPC ...... H02J 13/00; H02J 13/0079; G05B 15/02; H04W 4/008; G06Q 10/06; G06Q 50/06
See application file for complete search history.

(56) References Cited

U.S. PATENT DOCUMENTS 8,255,090 B2* 8/2012 Frader-Thompson ....................... G01D 4/002 700/295
8,796,881 B2* 8/2014 Davis .................. B60L 11/1842 307/69

(Continued)

FOREIGN PATENT DOCUMENTS

WO WO 2006/096075 9/2006
WO WO 2009/097400 8/2009

*Primary Examiner* — Charles R Kasenge
(74) *Attorney, Agent, or Firm* — Thorpe North & Western

(57) ABSTRACT

A system for monitoring and control of at least one appliance. The system comprises a computer server system and an electronic interface device installed remotely from the computer server system and in wireless communication with the computer server system. The interface device is configured to monitor power consumption of the at least one appliance and to control supply of power to the at least one appliance. The interface device is further configured to periodically transmit monitored power usage data to the computer server system, to receive at least one of data and commands from the computer server system and to control power to the at least one appliance based on the received at least one of data and commands.

18 Claims, 32 Drawing Sheets

(51) Int. Cl.
  *G05B 15/02*  (2006.01)
  *H04W 4/80*  (2018.01)
  *G06Q 50/06*  (2012.01)
  *G06Q 10/06*  (2012.01)

(56) References Cited

U.S. PATENT DOCUMENTS

| | | | |
|---|---|---|---|
| 8,996,188 B2* | 3/2015 | Frader-Thompson | G01D 4/002 340/12.32 |
| 2009/0195349 A1* | 8/2009 | Frader-Thompson | G01D 4/002 340/3.1 |
| 2010/0082174 A1* | 4/2010 | Weaver | H02J 3/14 700/295 |
| 2010/0082499 A1* | 4/2010 | Luff | G06Q 10/04 705/317 |
| 2010/0174419 A1* | 7/2010 | Brumfield | G01R 22/10 700/295 |
| 2010/0274405 A1* | 10/2010 | Thomas | H02J 3/14 700/295 |
| 2010/0289643 A1 | 11/2010 | Trundle et al. | |
| 2011/0040785 A1* | 2/2011 | Steenberg | G05B 23/0235 707/769 |
| 2011/0251807 A1* | 10/2011 | Rada | G01D 4/00 702/61 |
| 2012/0161922 A1 | 6/2012 | Chiang et al. | |
| 2012/0166115 A1* | 6/2012 | Apostolakis | G06Q 50/06 702/62 |
| 2012/0179477 A1* | 7/2012 | Luff | G06Q 10/04 705/1.1 |
| 2012/0316808 A1* | 12/2012 | Frader-Thompson | G01D 4/002 702/61 |
| 2012/0319491 A1* | 12/2012 | Borras | H02J 3/06 307/80 |
| 2013/0282196 A1* | 10/2013 | Tappeiner | G05B 13/02 700/295 |
| 2016/0315783 A1* | 10/2016 | Tappeiner | G05B 13/02 |

* cited by examiner

1200

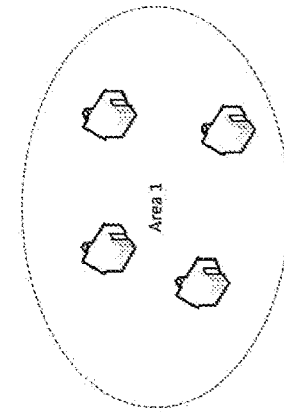
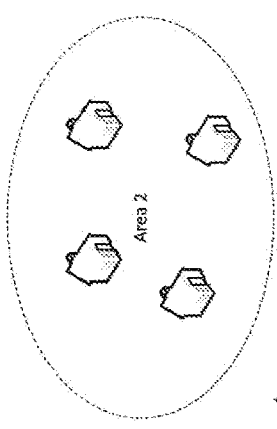

Interface devices in the field 130

Area 1 Area 2

Control areas can be segmented based on locations or other parameters

1500

Control Centre 170

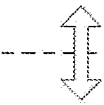

Control centre is the central hub for data collection and communication. All control flow passes via the control centre.

Energy Distributor 1630/165

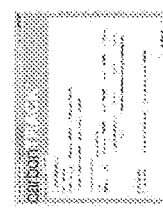

Control Dashboard

⇩

Select target location (Area)

⇩

Get real time energy usage on monitored utilities

⇩

Control/Remote switching (On/Off)

Every device location (latitude/Longitude) is recorded at the time of installation. Energy distributors can target an area based on the location parameters through the interface Reports detailing real time energy utilisation to make smart decisions before switching action is taken Devices can be remotely controlled based on location or other parameters. This could also be based on time windows specified by the administrator at the energy distribution centre

SYSTEM AND METHOD FOR MONITORING AND CONTROL OF APPLIANCES

TECHNICAL FIELD

Described embodiments relate generally to energy harvesting and/or consumption systems and interface devices for such systems. In particular, such energy harvesting systems may be configured to harvest kinetic energy from the environment, such as wind, hydro, wave or geothermal energy or to harvest electromagnetic energy like solar radiation. Embodiments also relate to systems and methods to facilitate remote monitoring and/or control of a system comprising an interface device.

BACKGROUND

So-called renewable energy systems, such as solar cell arrays, solar hot water systems, wind, water and wave turbine systems are becoming increasingly prevalent. Such technologies are generally considered to be clean technologies, as they avoid or reduce the consumption of fossil fuels. For many of these technologies, it is possible to generate carbon credits where energy from such systems can be used instead of energy commonly provided by consumption of fossil fuels. Such carbon credits are recognised as having value and are increasingly being traded as a commodity.

However, many renewable energy systems fail to actually measure the energy generated by the energy harvesting system, fail to measure the amount of the generated renewable energy actually used and/or fail to utilise any such measurement data for tracking of carbon credits.

Domestic energy use can often be inefficient or wasteful. For example, water heaters are often left on, consuming energy and heating water when there is no demand for it. Other appliances may also be left on when there is no need for them to be on. Additionally, use of appliances may occur in times of peak demand (and peak tariffs) when they could be used more economically at another time.

It is desired to address or ameliorate one or more shortcomings or disadvantages associated with prior systems, or to at least provide a useful alternative thereto.

SUMMARY

Some embodiments relate to a system for monitoring and control of at least one appliance, the system comprising:
  a computer server system;
  an electronic interface device installed remotely from the computer server system and in wireless communication with the computer server system, wherein the interface device is configured to monitor power consumption of the at least one appliance and to control supply of power to the at least one appliance, and wherein the interface device is configured to periodically transmit monitored power usage data to the computer server system, to receive at least one of data and commands from the computer server system and to control power to the at least one appliance based on the received at least one of data and commands.

The system may further comprise at least one electronic control unit in communication with the electronic interface device and arranged to switch power to the at least one appliance on or off. The at least one electronic control unit may be in wireless communication with the interface device using a local area communication protocol. The at least one electronic control unit may comprise a current sensor to monitor current drawn by the at least one appliance when power to the at least one appliance is switched on, wherein the electronic control unit is configured to communicate monitored current data to the interface device.

The system may further comprise a data store accessible to the computer server system to store and provide historical power usage data based on power usage data periodically received from the interface device. The computer server system may be configured to calculate statistical data from the historical power usage data and to transmit at least some of the calculated statistical data to the interface device in response to a request received from the interface device. The at least some statistical data may comprise a standard deviation about an appliance set point, for example.

The computer server system may comprise a client interface module to allow a user to interact with the computer server system via a client device that is in communication with the computer server system. The computer server system may be configured to allow, via the client interface module, configuration of monitoring and control functions of the interface device.

Some embodiments relate to a system for monitoring and control of at least one appliance, the system comprising:
  a computer server system;
  an electronic interface device installed remotely from the computer server system and in wireless communication with the computer server system, wherein the electronic interface device may be configured to receive power usage information from the at least one appliance, to periodically transmit power usage data relating to the power usage information to the computer server system, to receive at least one of data and commands from the computer server system and to control power to the at least one appliance based on the received at least one of data and commands, and wherein the server system may be configured to access a data store to store and retrieve historical power usage data based on power usage data periodically received from the interface device; and
  an adaptive learning module configured to generate commands for the interface device to control power to the at least one appliance based on configuration information and the historical power usage data.

According to some embodiments, the server system may host the adaptive learning module. In some embodiments, the configuration information may be received by the adaptive learning module from a client device.

According to some embodiments, the computer server system may comprise a client interface module to allow a user to interact with the computer server system via a client device that is in communication with the computer server system, wherein the computer server system may receive the configuration information via the client interface module, the configuration information comprising information relating to the configuration of monitoring and control functions of the interface device.

Some embodiments may further comprise at least one electronic control unit in communication with the electronic interface device and arranged to control power to the at least one appliance. According to some embodiments the at least one electronic control unit is in wireless communication with the interface device using a local area communication protocol. According to some embodiments, the at least one electronic control unit may comprise a current sensor to monitor current drawn by the at least one appliance when power to the at least one appliance is switched on, wherein the electronic control unit may be configured to communicate monitored current data to the interface device.

According to some embodiments, the computer server system may be configured to calculate statistical data from the historical power usage data and to transmit at least some of the calculated statistical data to the interface device in response to a request received from the interface device. According to some embodiments, at least some statistical data may comprise a standard deviation about an appliance set point.

Some embodiments relate to a method of controlling power supplied to at least one appliance, the method comprising the steps of:
  an interface device monitoring power consumption of the at least one appliance;
  the interface device transmitting power consumption information relating to the power consumption of the at least one appliance to a server system;
  the interface device receiving commands from the server system; and
  the interface device controlling power to the at least one appliance based on the received commands.

According to some embodiments, the step of monitoring the power consumption may comprise receiving power consumption data from at least one electronic control unit in communication with the electronic interface device.

According to some embodiments, the at least one electronic control unit may comprise a current sensor to monitor current drawn by the at least one appliance when power to the at least one appliance is switched on, and step of the interface device monitoring power consumption of the at least one appliance may comprise the interface device receiving monitored current data from the electronic control unit.

According to some embodiments, the step of controlling the power may comprise sending one or more control commands to the at least one electronic control unit, the electronic control unit being arranged to control power to the at least one appliance in response to the one or more control commands.

Some embodiments relate to a method of controlling power supplied to at least one appliance, the method comprising the steps of:
  a server system receiving configuration information;
  the server system receiving appliance power consumption information relating to the at least one appliance from an interface device and storing the information in a data store;
  the server system retrieving the power consumption information from the data store;
  the server system processing the power consumption information and the configuration information to generate one or more commands; and
  the server system sending the one or more commands to the interface device to cause the interface device to control power to the at least one appliance.

According to some embodiments, the configuration information may be received from a client device via a client interface module, the configuration information comprising information relating to the configuration of monitoring and control functions of the interface device.

According to some embodiments, the interface device may be configured to control power to the at least one appliance by sending one or more control commands to at least one electronic control unit, the electronic control unit being arranged to control power to the at least one appliance in response to the one or more control commands.

Some embodiments relate to an interface device to interface with an energy harvesting system, the interface device comprising:
  at least one processing device;
  a memory storing program code executable by the at least one processing device to control measurement, communication and location functions of the interface device;
  a measurement component to measure electrical energy generated by the energy harvesting system;
  a location component to determine a location of the interface device and the energy harvesting system; and
  a communication component to wirelessly communicate to and from an external network.

Some embodiments relate to an interface device to interface with an energy harvesting system, the interface device comprising:
  at least one processing device;
  a memory storing program code executable by the at least one processing device to control measurement, communication and optionally location functions of the interface device;
  a measurement component to measure electrical energy generated by the energy harvesting system and to determine an amount of the generated electrical energy consumed by a local power sink;
  an optional location component to determine a location of the interface device and the energy harvesting system; and
  a communication component to wirelessly communicate to and from an external network.

Some embodiments may involve the use of a temperature sensor arranged to sense a water temperature of a water storage device associated with the energy harvesting system. The interface device may be configured to receive an output from the temperature sensor to determine the sensed water temperature. In such embodiments, the interface device may be configured to monitor the water temperature. In some embodiments, the interface device may also be configured to transmit control signals to at least one of the energy harvesting system and a back-up heating system to control heating of the water in the water heating device so that the water is maintained at or above a set temperature for a set minimum period of time.

Some embodiments relate to a system for remote monitoring of an energy harvesting system, comprising:
  an interface device installed at a site of the energy harvesting system and configured to continuously monitor energy drawn and/or produced by the energy harvesting system and to calculate a power contribution of the energy harvesting system, the interface device comprising a wireless communication component and being configured to periodically transmit data representing the calculated power contribution to an address over a network; and
  a server remote from the interface device and receiving data representing the transmitted power contributions from the interface device, the server being configured to store the data and to allow authorised access to the data in real-time.

The server may be further configured to calculate carbon credits associated with the energy harvesting system based on the received data representing power contributions. The interface device may be further configured to calculate power consumption of a booster system at the site of the energy harvesting system and to transmit data representing the power consumption to the server.

The energy harvesting system may comprise a solar water heating system and an electrical water heating system cooperating to supply heated water to the site. The system may further comprise a first temperature sensor to sense water temperature in the solar heating system and a second temperature sensor to sense water temperature in the electrical water heating system. The interface device may be arranged to receive output signals from the first and second temperature sensors indicative sensed temperatures. The interface device may be configured to control supply of electrical power to the electric water heating system. The interface device may be configured to turn off electrical power to the electric water heating system in response to a specific command received from the server.

The server may be configured to allow receipt of input from an authorised user via a client computing device to turn off electrical power to the electric water heating system and, in response to the received input, to generate and transmit the specific command to the interface device to cause the interface device to turn off power to the electric water heating system.

The system may further comprise a circulation pump to circulate water between the solar water heating system and the electric water heating system, wherein operation of the circulation pump is controlled by the interface device.

The interface device and the server may be both configured to use a data transfer protocol to transmit messages to each other having a message header and message data, the message header having a header size of only a single byte or a single word. Each message of the data transfer protocol may comprise one of: a trailing check sum byte; and no trailing byte.

Some embodiments relate to a system for power consumption management comprising:
  a plurality of geographically spread electrical water heating systems, each being installed at a site for supplying heated water to the site;
  a plurality of interface devices, each being installed at a respective site, wherein each interface device has a wireless communication component to receive a control command from a server and each interface is configured to control supply of electrical power to a respective electrical water heating system in response to the control command; and
  the server, the server allowing receipt of control input to cause the server to transmit the control command to the interface devices.

Each interface device may be further configured to determine power usage of the electrical water heating system at the respective site and to regularly transmit data indicative of the determined power usage to the server.

The system may further comprise a temperature sensor at each site arranged to sense water temperature of the electrical water heating system and to provide a signal to the respective interface device indicative of the sensed water temperature. The interface device at each site may be configured to regularly transmit data indicative of the sensed temperature to the server.

The server may be configured to compare the sensed water temperature of a respective water heating system to a temperature threshold and to transmit the control message to the interface device associated with the respective water heating system based on an outcome of the comparison. The server may be configured to transmit the control messages to the respective interface devices to cause the respective interface devices to turn off electrical power to the respective electric water heating systems during a specific daily time period, such as a peak electricity usage period.

Some embodiments relate to a method of power consumption management, comprising:
  receiving at a server sensed water temperature data from a plurality of remote sites having respective electric water heating systems and respective interface devices arranged to control electrical power to the respective electric water heating system, wherein each interface device is configured to communicate the sensed water temperature data to the server;
  determining from the sensed water temperature data whether a sensed water temperature of a respective electric water heating system is at or above a threshold temperature; and
  during a specific daily time period, transmitting control commands to those interface devices at sites where the sensed water temperature is at or above the threshold temperature, the control commands causing the respective interface devices to turn off electrical power to the electrical water heating systems at the respective sites.

Some embodiments relate to a water heating system, comprising:
  a solar water heating system;
  an electric water heating system coupled to the solar water heating system to circulate water between the solar and electric water heating systems;
  temperature sensing means to sense the water temperature in the solar water heating system and in the electric water heating system;
  an interface device coupled to receive output signals from the temperature sensing means and to determine from the output signals a rate of change of water temperature in the solar water heating system, wherein for a predetermined period daily the interface device is configured to cause electrical power to the electric water heating system to be switched on when the electrical water heating system is off and determined rate of change indicates that the water temperature in the solar water heating system will not reach a target temperature by a predetermined time.

Some embodiments relate to an energy harvesting system comprising the interface device described above. Some embodiments relate to a method of use of the interface device as described herein.

BRIEF DESCRIPTION OF THE DRAWINGS

Embodiments are described in further detail below, by way of example, and with reference to the accompanying drawings, in which:

FIG. 17 is a schematic diagram illustrating control functionality of the system of FIG. 16 as seen by an energy distributor;

DETAILED DESCRIPTION

Described embodiments relate generally to energy harvesting systems and interface devices for such systems. In particular, such energy harvesting systems may be configured to harvest kinetic energy from the environment, such as wind, hydro, wave or geothermal energy or to harvest electromagnetic energy like solar radiation. In this context, energy harvesting may involve conversion of energy from one form to another. For example, the sun's EM radiation may be converted to kinetic energy in the form of increased heat in a substance, such as water. In another example, solar EM radiation or kinetic wind energy may be converted into electrical energy.

Described embodiments relating to interface devices for energy harvesting systems are concerned with hardware and software components within such interface devices in order to enable measurement of generated electrical power, location determination (i.e. using GPS), wireless communication to remote systems and optionally also to perform control functions in relation to the energy harvesting system with which the interface device is co-located and/or integrated. The interface devices of the described embodiments may provide application program interface (API) functions with an open specification to allow the interface device to be designed and used with multiple different external functional components.

Figure 1:
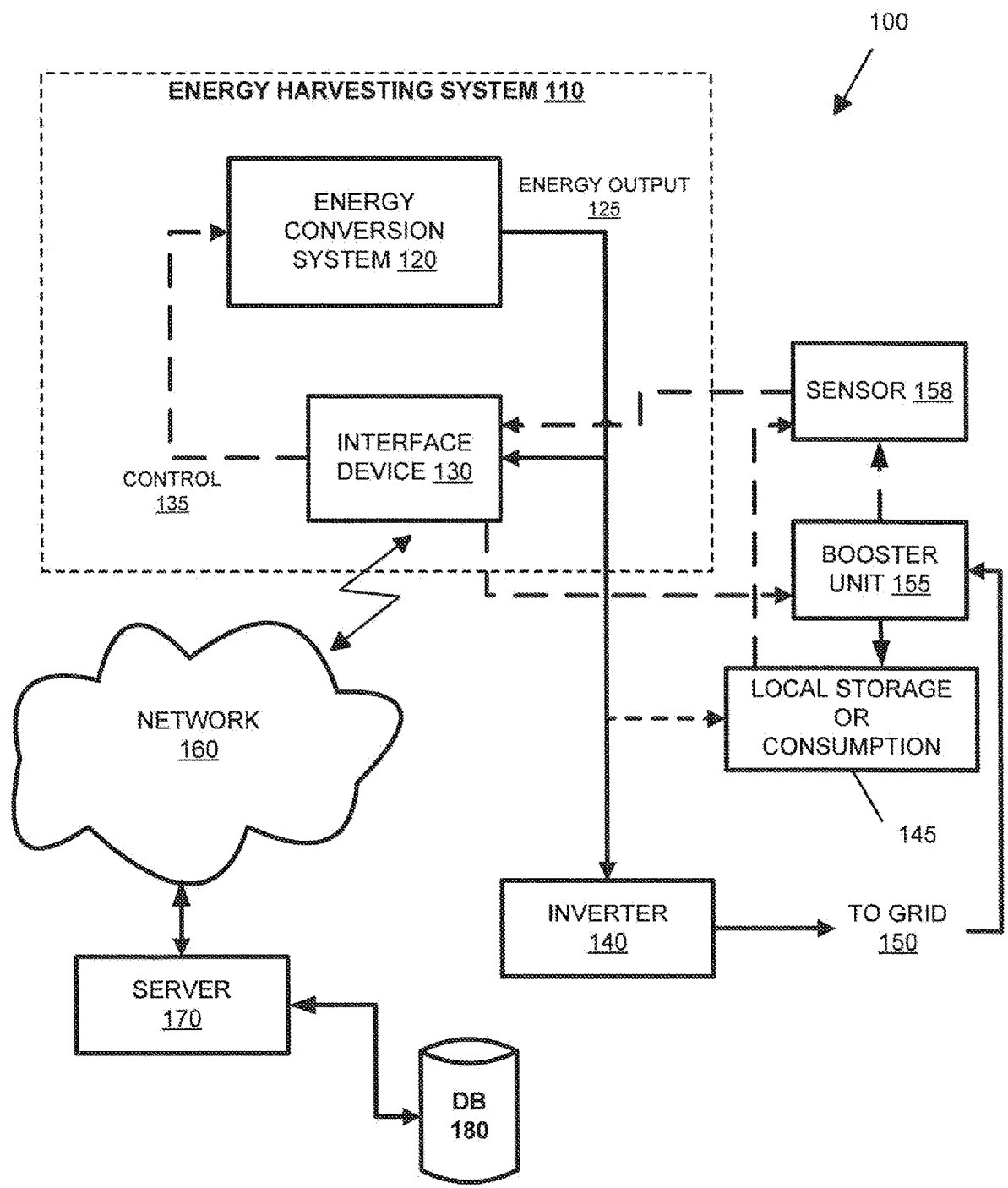
FIG. 1 is a block diagram of a system for energy harvesting and tracking.

As shown in FIG. 1, a system 100 for energy harvesting tracking includes an energy harvesting system 110, which may be a solar cell array assembly, a solar hot water system, a wind turbine, a wave energy harvester, a sub-surface water turbine, a heat energy extraction system or other non-fossil fuel based system, by way of non-limiting example. Energy harvesting system 110 may be characterised as a renewable energy system, apparatus or device and is generally intended to convert energy in the local environment, for example, in the form of kinetic energy of a moving body or moving particles (including heat) or electromagnetic radiation, into electrical energy for storage or transmission or kinetic energy in a substance, such as water.

Energy harvesting system 110 includes an energy conversion system 120 and an interface device 130, which may be physically integrated or closely located with the energy conversion system 120 or, alternatively, physically distinct but geographically co-located. Energy conversion system 120 is the part of energy harvesting system 110 that converts the electromagnetic or kinetic energy from the environment into kinetic or electrical energy output 125. This kinetic or electrical energy output 125 is monitored and measured by interface device 130. The amount of power through a circuit is calculated by the product of the measured current and voltage. The current and the voltage are measured using sensor circuits having transformers which are embedded within the circuit as measuring instruments. Monitoring and measurement of heat energy obtained from a solar hot water heating system is described in further detail below.

Interface device 130 may have its own power supply, such as a battery and/or may derive power from energy output 125. Interface device 130 may be configured to output control signals 135 to exert control over one or more aspects of the functioning of energy conversion system 120. For example, interface device 130 may switch the mode of operation of energy conversion system 120 or may transmit control signals to motors associated with energy conversion system 120 to change its position. For example, if energy conversion system 120 is a solar cell array, interface device 130 may output control signals 135 to cause servo motors to change the orientation of the solar cell array to maximise the amount of sunlight impinging thereon for a particular time of day. In another example, where the energy conversion system 120 includes a solar hot water heater, the control signals 135 may be applied to control supplementation of water heating by an electric or gas fuelled water heater.

Interface device 130 is equipped with a communication sub-system 260 (FIG. 2) that has one or more wired or wireless interfaces 265, such as a local wireless (Wi-Fi) radio component 267 and/or a mobile telephony component that uses a subscriber identity module (SIM) 269 to communication over a wireless packet network. Alternatively, communication sub-system 260 may communicate in a wired manner with a communication system that is already established nearby, such as a domestic internet connection.

Interface device 130 uses the communication sub-system 260 to communicate with a remote server 170 over a public network 160. The public network 160 includes normal public data networks and possibly also local wireless data networks. Interface device 130 is thus enabled for two-way communication with remote server 170 in order to transmit measurement, location, configuration and status information and optionally to receive status inquiries and control commands therefrom. Server 170 uses the information received from interface device 130 to determine the amount of electrical energy generated by the energy conversion system 120 (that was consumed locally and therefore not drawn from the grid 150) and to calculate a number of carbon credits generated by the energy conversion system 120 within a given period, or at least determine an amount of carbon offset to be attributed to the energy conversion system 120.

Remote server 170 communicates with a number of interface devices 130 within energy harvesting systems 110 located across a potentially large geographic area and keeps unique accounting and tracking records for each such interface device 130 in a database 180 accessible to the server 170.

Where the energy conversion system 120 is configured to be able to return electrical energy to the local power grid, the energy output 125 may be coupled to an inverter 140, which then returns that electrical energy to the grid 150 and allows metering of the energy that is returned. This metering allows for compensation to be provided to the owner of the energy harvesting system 110 for the energy which it has generated.

In addition, or alternatively, some or all of the electrical energy output 125 from energy conversion system 120 may be provided to local storage device 145 or may be provided to local appliances for consumption.

Figure 2:
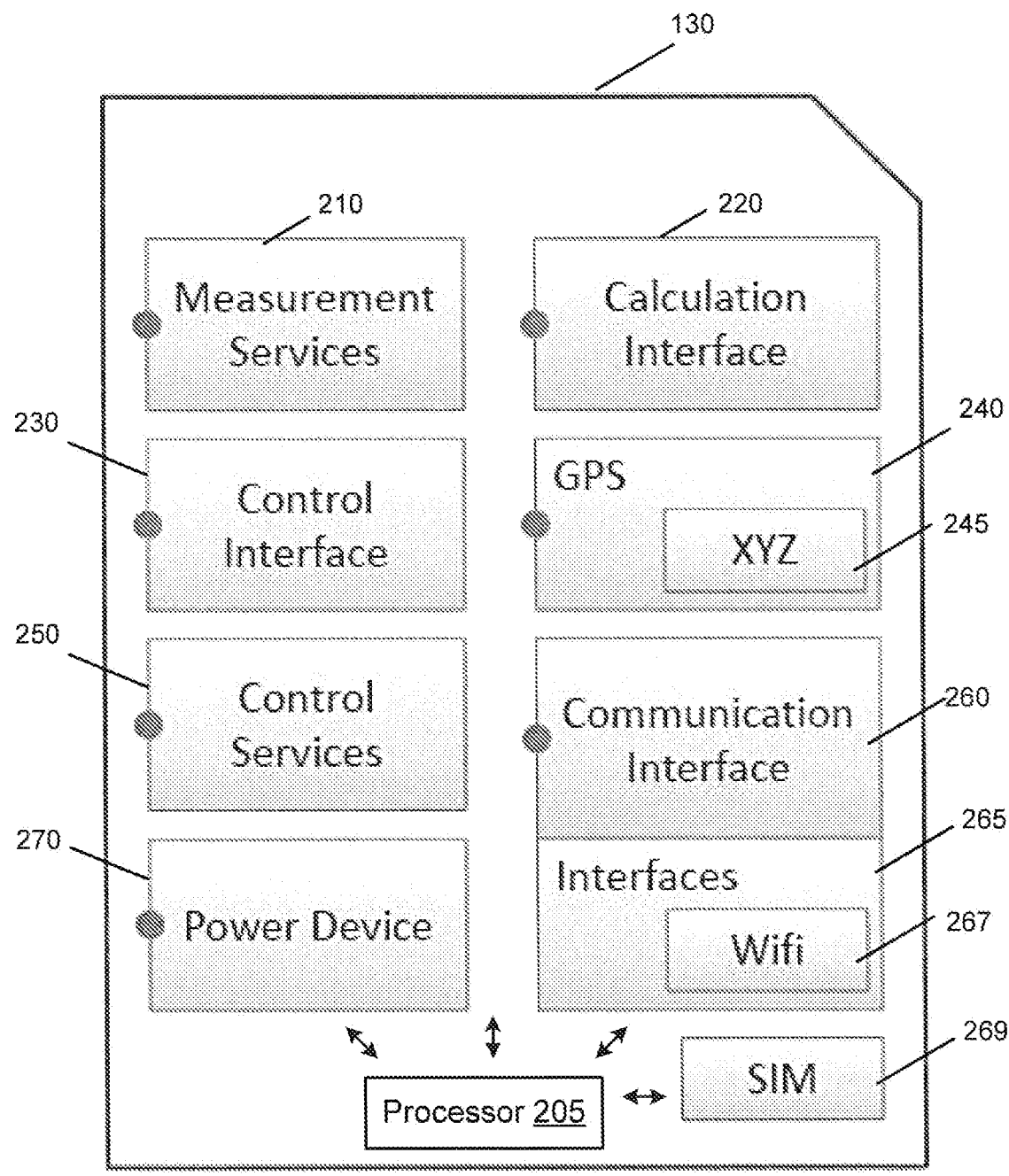
FIG. 2 is a block diagram of an interface device for use in the system of FIG. 1.

Referring also to FIG. 2, interface device 130 is a hardware device having at least one processor 205 and suitable memory (not shown) for storing program code executable by the processor 205 in order to provide the described functions and support the described components. Interface device 130 has a measurement component, which communicates with a separate or integrated sensor device (e.g. using transformers) and subsumed within a measurement services function 210 that is responsible for measuring the amount of electrical energy at energy output 125. Interface device 130 further comprises a calculation interface 220, a control interface 230 and a location component 240 configured to use the global positioning system to determine a location 245 of the interface device 130. Interface device 130 also comprises control services 250, a power device 270, which may include a battery and/or power derived from energy output 125 and, as previously mentioned, a communication sub-system 260.

The calculation interface 220 performs calculations to compute RMS (root means squared) values for measured power. In some embodiments where the interface device 130 receives water flow rate information (see FIGS. 15 to 34), the calculation interface 220 may also calculate rate of water flow and quantity, based on signals from a flow meter and sensed water temperature, etc. In some embodiments of the interface device 130, the calculation interface 20 may also perform linearization calculations for temperature and voltage measurements.

Control interface 230 and control services 250 are responsive to commands received from remote server 170 (and processed by processor 205) to exert control over one or more points of energy conversion system 120.

Interface device 130 thus provides a combination of a chip set and web service methods to enable its hardware and software components to sense, monitor, transmit data, control and manage energy conversion systems in different locations. The direct measurement of the electrical energy generated by the energy conversion system 120, in combination with the ability to verify the geographic location (using the GPS location component 240) and to transmit this data in real time over network 160 allows for much greater control, knowledge and value extraction to be obtained from the energy harvesting systems 110 located across a geographical area.

Figure 3:
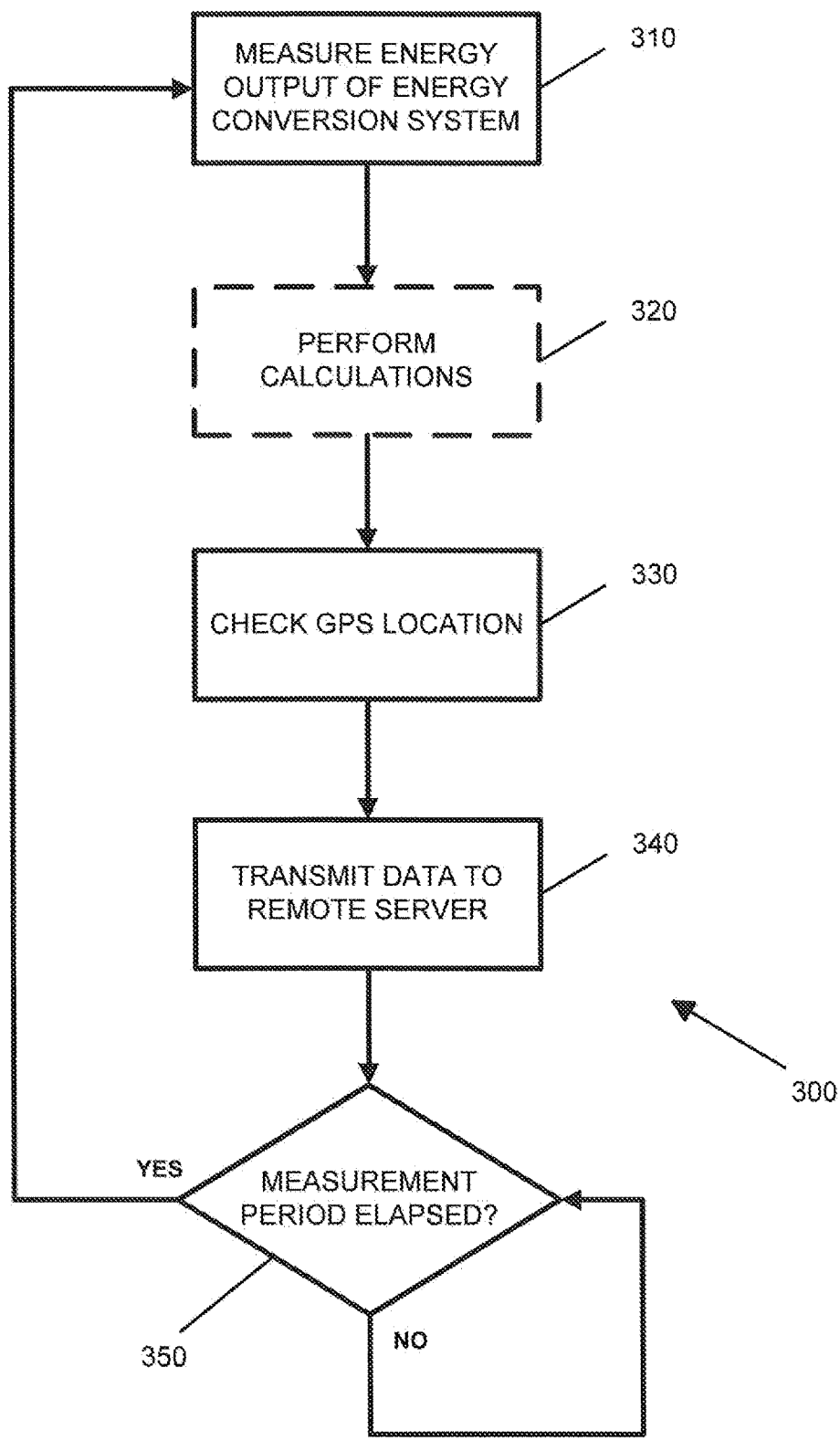
FIG. 3 is a flow chart of a method of use of the interface device of FIG. 2.

Referring also to FIG. 3, a method of use of interface device 130 is described. Method 300 involves measuring at 310 the electrical energy output 125 of the energy conversion system 120. Optionally, interface device 130 performs calculations on the measurement data using calculation interface 220. Interface device 130 then uses the location component 240 to check the GPS location of the first device 130 at step 330. Then interface device 130 transmits at 340 the measured and/or calculated data, together with the confirmed GPS location and any other relevant data to remote server 170. Once interface device 130 determines that a preset measurement period has elapsed at step 350, then steps 310 to 340 are repeated. This preset period may be a fraction of a second or a number of seconds, such as one, two, three, four, five, six, seven, eight, nine, ten, fifteen, twenty, thirty, forty, fifty or sixty, for example.

GPS component 240 determines the location of the interface device 130 accurately using the existing GPS network to provide accurate latitude and longitude and all coordinates for where the device 130 is located. This information is used by server 170 to determine other environmental information, such as the access and path of the sun in the sky and the direct amount of sunlight hours where the energy conversion system 120 source is located. The GPS component 240 can also measure XYZ coordinates using other interfaces 245 to accurately measure the pitch or shift of the energy device in reference to another placement or another component of its subsystem such as another solar panel or wind farm with its own GPS unit.

Communications subsystem 260 enables transmission of data concerning performance of the energy conversion system 120 over various communications interfaces 256. Such interfaces 256 include a SIM (subscriber identity module) card 269 for utilising the mobile phone network. Interfaces 265 may also include a Wi-Fi interface 267 using a local wireless communications network or a local niche network. A satellite interface can also be integrated if required.

The controller 230 provides a control interface to interact with the multi-channel communications subsystem 260 to enable engineers and manufacturers of renewable energy devices to control, configure, switch and maintain their interface device 130 remotely. The switching interface hardware chip set control services 250 and controllers 230 can send commands and receive data to control and switch one or more local devices coupled to the interface device 130.

The measurement interface 210 can measure, store and monitor the amount of solar or other renewable energy generated from the energy conversion system 120. The measurement interface 210 can be integrated with a number of different systems to measure and transmit the amount of energy that is captured (i.e. locally consumed at 145, not otherwise drawn from the power supply grid 150 or returned to the grid 150) while the energy conversion system 120 is in use.

Green energy (i.e. energy from renewable resources), such as solar and wind energy, is becoming more affordable and is now perceived by consumers as more main-stream. As new technologies emerge in this sector, their efficiency and effectiveness varies because they are largely affected by the prevailing environmental factors associated with their location.

These alternative energy sources should perform at their maximum efficiency in order to maximise their output conversion rate and the consumer's return on the upfront investment. To this end, monitoring and tracking the efficiency of these installed renewable energy devices is vital to the success of green energy continuing to gain market share away from traditional coal generated energy. The described interface device embodiments can be used to monitor and track the effectiveness of renewable energy devices and similar green energy generating installations. Some interface device embodiments also allow control over the energy conversion system to optimise its operation or effect.

Due to the nature of green energy installations and environmental factors governing them, a number of design considerations are applied to described interface device embodiments:

1. Operating temperature range: −ve 25 to +80 degrees centigrade.
2. Communication: Ability to communicate from remote sites with little or no access to network infrastructure.
3. Communication fault tolerant protocol stacks with built-in transmission verification checks.
4. Internal data storage to withstand loss/failures of communication links to a remote server for a period of time without a loss in data.
5. Operating power supply: Parasite-powered (i.e. powered by the energy harvesting system) with battery backup. Option for external power.
6. Low or minimal maintenance.
7. Remote debugging and error correction.
8. Remote calibration.
9. Optional remote programming.

A carbon credit is a generic term for any tradable certificate or permit representing the right to emit one tonne of carbon dioxide or the mass of another greenhouse gas with a carbon dioxide equivalent (tCO2e). One carbon credit is equal to one metric tonne of carbon dioxide. The amount of carbon offset due to the use of renewable energy sources depends on the method used to generate traditional coal or other energy sources. This depends on the efficiency of plant generating this energy and other factors.

One of the functions of described interface device embodiments is to track the amount of renewable energy used. This data can be used to calculate the amount of carbon credits generated by the energy harvesting system 100. The calculation of carbon credits is a server side function performed by server 170 based on information provided by interface device 130 regarding how much power was generated by, or drawn from, a local source, such as energy conversion system 120, instead of from the power supply grid 150.

Figure 4:
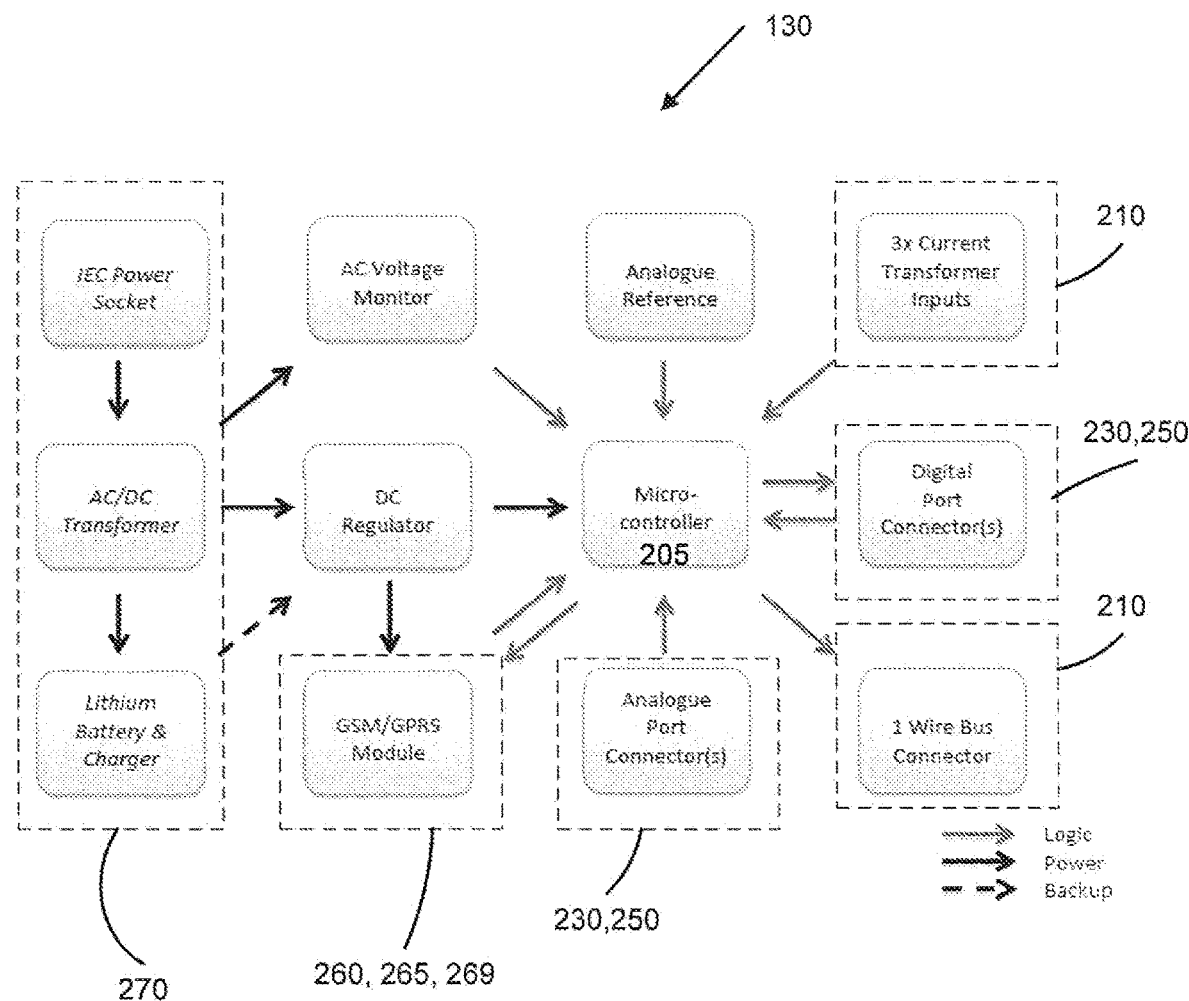
FIG. 4 is a block diagram of an interface device according to further embodiments.

FIG. 4 is a schematic block diagram of functional and logical components of the interface device 130 according to some embodiments. The interface device 130 shown in FIG. 4 has a microcontroller as one exemplary form of processor 205. The microcontroller 205 receives power from a DC regulator, which may receive its power supply from an AC/DC transformer that is coupled to an AC power source, such as an IEC power socket. A battery and charging module may be charged from the mains power or parasitically by the energy conversion system 120. When the DC regulator does not receive power from the transformer, the battery may supply the power. The interface device 130 may also have an AC voltage monitor for monitoring the AC voltage of the power supply (if the power supply is AC) and providing an output to the microcontroller 205. Interface device 130 also has an analog reference component to provide at least one voltage reference for the analog to digital converters (ADCs) and the microcontroller 205.

Interface device 130 further comprises a GSM/GPRS module (having the functions of components 260, 265 and 269 described above), which acts as an external communication interface to communicate with server 170. The GSM/GPRS module comprises suitable hardware and software interfaces 265 and may optionally include or cooperate with a short range wireless (Wi-Fi) communication module 267. Optionally, the interface device 130 may have a GPS subsystem 240 for confirming the location of the interface device 130. Alternatively, the GPS sub-system 240 may be omitted in favour of an alternative means of determining the physical location of the interface device 130, such as a separate GPS locator that does not remain with the interface device 130 after its installation.

Interface device 130 further comprises analog port connectors and digital port connectors to interface with other local devices, in some instances providing control signals to such devices via the port connectors and in some instances receiving output signals from such devices, examples of which are described in further detail below. Additionally, at least one current transformer and optionally three current transformers, are used by interface device 130 in order to measure the DC or AC current of a local energy conversion or consumption device. Some embodiments of interface device 130 may also use a one wire bus connector to host multiple temperature sensors.

Further embodiments of interface device 130 are described below, with reference to specific implementation examples.

Solar Water Heating—an Example

Solar hot water systems use the sun's natural energy to heat water. There are three main types of water heaters, each using different technologies:

Thermosiphon Systems; Split Systems; and Heat Pumps.

These solar water heating forms of energy harvesting system 110 may have an electric backup unit 155, also called a booster unit and in some countries a "geyser". The booster unit 155 is responsible for heating the water to the required temperature when the solar water heating system cannot provide the required heating. The main function of the solar heating unit and booster unit 155 is to bring the water to a required temperature. The solar heating unit plays the primary heating role and the booster unit 155 is used only when required. The booster unit 155 is an electrical unit which uses energy from the mains electrical power supply (grid 150) to function.

The effectiveness of the system mainly depends on the solar heating unit. Ideally, the solar heating unit should be able to provide the energy necessary to heat the water to the required temperature and the booster unit 155 is not used. Given this, the effectiveness of the system depends primarily on two factors:

1. Duration and intensity of the sun on a given day.
2. Ability of the solar unit to convert a maximum amount of the sun's energy to increased heat of the water.

If either of the above factors varies to the extent that the minimum heating requirements are not met, then the booster unit 155 will be activated. As the booster unit 155 utilises energy from the grid 150, by measuring the energy dissipated by this unit we can arrive at the exact carbon displacement. The effectiveness of the overall system can be determined by measuring the temperature of the water and the booster energy consumption. The water heating system is considered to be highly effective when the water temperature is at the required level and no energy is used by the booster unit.

Electrical energy that is generated by photovoltaic (PV) panels or Solar Farms (i.e. large PV panel arrays) is lost if not used, stored or returned to the grid 150. Measuring the amount of energy generated may not be a correct measure of the actual carbon offset. Instead, an accurate measure of carbon offset will be a measure of the amount of energy used or consumed which was generated by a renewable energy source instead of being drawn from the normal power supply grid 150.

The above-described solar hot water heating systems may incorporate the interface device 130 in the manner illustrated in FIG. 1, where such solar hot water heating systems represent one kind of energy harvesting system 110 and the water to be heated is represented by local storage or consumption 145. Additionally, the system 100 may include a temperature sensor 158 or more than one such sensor arranged to sense a temperature of the stored heated water and provide a signal indicative of the sensed temperature to the interface device 130 (and optionally also booster unit 155). The measured booster unit energy consumption can be transmitted to the server 170 via network 160, along with the sensed water temperature data (and any other pertinent comparative temperature information to enable the carbon offset to be calculated) and time data defining the period over which measurements were taken. This data may also be supplemented by flow rate data gathered by the interface device 130 from a flow meter coupled to an outlet of the hot water supply unit. Alternatively, instead of transmitting the data to the server to perform the carbon credit calculations, the calculations may be performed by execution of suitable program code by the processor 205 of the interface device 130.

In embodiments of system 100 that include a water heating system, such as are described above, a temperature sensor (as one example of sensor 158) may be arranged to sense a water temperature of a water storage device associated with the energy harvesting system 110. In such embodiments, the water storage device is an example of one type of energy sink that is encompassed by the local storage or consumption 145 indicated in FIG. 1. The interface device 130 may be configured to receive an output signal from the temperature sensor to determine the sensed water temperature. In such embodiments, the interface device 130 may be configured to monitor the water temperature and report and store the gathered temperature information in a local memory accessible to processor 205.

In some embodiments, the interface device 130 may also be configured to transmit control signals to at least one of the energy harvesting system 110 and a back-up heating system (i.e. booster unit 155) to control heating of the water in the water heating device so that the water is maintained at or above a set temperature for a set minimum period of time. Such monitoring and control functions of the interface device may be performed by the processor 205 executing stored program code read from the local memory of interface device 130.

This heating control may be useful to ensure that the water temperature of the water heating system does not fall below a specified temperature threshold for areas that may be at risk for bacterial or other pathogen growth in the water tank. For example, some areas may be prone to outbreaks of Legionnaires Disease. The risk of Legionnaires Disease contaminating a water tank can be minimised by maintaining the water temperature in that tank at or above a pre-set temperature to kill the harmful bacteria.

Described embodiments of interface device 130 may be used within different kinds of systems 100 that employ different kinds of energy harvesting systems 110. Such embodiments of interface device 130 are in each case configured to monitor the performance (including efficiency and energy use) of the energy harvesting system 110 and to store, process and forward data received in this way to server 170 to enable the server 170 to calculate the carbon offset generated by the energy harvesting system 110 and thereby calculate the amount of carbon credits generated by that system. The data thus received by server 170 can also be used to allow the owner (or sponsor) of the energy harvesting system to remotely monitor the power usage of the electrically heated water tank and the tank temperature via a user interface hosted by a client computing device 165 in communication with server 170 over the network 160.

Figure 5:
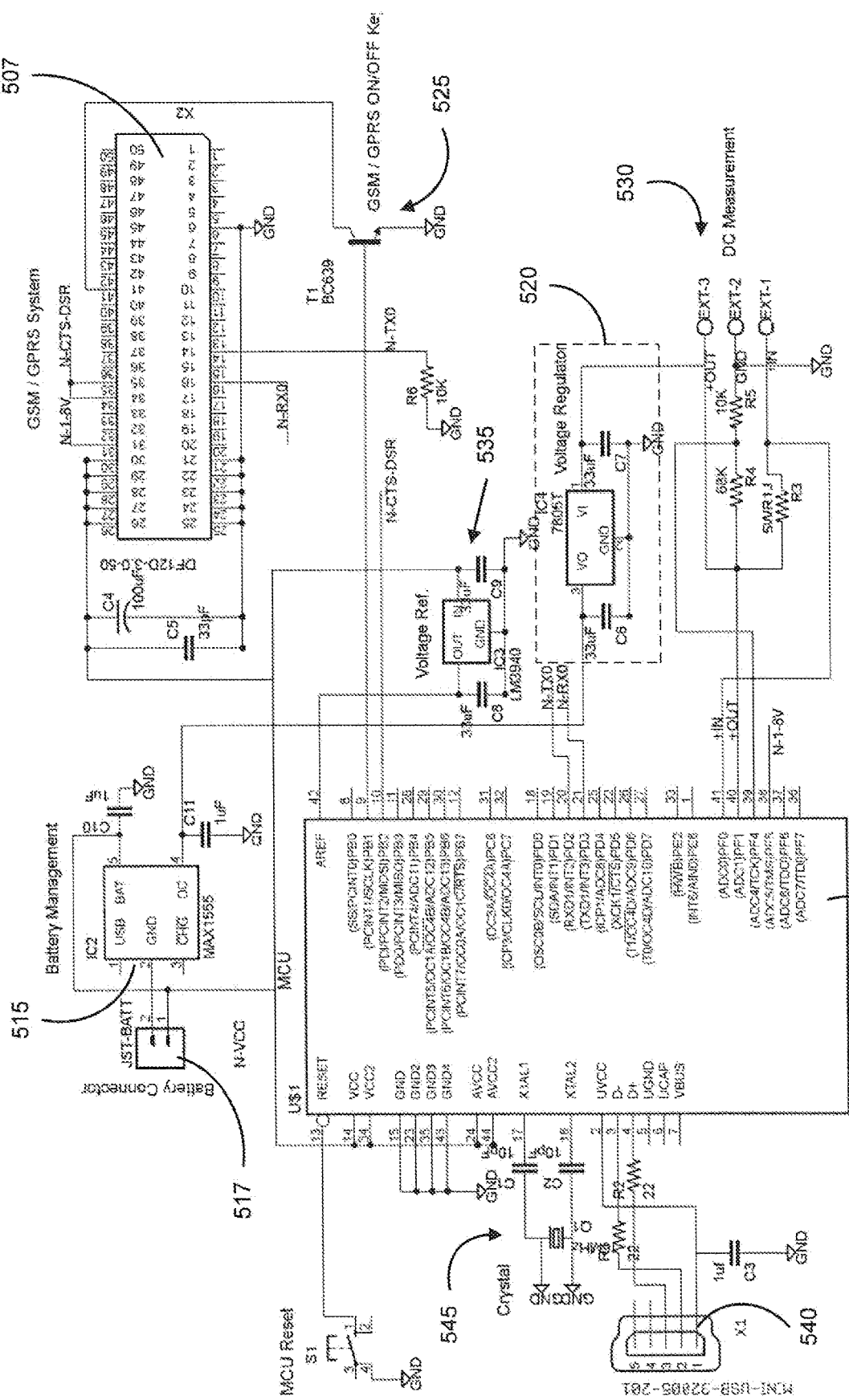
FIG. 5 is a schematic circuit diagram of some components of an interface device having a DC measurement unit.

A more detailed description of the features and functions of embodiments of the interface device 130 now follows, with reference to FIGS. 5 to 14. FIG. 5 is a schematic circuit diagram of the interface device 130 according to some embodiments.

Microcontroller Unit (MCU)

The microcontroller unit 505, or MCU, is an example of processor 205 described above and shown in FIGS. 2 and 4. The MCU 505 is the central processing and control unit of the interface device 130 and of the renewable energy generation part of the system 100. The MCU 505 is responsible for the communication and control of all the other modules which are attached to it. MCU 505 is mounted on a printed circuit board (PCB) (not shown) that carries the circuitry and electronic components described herein. The MCU 505 and the PCB are housed within a small moulded plastic housing (not shown) having dimensions roughly in the order of 10×10×3 cm.

Figure 6A:
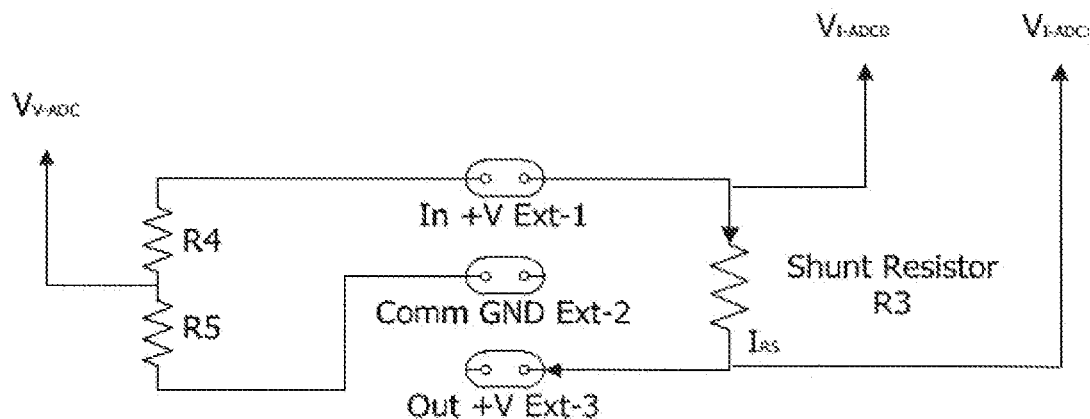
FIG. 6A is a schematic circuit diagram of a DC measurement unit of the interface device of FIG. 5.
Figure 6B:
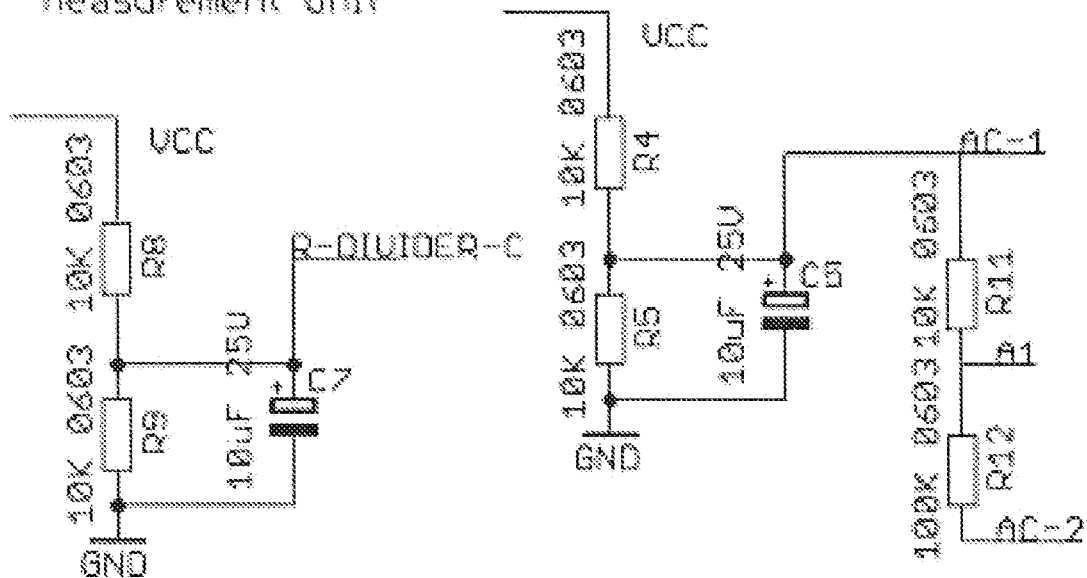
FIG. 6B is a schematic circuit diagram of an alternative AC measurement unit of the interface device of FIG. 5.
Figure 7:
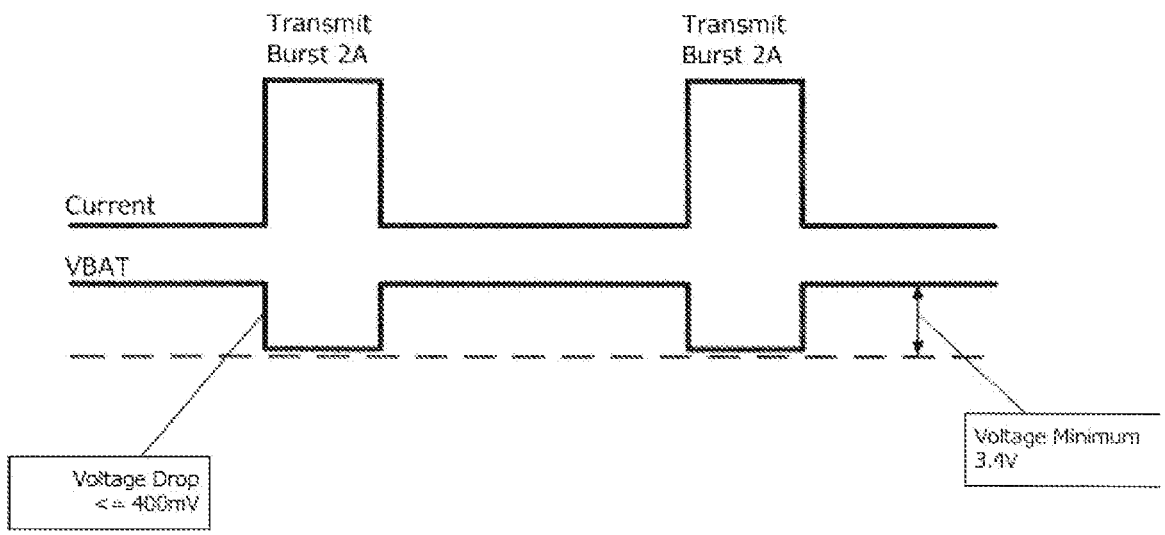
FIG. 7 is a schematic illustration of current and battery voltage during use of a GSM module.

FIG. 5 is a schematic circuit diagram of an integrated circuit including the MCU 505 and associated circuits for a DC measurement unit 530, also shown in FIG. 6A. FIG. 6B is a schematic circuit diagram of an AC measurement unit 630 that can be used with the MCU 505 or a similar processor.

The MCU 505 is a small computing device on a single integrated circuit containing a processor core, memory, and programmable input/output peripherals. In some embodiments, the interface device 130 design incorporates an Atmega32u4 microcontroller from Amtel Corporation, as shown in FIG. 5. Atmega32u4 is a 8-bit AVR RISC-based microcontroller featuring 32 KB self-programming flash program memory, 2.5 KB SRAM, 1 KB EEPROM, USB 2.0 full-speed/low speed device, 12-channel 10-bit A/D-converter, and JTAG interface for on-chip-debugging. The Atmega32u4 achieves up to 16 MIPS throughput at 16 MHz, 2.7-5.5 Volt operation.

Figure 24:
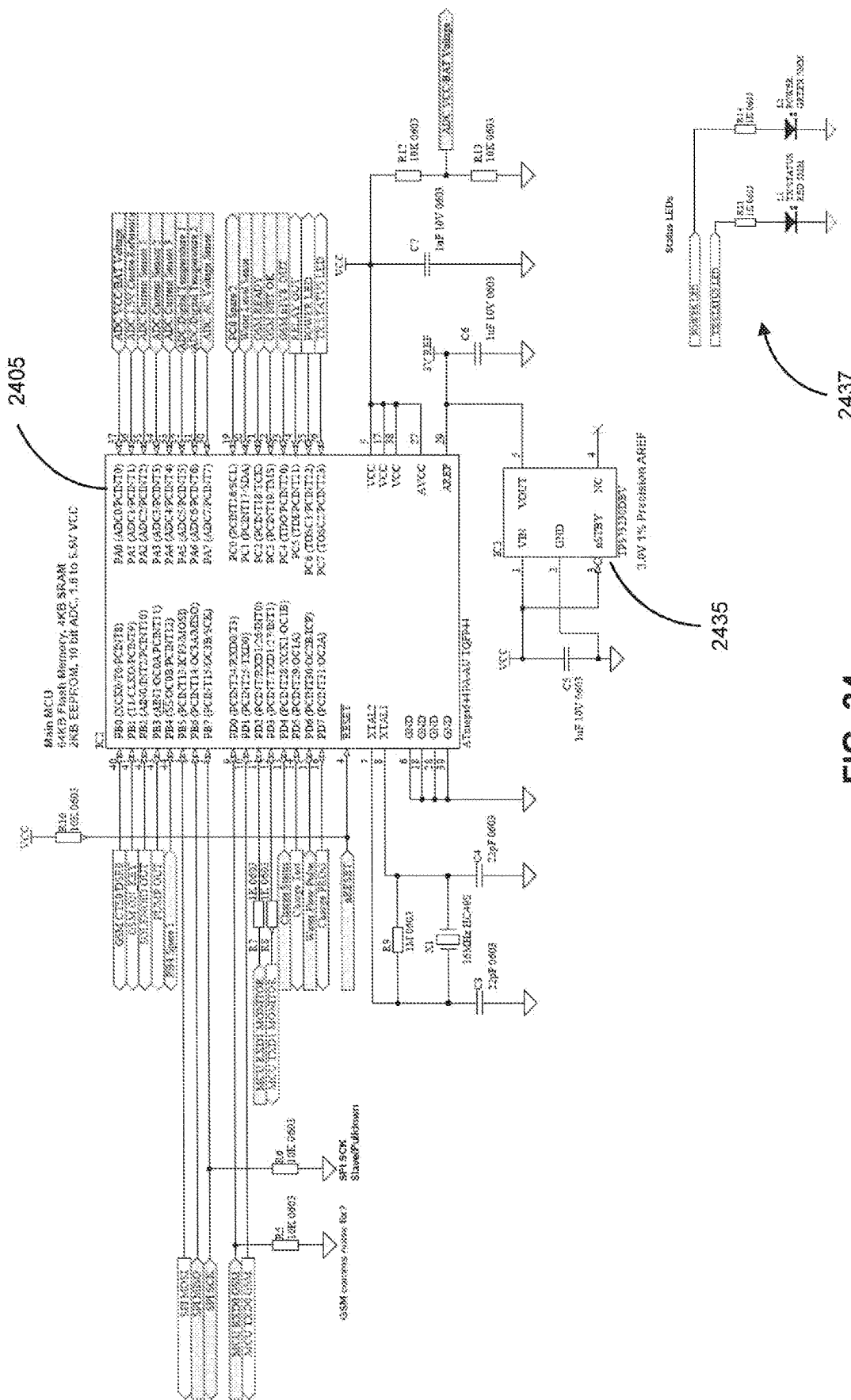
FIG. 24 is a schematic circuit diagram of a microcontroller of the interface device according to some embodiments.

Other microcontrollers may be used to achieve the functionality described herein. Preferably such microcontrollers would be capable of 16 MHz or above operating frequency, provide USB 2.0 (or technical equivalent) support, provide at least eight ADC channels with 10 bit resolution and provide for at least eight I/O peripherals. In particular, an ATmega328P-AC or ATmega644PA-AU (see FIGS. 24 to 34) microcontroller may be used in some embodiments. The ATmega644PA-AU microcontroller is shown in FIG. 24 and described below in further detail.

The following functions are performed by the MCU 505:
1. Listen for command signals (Remote).
2. Communication between modules.
3. Maintain clock signal.
4. Track measuring conversions.
5. Track maintenance cycles.
6. Implement application stack for GPRS.
7. Monitor I/O devices attached to it.
8. Data storage and retrieval.
9. Error recovery.
10. Remote programming Communications Communication between the server 170 and the interface device 130 is via the communication subsystem 260, which may be embodied by the GSM/GPRS processing chip 507 in FIG. 5, for example. Data communication from the interface device 130 to the server 170 may be via General Purpose Radio Service (GPRS) over Global System for Mobile communication (GSM), for example. Alternatively, suitable later generation wireless communication protocols may be used. The communication subsystem 260 also supports SMS based command sets for several other functions, for example to allow remote control of the interface device and/or devices coupled to it. Details of the communication subsystem 260 are expanded upon further in this document. All layers of GSM and TCP/IP stack except for the application stack is handled by the communication subsystem 260.

High Power Measuring Module

The MCU 505 runs at 5V DC. The maximum values that can be measured by the MCU using Analog to Digital convertors (ADCs) are limited to 5V DC. To measure higher voltages, a dedicated DC measurement unit 530 is used that can handle up to 64V and up to 180 A. The output of the DC measurement module 530 is fed directly to the MCU 505 for converting this to meaningful results of measurements The MCU digitises the analogue output of the DC measurement module 530 and then scales the digitised quantity back up to the right proportional amount (e.g. up to 64 V).

Input/Output (I/O) Interface

A number of Input/Output interfaces are made available via an I/O module (not shown) in communication with the MCU 505. The I/O module can interface with external sensors, such as temperature sensors, and communicate the results to the MCU 505. The I/O interface is managed and controlled by the MCU 505.

Battery Control Unit

In some embodiments, the interface device 130 is designed to operate in parasite mode, meaning it can power itself from the same device it is measuring and controlling, such as Photovoltaic Panels (PV Panel or Solar Panel). Due to the varying nature of these source systems, the interface device 130 may not be able to draw enough energy to power itself. For this reason a backup power source is provided using a battery, such as a Lithium Polymer battery, connected to battery terminals 517.

The charging and management of the Lithium Polymer battery should be carefully controlled in order to maximise the life of the battery and also prevent any damage due to excessive draining or over charging of the battery. A dedicated battery control unit 515 is tasked with the function of managing and controlling the battery charge/discharge cycles; battery control unit 515 communicates with the MCU 505 via the central bus.

Clock Source

An external 16 MHz crystal serves as a clock source 545 for the MCU 505. The SMD 16 MHz crystal may be connected to XTAL1 and XTAL2 pins of the MCU 505. The device clock option is set using the Flash Fuse bits of CKSEL[3:0] 0000. For all fuses, "1" means unprogrammed, while "0" means programmed. The capacitors C1 and C2 should always be equal for both crystals. The optimal value of the capacitors depends on the crystal, the amount of stray capacitance, and the electromagnetic noise of the environment. For 8.0 MHz-16.0 MHz frequency crystals, 10 pF-22 pF capacitors should be used.

Programming

A boot loader support pre-configured in MCU 505 provides a real Read-While-Write Self-Programming mechanism for downloading and uploading program code by the MCU 505 itself. This feature allows flexible application software updates controlled by the MCU 505 using a Flash-resident boot loader program. The boot loader program can use any available data interface and associated protocol to read code and write (program) that code into the Flash memory (not shown), or read the code from the program memory. The program code within the boot loader section has the capability to write into the entire Flash, including the boot loader memory. The boot loader can thus even modify itself, and it can also erase itself from the code if the feature is not needed anymore.

The MCU 505 program code can be uploaded to Flash memory by using the loader application via a universal serial bus (USB) port 540, for example. The 8 bits mega AVR microcontroller series from Amtel Corporation can include USB interface devices that are factory configured with a USB boot loader located in the on-chip flash boot section of the controller. This USB boot loader allows the performance of In-System Programming from a USB host controller without removing the part from the system or without a pre-programmed application, and without the need for any external programming interface.

USB connector 540 is mounted on the board for programming and on-site debugging purposes. Pin 2 and 3 of the USB connector 540 is connected to port −D and +D of the MCU 505, respectively. Furthermore, the MCU 505 can also be programmed using a Serial Peripheral Interface (SPI) bus (not shown).

Power Source

The main power source for the device may be supplied by a 3.7V Lithium Polymer battery (not shown). The MCU 505 is capable of operating between 2.7V and 5.5V. The GSM module 507 requires a power source which can supply between 3.4V-4.5V and a spike current of up to 2 A.

Power supply design is important to the GSM module 507. The design guidelines should be followed to ensure suitable performance of the module. The VBAT (VCC) voltage should be at any time: 3.4V<VBAT<4.5V. During the burst transmission period, the current consumption is at the highest. During this period, the VBAT voltage is reduced to its lowest level. This is illustrated schematically in FIG. 7. If the voltage drops below 3.4V, the GSM module will reset. These parameters should be taken into consideration when selecting the power source. A 3.7V Lithium Polymer battery is capable of providing a constant power source operating under these conditions.

The interface device 130 is designed to able to function in parasite power mode. It can draw the required power from the measured (input) source. For example, when measuring power consumption of a Photovoltaic (PV) panel (as one example of an energy conversion system 120), the interface device 130 can draw power from the PV panel to power itself. As the interface device 130 only draws a few milliamps of current under normal operations, the power consumption is very minimal and can be ignored for measuring purposes when working in parasite power mode. When operating in this mode, the interface device 130 is not directly powered from the measured input source as the measured input source may not be capable of providing a suitable steady power supply to the interface device 130. Instead, the measured power source can be used to charge the battery and the interface device 130 is always powered from the battery.

An LM7805 voltage regulator 520 may be used to step down the voltage from the measured input source to 5V DC. As the LM7805 is a linear regulator, some power is lost in heating. The LM7805 should be mounted along with a heat sink on the body of the interface device 130. The LM7805 is capable of stepping down voltage from 7V-35V to 5V DC. Heating increases as the difference between the input and output voltage increases. Ideally, the input voltage is close to 12V where possible. The output of the LM7805 is used to provide DC input to the battery charging circuit, including the battery control unit 515 and battery terminals 517.

The battery charging circuit can be updated to include a 5V power supply, which can be connected directly to the charging circuit (515/517). In this case, the battery will operate as a backup power source.

Charging

Charging and discharging batteries is a chemical reaction. Lithium Polymer (Li-Poly) batteries are very sensitive to over-charging and over-discharging. This could cause permanent damage to the battery. In some cases, a Li-Poly battery can explode if charged at high voltage. Care should be taken when charging Li-Poly batteries.

The Li− ion charger is a voltage-limiting device that is similar to the lead acid system. The difference lies in a higher voltage per cell, tighter voltage tolerance and the absence of trickle or float charge at full charge. While lead acid cells offer some flexibility in terms of voltage cut-off, manufacturers of Li− ion cells are very strict on the correct setting because Li− ion cannot accept over-charge. Most cells charge to 4.20V/cell with a tolerance of +/−50 mV/cell. Higher voltages could increase the capacity, but the resulting cell oxidation would reduce service life. More important is the safety concern if charging beyond 4.20V/cell.

A dedicated battery charging circuit is used to manage the different stages of battery charging. Embodiments of interface device 130 may use the commercially available MAX1555 IC from Maxim Semiconductors as the battery control unit 515. The MAX1555 unit provides a complete electrical interface for charging a single Li-Poly cell in a safe manner and requires no external components except for a few capacitors. The battery control unit 515 may support two charging modes, including USB and DC. DC charging can go as high as 280 mA and support voltages up to 7V. The MAX1555 also provides an active-low open-drain CHG pin that indicates when charging current is over 50 mA. When the battery control unit 515 detects overheating, it will gradually reduce the charging current until it reaches a safe level. If the battery is in a critically discharged state (VBatt<3V), the battery control unit 515 will provide a precharge current of 40 mA so as not to damage it.

The MAX1555 does not require any code to interface with. Its CHG pin can be hooked up to a micro-controller to inform it when battery charging is complete. The MAX 1555 is one example of a battery control unit 515 and can be replaced with other charger integrated circuits, such as MCP73831 from Microchip.

Measuring

One of the main functions of the interface device 130 is to measure the power of a source connected to the input source terminals of the measurement module 530. Power is the rate at which energy is generated or consumed. The kilowatt-hour (kWh) is a unit of energy equivalent to one kilowatt (1 kW) of power expended for one hour (1 h) of time.

Power in Watts is derived by the formula:

$$P = I \cdot V,$$

where P is Power in Watt, I is the current consumption and V is the voltage.

FIG. 6B is a circuit diagram of an example AC measurement unit 630. For current measurement, the current in the input source circuit could be too high to directly measure with a microcontroller interface. A current transformer (CT) is used in this scenario. A current transformer produces a reduced current accurately proportional to the current in the input source circuit, which can be measured. A burden resistor is connected in parallel to the transformer coil. When current flows through this resistor, it produces a voltage drop across the resistor. This voltage drop is measured using an ADC channel of the MCU 505. Using Ohms law, current in the circuit can be calculated, as follows.

$$I = \frac{V}{R}$$

where I is current, V is voltage and R is resistance.

A DC bias is added since the ADC channels of MCU 505 are only capable of measuring positive voltages. The DC component is removed in software using filters as part of digital signal processing (DSP) functions of MCU 505.

For voltage measurements, a step down transformer is used to reduce the line voltage from 110V-250V to 7.5V-12V AC. The secondary coil of the step down transformer is connected to a voltage divider network in order to bring the voltage ranges within the measuring range of ADC channels. Similar to the Current Measurement unit, a DC bias is added in order to keep the range in positive values for measurement purposes.

FIG. 6A is a circuit diagram of the DC measurement unit 530 for use where the measured (input) power is a DC source. There are two parts to the measuring circuit, current and voltage measuring. Three terminals are provided for input source.

For current measuring, a 1Ω shunt resistor (R3) is connected in series between the In (Ext-1) and Out (Ext-2) terminals of the input source. The voltage drop across R3 is measured using the differential Analogue to Digital Convertors (ADC) of the MCU 505. The ADC channels ADC0 and ADC1 are used to measure the differential voltage drop. The current through the resistors can be calculated using Ohms law:

$$I = \frac{V}{R},$$

where I is the current and V is the voltage drop across the shunt resistor. If we use a 1Ω resistor, R is 1.

In a series circuit, the current through each of the components is the same. This means that the current consumed by the input source device is same as the current through R3 since they are connected in series. Measuring the current through R3 will give the current consumption. R3 may be a wirewound resistor. Wirewound resistors are made by winding thin wire onto a ceramic rod. They are extremely accurate for use in measuring devices. They can pass large currents without overheating in high current circuits. A low value of R3, such as 1Ω, may be chosen to minimise energy loss.

For voltage measuring, the ADC of most MCU can only measure analogue voltage less than or equal to the supply voltage (VCC), which is usually 5V. The expected input source voltage in this case is in a much higher range than the 5V., typically 12V or above. A voltage divider network is used to overcome this problem. A voltage divider is a simple linear circuit that produces an output voltage ($V_{Out}$) that is a fraction of its input voltage ($V_{in}$). In this case, $V_{Out}$ is a proportional voltage less than 5V with respect to the input source voltage.

$$V_{out} = \frac{R2}{R2 + R1} V_{in}$$

$V_{out}$ is connected to the ADC channel ADC4 of the MCU 505.

Therefore the source voltage $V_{in}$ can be calculated as follows $$V_{in} = \frac{R2 + R1}{R2} V_{out}$$

The above method is a simple and highly accurate way to measure current and voltage. However, her commercially available integrated circuits based on the Hall Effect or other methods can be used for voltage measuring purposes. Whatever method is used, care should be taken to only provide voltages less than the maximum tolerated voltage (e.g. 5V) to the ADC ports of the MCU 505.

On high current and voltage measurements, a step down transformer can be used to read proportional values rather than measuring the high energy source directly.

Reference Voltage

The output of the ADC is calculated using the following equation:

$$ADC = \frac{V_{in} \cdot 1023}{V_{ref}}$$

In case of differential channels, $$ADC = \frac{(V_{pos} - V_{neg}) \cdot \text{GAIN} \cdot 512}{V_{ref}}$$

From these equations it is clear that the reference voltage $V_{ref}$ plays an important role in getting an accurate ADC reading. If VCC is used as $V_{ref}$, then as the power of the battery deteriorates, the value of $V_{ref}$ will decrease, which will affect the accuracy of the ADC reading. This may produce a false result. In order to avoid this problem, the MCU 505 is programmed to use $V_{ref}$ from the AREF pin of the MCU 505.

A dedicated voltage reference circuit 535 is used to provide a constant voltage reference to the ADC in the MCU 505 for this purpose. Although there are a number of ways to achieve this, some embodiments of interface device 130 use LM3940IT3, a low dropout 3.3V fixed voltage regulator IC. The LM3940 is a true low dropout regulator, and it can hold its 3.3V output in regulation with input voltages between 3.8V-5V. As the Li-Ploy battery operates within this range, a constant reverence voltage of 3.3V can be provided to the MCU 505.

The voltage reference circuit 535 can be improved with a LM336, 2.5V Ref voltage regulator. This monolithic IC voltage reference operates as a low temperature coefficient 2.5V zener with 0.2 W dynamic impedance.

Temperature Measuring

Temperature is one of the important parameters to measure in order to calculate the carbon offset of a renewable energy device such as a solar water heater.

A number of suitable temperature sensors are commercially available today. The most popular ones are the 1-Wire temperature sensor DS18S20 and other Zener based sensors, such as the LM series sensors (LM135). LM135 has a breakdown voltage directly proportional to absolute temperature. These sensors require calibration and are connected to the ADC channel of the MCU 505 for temperature measurements. They require no sophisticated software implementation. The only downside of these sensors is that each sensor requires a dedicated ADC channel. On installations where the number of sensors required is less than 3-5, this is a simpler option.

1-Wire devices only require 2 wires to operate, data and ground. A number of 1-Wire devices can be attached to a single bus forming a 1-Wire network. There is no upper limit to the number of devices that can be attached to a bus. Since all the devices are connected to a single bus (data), only a single port of the MCU is required to operate all the devices attached to the bus. For installations requiring more than 3-5 sensors, this would be the preferred option. The downside to 1-Wire implementation is the requirement of more sophisticated software to drive the 1-Wire devices.

Global System for Mobile Communications (GSM)

Described embodiments of interface device 130 use GSM as the main mode of communication to the server 170. The interface device 130 may incorporate a commercially available ADH8066 GSM module which is capable of General Pocket Radio Service (GPRS). Any GPRS-capable GSM module with a UART (universal asynchronous transmitter/receiver) interface can be used for this purpose.

The GSM module comes pre-assembled with a DF12D 50 pin male connector which can be directly mounted on to a matching female connector on the interface device 130 main PCB. Communication between the MCU 505 and the GSM module 507 is via Full Duplex UART. TX0 (14) and RX0 (16) pins of the GSM module 507 are connected to RX and TX pins of the MCU 505 respectively. A 10K (R6) resistor is used as a pull down resistor to avoid background noise when the GSM module 507 is not powered. AT Commands (Hayes command set) may be used to drive the GSM module 507.

Figure 11:
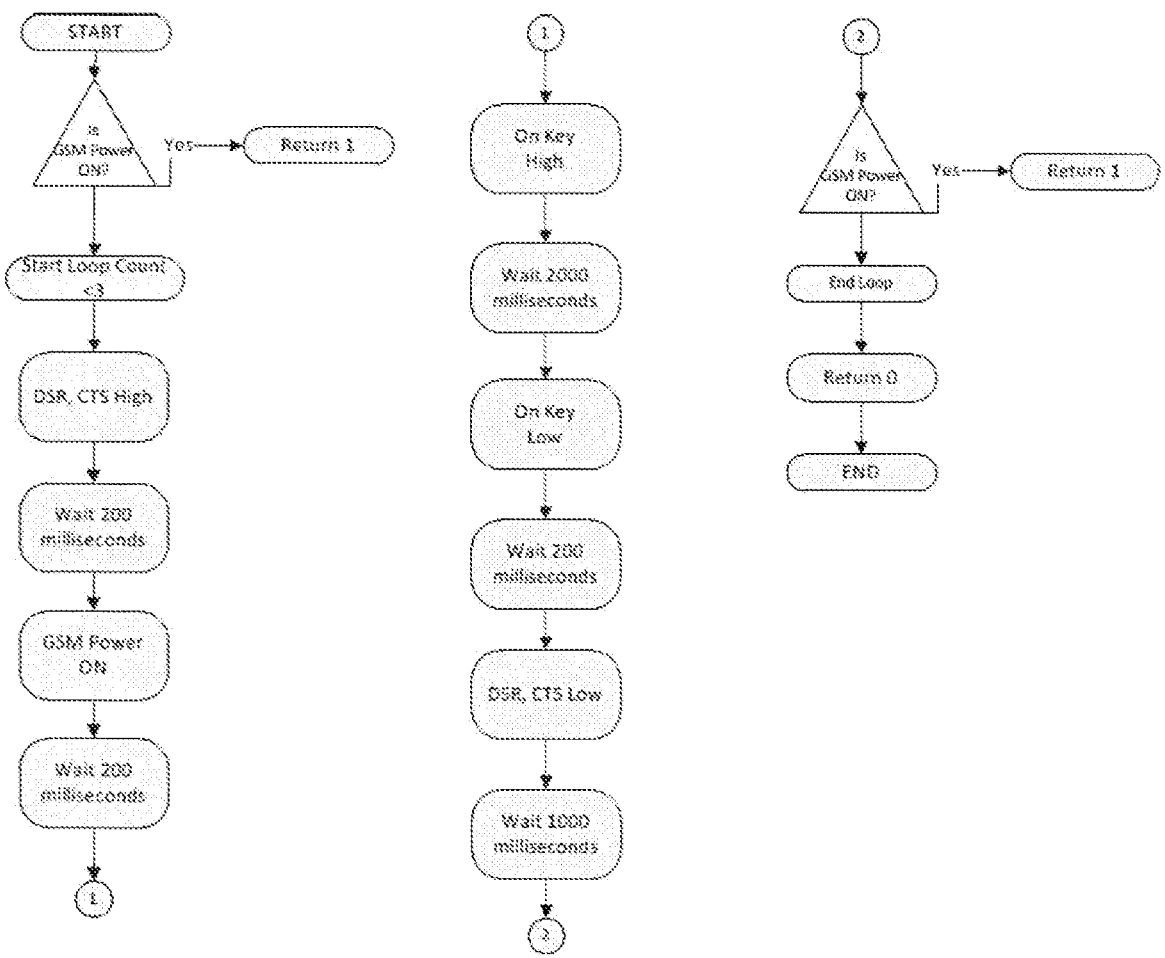
FIG. 11 is a flowchart of a GSM Power ON sequence.

A power-on procedure 1100 for the GSM module is explained in more detail below and shown in the flow chart of FIG. 11. The pin ONKEY (41) of the GSM module 507 is used in the procedure. The procedure involves connecting the ONKEY pin to ground for a specified amount of time using a switch 525, such as a transistor. An NPN transistor BC639 may be used for this purpose. The ONKEY control pin PB1 of the MCU 505 is connected to the base of the transistor 525. The ONKEY pin on the GSM module 507 is connected to the collector of the transistor 525, while its emitter is connected to ground. This way, a high signal on PB1 can drive the switch transistor 525 and thereby pull the ONKEY pin on the GSM module 507 to ground to turn on or off the GSM module 507.

In order to activate the AT command set, during the power-on procedure, pins CTS0 and DSR0 of the GSM module 507 need to be driven high for a short period. This is achieved by connecting these pins to pin PB2 of the MCU 505.

The pin 1.8V (31) of the GSM module 507 produces a 1.8V voltage with respect to ground when the module is powered-on. The power-on status of the GSM module 507 is monitored by the MCU 505 using the pin 1.8V (pin 31), which is connected to ADC channel ADC5 of the MCU 505.

An external radio antenna (not shown) is mounted within or externally of the housing of the interface device 130. The antenna may be connected to the GSM module 507 via a U.FL RF connector, for example.

A number of other communication methods can be used to communicate between the interface device 130 and the server 160, such as a direct network (TCP/IP) connection or USB to a computer, which in turn connects to the server 160. For remote location monitoring, satellite communication modules can be used instead of the GSM module 507. A GSM module was chosen for this design since access to GSM networks is widely available and the coverage area is growing rapidly.

Software Design

Memory Management

Microcontrollers have very little memory compared to modern-day computers. Due to this limitation, memory management should be an important consideration with designing complex microcontroller based devices.

The Amtel AVR architecture of MCU 505 has two main memory spaces, the Data Memory and the Program Memory space. In addition, some such MCUs feature an EEPROM (electrically erasable programmable read only memory) for data storage. All three memory spaces are linear and regular.

The ATmega32U4 microcontroller used as the MCU 505 in some embodiments contains 32K bytes On-chip In-System Reprogrammable Flash memory for program storage. Since all AVR instructions are 16 or 32 bits wide, the Flash is organized as 16K×16. For software security, the Flash Program memory space is divided into two sections, a Boot Program section and an Application Program section.

Flash Memory

The Flash memory has an endurance of at least 100,000 write/erase cycles. The Program Counter (PC) of the MCU 505 may be 16 bits wide, thus addressing the 32K program memory locations.

SRAM Data Memory

MCU 505 has a static random access memory (SRAM), which provides data remanence while still being volatile. The ATmega32U4 is a complex microcontroller with more peripheral units than can be supported within the 64 location reserved in the Opcode for the IN and OUT instructions. For the Extended I/O space from $060-$0FF in SRAM, only the ST/STS/STD and LD/LDS/LDD instructions can be used.

Figure 8:
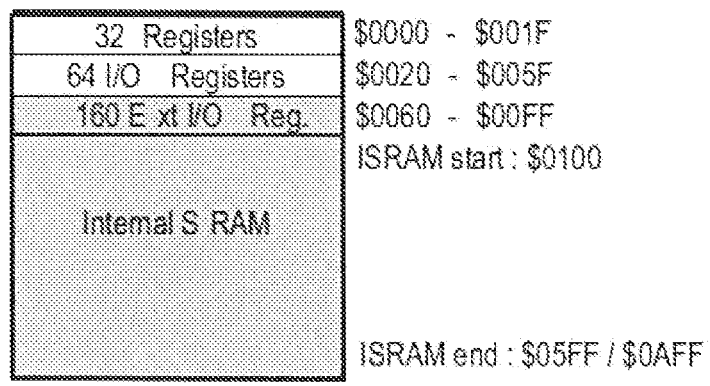
FIG. 8 is a schematic illustration of an example data structure of a SRAM memory of the interface device.
Figure 9:
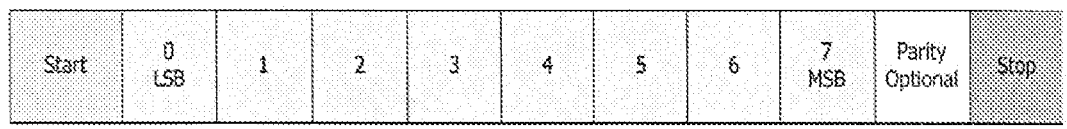
FIG. 9 is a schematic illustration of an example of character framing in serial communication performed by the interface device.

The SRAM data memory is illustrated schematically in FIG. 8. The first 2,816 Data Memory locations address the Register File, the I/O Memory, Extended I/O Memory, and the internal data SRAM. The first 32 locations address the Register file, the next 64 location the standard I/O Memory, then 160 locations of Extended I/O memory and the next 2,560 locations address the internal data SRAM.

The five different addressing modes for the data memory cover: Direct, Indirect with Displacement, Indirect, Indirect with Pre-decrement, and Indirect with Post-increment. In the Register file, registers R26 to R31 feature the indirect addressing pointer registers. The direct addressing reaches the entire data space.

The Indirect with Displacement mode reaches 63 address locations from the base address given by the Y- or Z-register. When using register indirect addressing modes with automatic pre-decrement and post-increment, the address registers X, Y, and Z are decremented or incremented. The 32 general purpose working registers, 64 I/O registers, and the 1.25/2.5 Kbytes of internal data SRAM in the ATmega32U4 are all accessible through all these addressing modes.

EEPROM Data Memory

The ATmega32U4 microcontroller used as the MCU 505 in some embodiments contains 1K bytes of data EEPROM memory. It is organized as a separate data space, in which single bytes can be read and written. The EEPROM has an endurance of at least 100,000 write/erase cycles. The access between the EEPROM and the CPU is described in the following, specifying the EEPROM Address Registers, the EEPROM Data Register, and the EEPROM Control Register.

Serial Peripheral Interface—SPI

The Serial Peripheral Interface (SPI) allows high-speed synchronous data transfer between the MCU 505 and other peripheral devices. SPI supports full duplex communication. In the MCU 505, the SPI can be used for In System Programming.

UART/Transmitting and Receiving Serial Data

The Universal Asynchronous Receiver/Transmitter (UART) takes bytes of data and transmits the individual bits in a sequential fashion. At the destination, a second UART re-assembles the bits into complete bytes. Each UART contains a shift register which is the fundamental method of conversion between serial and parallel forms. Communication may be "full duplex" (both send and receive at the same time) or "half duplex" (devices take turns transmitting and receiving).

Character Framing

Each character is sent as a logic low start bit, 8 number of data bits, an optional parity bit, and one or more logic high stop bits. The start bit signals the receiver that a new character is coming. The next eight bits represent the character. Following the data bits may be a parity bit. The next one or two bits are always in the mark (logic high, i.e., '1') condition and called the stop bit(s). They signal the receiver that the character is completed. Since the start bit is logic low (0) and the stop bit is logic high (1), then there is always a clear demarcation between the previous character and the next one. This is illustrated schematically in FIG. 9.

Programming Language

MCU 505 can be programmed using low level languages such as C or Assembly. It can also be a combination of both. The described interface device 130 may use a combination of both C and Assembly for its software implementation. Assembly/In-line Assembly is used where timing is critical. The number of MCU cycles to execute an instruction can be carefully tailored to meet timing requirements.

Main Program Flow

Figure 10:
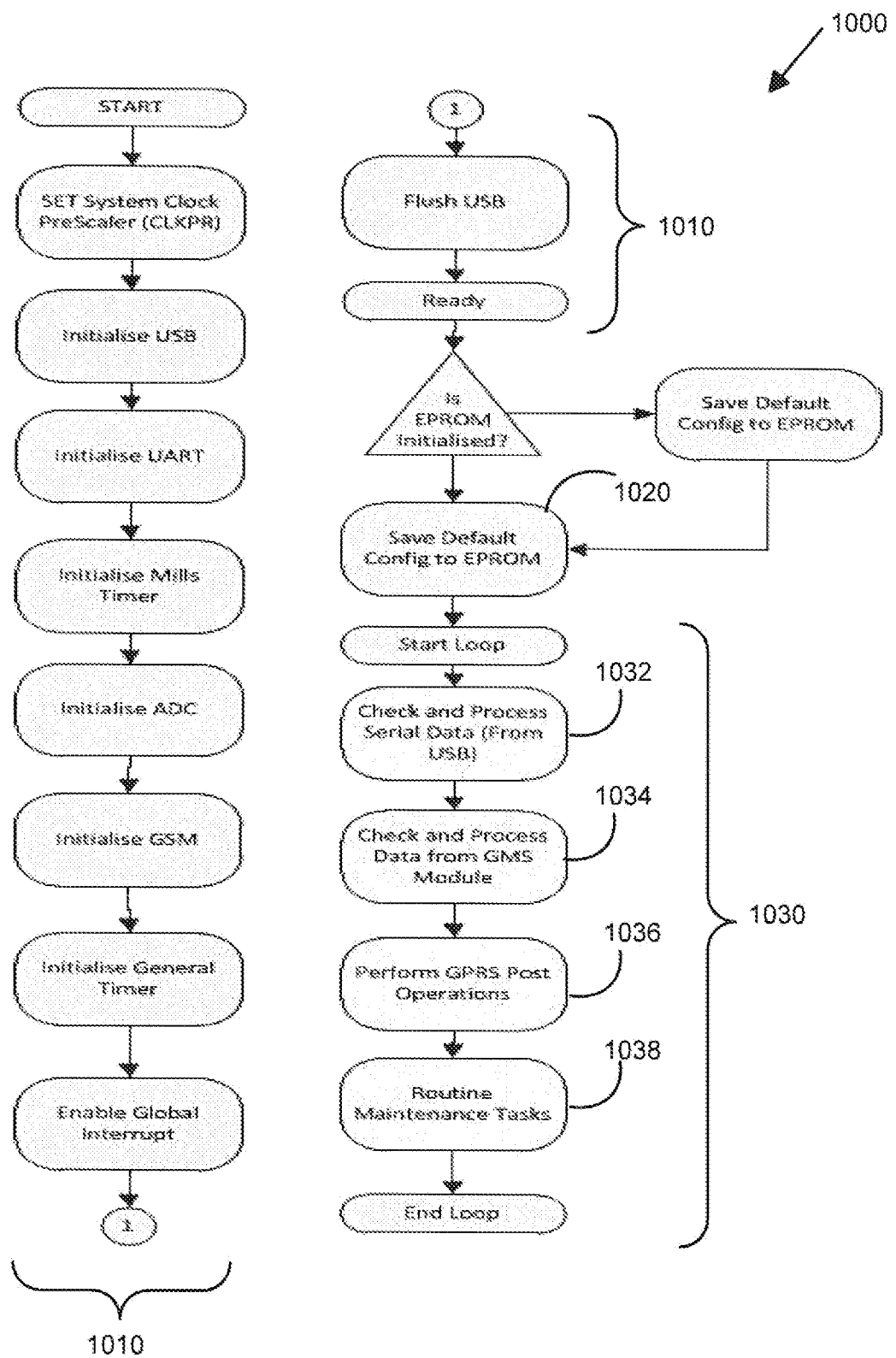
FIG. 10 is a flowchart of a method of operation of the interface device according to some embodiments.

The main program flow 1000 of the control methodology of the interface device 130 is illustrated by the flowchart in FIG. 10. A series of initialising steps 1010 are executed first in order to set up the interface device from a de-powered state, after which a default configuration is saved to the EEPROM at 1020 and a monitoring, control and communication loop 1030 is executed in order to provide the main monitoring, control and communication functions of interface device 130 described herein.

System Clock Prescaler

The MCU 505 has a system clock prescaler, and the system clock can be divided by setting the Clock Prescaler Register—CLKPR. This feature can be used to decrease the system clock frequency and the power consumption when the requirement for processing power is low. As one of the initialising steps 1010, the system clock prescaler is set. The interface device 130 uses the full power of the MCU 505 by setting the CLKPR to zero.

Program Memory Utilities

The MCU 505 may feature 32K bytes of Program (Flash) memory. Not all of this is used to store the program (software) itself. As the amount or SRAM and other memory available is limited, the program memory may be used, where possible. A number of functions are available from the <avr/pgmspace.h> function library for AVR series microcontrollers. This library provides interfaces for a program to access data stored in Program space (Flash memory) of the interface device 130.

Initialise USB

MCU 505 may have a USB output that can be used for programming, debugging or for Serial Communication with a PC or a Server. The required initialising sequence is executed as one of the initialising steps 1010 to make the USB ready and recognisable by the host system.

The MCU may be capable of auto baud for USB communications. All test and debugs were performed on 9600 baud. Baud is symbols per second or pulses per second. It is the unit of symbol rate, also known as baud rate or modulation rate.

Initialise UART

The hardware UART interface of the MCU 505 is initialised as one of the initialising steps 1010, along with UART data receive interrupt. The TX and RX pins of the MCU 505 are now ready to Transmit and Receive data respectively. A Baud rate of 115200 is used to communicate with the GSM module.

The general formula to derive UBRR is:

$$UBRR=(((F\_CPU/(USART\_BAUDRATE*16UL)))-1)$$

Where F_CPU is the frequency which is 16 MHz (16000000 Hz) and USART_BAUDRATE is 115200.

In testing of the interface device 130, it was found that when UBRR was calculated using the above formula; the communication with GSM was not stable. In order to rectify this issue, a new formula was used as follows:

$$UBRR=(((F\_CPU)+8*(USART\_BAUDRATE))/(16*(USART\_BAUDRATE))-1)$$

The send and receive buffers are also initialised at this stage.

Initialise Millistimer

The only mode of communication with the GSM module 507 is via UART. When a command is sent to the GSM module 507 or when the MCU 505 needs to wait for data from the GSM module 507, the MCU 505 waits for a specified amount of time. Once this time elapses with no response from the GSM module 507, the MCU 505 resumes by processing the next operation. This could be a recovery task. If the timeout was specified, the MCU 505 could wait forever in the event of a GSM command failure. In order to avoid this problem, a timeout is implemented for each command call to the GSM module 507. If the GSM module 507 does not return within the timeout period, the MCU 505 resumes its operations.

The millistimer is a timer which counts the number of milliseconds elapsed since the MCU was powered on. This can be used to implement timeout functions or any counter that requires milliseconds. Timer 0, which can be an 8 bit timer, is used for timing the timeout period. The initialise function configures this time and the required global variables to hold the millisecond counter as one of the initialising steps 1010. The counter variable may be a 32 bit integer. The counter will reset every 49 days since the maximum value it can hold is 0xFFFFFFFF (4294967295).

Initialise Analogue to Digital Conversion (ADC)

Analogue to digital conversion is a process of converting analogue signals to the digital equivalent. The output of the DC or AC measurement unit 530/630 is an analogue signal. The MCU 505 has a number of ADC channels to read this information and convert it into a digital equivalent for internal conversion and calculations.

As one of the initialising steps 1010, the ADMUX and ADCSRA registers are used to configure the ADC channels. During the initialisation process, the digital input buffer on the corresponding ADC pins are disabled. This reduces power consumption in the input buffer. The ADMUX register is configured to use an external reference and the ADCSRA register is configured to use a pre-scaler of 128 and to enable ADC.

Initialise Global System for Mobile Communication (GSM)

The corresponding MCU pins for GSM module 507 pins POWRER, ONKEY and DSR-CTS are configured as output pins, which control the GSM module 507. As one of the initialising steps 1010, the default settings are enabled by setting the MCU pin for DSR-CTS to High and the MCU pin for ONKEY to Low. Following this, the Power-On procedure 1100 is initiated, as illustrated in FIG. 11.

On successful power-on, the GSM module 507 is issued with an 'AT' command. If an 'OK' result is returned by the GSM module 507, the GSM module 507 is ready to accept further commands. At this stage in the initialising procedure 1010, the EEPROM is checked for a SIM (subscriber identity module) pin. If available, the GSM module 507 is supplied a SIM pin using the command 'AT+CPIN'.

Initialise ADC Timer

In order to calculate the power consumption at the input source, the voltage and current should be measured at a regular interval, for example every second. It is important that frequency of measurement is accurate in order to maintain the accuracy of the power measurement performed by the interface device 130. To achieve this, a dedicated timer is initialised for the ADC channels as one of the initialising steps 1010. Timer1, a 16 bit timer is used here. An Output Compare Interrupt is enabled which will fire every second.

Initialise General Purpose Timer

A number of general activities are carried out at regular intervals. This includes responding to GSM requests which were queued, clean-up operations and posting data to the server 170. As one of the initialising steps 1010, a timer Timer3 is initialised to fire an Output Compare Interrupt after each pre-set interval, which may be every 4 seconds, for example.

Global Interrupts

Interrupts are only enabled if the Global Interrupt Flag is set. Until this point all the interrupts are configured and ready to action. Once the Global Interrupt Flag is set as part of steps 1010, all interrupts which where were previously configured will be enabled. This is done by calling the function sei( ).

Flush USB

The USB may contain operating system or other software commands in the buffer. During the initialisation process 1010, this buffer is cleared. This will ensure any orphaned commands are cleared, making room for new commands.

EEPROM Default Value Check

The ATmega32u4 microcontroller used as the MCU 505 in some embodiments features 1K bytes (1024) internal EEPROM. Unlike other memories within the MCU 505, data written to the EEPROM are stored permanently, meaning the data is retained in the EEPROM memory even if the device is switched off. For this reason, the interface device configuration information is stored within the EEPROM. During the initialisation process, an EEPROM flag, configuration set flag is checked at step 1020. If the flag is not set, default configuration values are loaded into the EEPROM. If the flag is set, this step is ignored.

Infinite Loop

The main monitoring, control and communication functions start when the main function loop 1030 is initialised by the MCU 505, following the EEPROM flag check. The functions will be terminated once this main function loop 1030 completes execution. This is generally not desirable for normal functioning of the interface device 130 as it is generally intended that the interface device will run 24 hours a day until the power is switched off. This is achieved by running an infinite (endless) loop within the main function loop 1030.

Operational Status Flags

There are 3 global operational status flags, GSMDataFlag, PostDataFlag and MaintenanceFlag. These flags are enabled by different parts of the main function loop 1030 when a particular activity is queued.

GSMDataFlag

The GSMDataFlag is set when a GSM command is available in the GSM data buffer. This could be a command received from server 170 via SMS or GPRS.

PostDataFlag

The general purpose timer interrupt is responsible for setting this flag. Every 5 minutes this flag is enabled by the timer interrupt.

MaintenanceFlag

This flag is also set by the general purpose timer interrupt. Maintenance activities are carried out every 2 minutes, therefore this flag is set by the general purpose timer every 2 minutes.

Check and Process Serial Data (Function 1032)

Data from the Serial Port (USB) is used for command processing for fault finding and debugging purposes. This process is activated when Data Transmission Ready (DTR) is enabled on the serial port. The process waits for data to be present in the serial buffer. No action is performed until the delimiter character ';' is sent to the buffer. Character ';' is the command terminator. Once a command is received, the control is passed on to the function processRequest( ) for further action to be taken. The process control by default waits for data to arrive in the serial data buffer. It exits the wait only if other operational status flags are set. The serial (USB) port can be used for communication with a PC/Server which can act as a command centre for the device.

Check and Process GSM Data (Function 1034)

When data arrives from the GSM module 507, it is placed in the GSM data buffer (UART Buffer). When this happens, the operational status flag GSMDataFlag is set. Once the GSMDataFlag is set, the process control moves to GSM data processing.

At this stage, the GSMDataFlag is cleared and the function getATResultWithTimeout is called to retrieve GSM data from the buffer. On retrieval of data from the buffer, control is passed on to the function processRequest( ) for further action to be taken.

Data Post Process (Function 1036)

When the operational status flag for 'PostDataFlag' is set by the general purpose timer the process control moves to this Process. This happens every 5 minutes. At this stage the flag is cleared the function postData( ) is called for further processing.

Maintenance Process (Function 1038)

The operational status flag for maintenance function 'MaintenanceFlag' is set every 2 minutes by the general purpose timer. When this flag is set, the process control moves to the Maintenance Process.

At this stage, the 'MaintenanceFlag' is cleared and maintenance activities are performed. The only activity currently active is to process any SMS requests which are pending. If the interface device 130 is not performing any active tasks when an SMS request is received, it will process it straight away; else it is queued for processing at a later stage. GPRS requests can also be processed at this stage.

Function definitions are provided below for the main functions of the MCU 505 performed during the main function loop 1030.

Main MCU Function Definitions:
    uint8_t MaintenanceFlag (void)
    uint8_t PostDataFlag (void)

uint8_t GSMDataFlag (void)
uint8_t SerialDataFlag (void)
void send_str_p (const char *s)
void send_str (const char *s)
uint8_t recv_str (char *buf, uint8_t size)
void saveDefaultConfigValues (void)
uint8_t processRequest (char *req, uint8_t origin)
void postData ( )
uint8_t processSMSRequest (char *req)
uint8_t processGSMRequestBuffer (void)
double getVoltage (void)
double getCurrent (void)
double getGSMVoltage (void)
double measurePower (void)
double calcACPowerHPF (uint16_t division)
MaintenanceFlag( )
Parameters
    None
Return
    uint8_t: 'MaintenanceFlag' status
Description
    This function returns the status of the operational status flag 'MaintenanceFlag'
PostDataFlag( )
Parameters
    None
Return
    uint8_t: 'PostDataFlag' status
Description
    This function returns the status of the operational status flag 'postDataFlag' and the logical AND of the inverse of the output from MaintenanceFlag( ). This ensures that if a Maintenance operation is underway, the PostData( ) function will wait for it to complete.
GSMDataFlag( )
Parameters
    None
Return
    uint8_t: 'GSMDataFlag' status
Description
    This function returns the status of the operational status flag 'gsm_DataFlag' and the logical AND of the inverse of the output from MaintenanceFlag( ) and the logical AND of the inverse of the output of 'PostDataFlag( )'. This ensures that if the Maintenance or PostData function is underway, the GSM data handlers will wait for it to complete.
SerialDataFlag( )
Parameters
    None
Return
    uint8_t: 'SerialDataFlag' status
Description
    This function returns the logical AND between USB control handle, DTR, the inverse of GSMDataFlag( ), the inverse of PostDataFlag( ) and the inverse of MaintenanceFlag( ). This ensures that if any of the other flags are set, those functions take priority.
send_str_p(const char *s)
Parameters
    const char *s: Pointer to character array in Program Space.
Return
    Void
Description
    This function sends a character array to the USB serial port. Note, PSTR should be used to wrap the characters in for this function as the array will reside in Program Space.
send_str(const char *s)
Parameters
    const char *s: Pointer to character array
Return
    Void
Description
    This function sends a character array to the USB serial port.
recv_str (char *buf, uint8_t size)
Parameters
    const char *s: Pointer to character array buffer
    uint8_t size: Size of buffer
Return
    uint8_t: Number of characters in buffer
Description
    This function receives a character array from the USB serial port. This function will wait for the terminating character ';' or until the buffer is full.
saveDefaultConfigValues (void)
Parameters
    None
Return
    Void
Description
    This function saves the default device configuration to EEPROM.
    Values saved are:
    EEPROM_ADDR_GSM_SIM_PIN: GSM PIN
    EEPROM_GSM_APN: APN Server Name
    EEPROM_GSM_APN_USERNAME: APN Server Username
    EEPROM_ADDR_GSM_APN_PASSWORD: APN Server password
    EEPROM_ADDR_GSM_DOMAIN: Data Server Domain
    EEPROM_ADDR_GSM_HTTP_GET: Data Server API
    EEPROM_ADDR_INITIAL_CONFIG_FLAG: Set Config Save flag
processRequest (char *req, uint8_t origin)
Parameters
    char: Request string
    uint8_t: Origin of the request (REQ_ORIGIN_SERIAL, REQ_ORIGIN_GSM)
Return
    Void
Description
    Requests originating from the serial port (USB) 540 or GSM module 507 are processed with this function. The request command is interpreted and appropriate action is taken. The parameter origin identifies the request origin and the request string contains the raw request. All serial requests should start with the qualifier 'CT-'. If this qualifier is not found, the function returns an error and the request will be ignored. All commands should be terminated with the terminating character ';'.
Serial Commands:

| Command | Action |
| --- | --- |
| CT-ON; | Power on GSM Module 507 |
| CT-OF; | Power off GSM Module 507 |

| Command | Action |
|---|---|
| CT-AT<Command String>; | Send AT commands to GSM Module 507. Command string can be up to 128 characters long. |
| CT-SMS<Number>,<Message>; | Send SMS. Number can be up to 25 character and Message up to 100 characters. |
| CT-HTTP<Message>; | Send HTTP message via GPRS. Pre-configured connection settings from EEPROM are used to establish a connection with the server 170. Message string can be up to 128 characters. |
| CT-ERM<Address>, <Value>; | Write to device EEPROM. Address up to 4 characters and Value of up to 128 characters should be supplied. |
| CT-ADC; | Returns the present value of GSM voltage, Input Source Voltage reading, Input Source Current usage and accumulated Power consumption since the last post to the server 170. |
| CT-POS; | Post the current data (Accumulated Power consumption) to the server 170. |
| CT-MAN; | Force a maintenance cycle. |
| CT-<Message> | Send custom message to the GSM Module 507. Message can be up to 128 characters in length. |

A GSM request does not require a qualifier.
GSM commands:

| Command | Action |
|---|---|
| +CMT; | Process SMS commands in buffer. | postData (void)
Parameters
    None
Return
    Void
Description
    Power usage data and other data collected are stored within the device. This function posts the collected data to the central server 170 via HTTP (or another protocol, as described below) over GPRS.
    The API format for HTTP post to the server 170 is set by the interface device 130 configuration stored in the EEPROM. The required device data values are substituted within the HTTP string and sent to the function sendHTTPGet( ) for further processing.
    Power usage is calculated periodically, for example every second, and regularly posted to the server 170. Power usage values are stored in registers in the calculation interface 220 are reset once they are posted to server 170 due to the limitation in storage capacity within the interface device 130. To maintain the accuracy of the measurement, when this function is performing a server post operation, an offset value is calculated for power usage that occurred during the server post operation. This is because posting the calculated power usage to the server 170 may take several seconds, in which time more power usage may occur and may need to be calculated. Power calculated for the time period taken to post the previous data to the server 170 is stored in a buffer and then the registers are reset to the power value stored in the buffer.
processSMSRequest(char *req)
Parameters
    char *req: Pointer to SMS request character array
Return
    uint8_t: Return zero if successful
Description
    Process SMS Request from the request stream.

Request Commands:

| Request | Action |
|---|---|
| +STATUS: | Send the present Current and Voltage readings to the number where the SMS originated. | processGSMRequestBuffer (void)
Parameters
    Void
Return
    uint8_t: Return non-zero if successful
Description
    Requests that arrive via the GSM module 507 are buffered on the GSM module 507 if the interface device 130 is performing another operation at that time. These requests are processed during the maintenance operation. All requests are processed and cleared on successful completion.
getVoltage (void)
Parameters
    Void
Return
    double: Voltage reading in volts
Description
    A raw voltage reading is read from the function readADC( ). readADC( ) function returns the ADC reading with respect to the proportionated voltage in the respective channel. Depending on the method used to derive the voltage proportions, this function calculates the actual voltage in volts (v).
getCurrent(void)
Parameters
    Void
Return
    double: Current reading in Amps
Description
    ADC channels in the MCU 505 can measure voltages with respect to the reference voltage provided. However, current readings are derived by measuring the voltage drop across a sense resistor or by measuring the voltage drop across a burden resistor of a CT sensor.
    A raw current reading is read from the function readADC( ). Depending on the method used to measure current, this function calculates the actual current in Amps.
getGSMVoltage(void)
Parameters
    Void
Return
    double: GSM Voltage in Volts Description This function returns the GSM Voltage by measuring the input channel connected to the 1.8 v GSM pin.
measurePower(void)
Parameters
  Void
Return
  double: Power (energy) in Watts
Description This function internally calls the function getVoltage( ) and getCurrent( ) to calculate the power usage of the measured input source (i.e. energy output 125). This function is called periodically, for example every second, to calculate the Watts/Second usage, which is then extrapolated to Kilowatt hour (KWh).
calcACPowerHPF (uint16_t division)
Parameters
  uint16_t division: Divisional factor to calculate the power in KWh. If the reading is taken every second, the value of division will be 3600.
Return
  None
Description This function calculates the Real Power, Apparent Power and Power Factor of the AC input source. It is called periodically, for example every 2 seconds with a divisional factor of 1800 to calculate KWh. DC bias is removed from the ADC signal by using transform functions and smoothing in a 1500 iterative loop. The high pass filter is based on DC offset removal as described in AVR465 from Atmel.

$$y[n]=0.996 \times y[n-1]+0.996 \times x[n]-0.996 \times x[n-1]$$

Real Power=Apparent Power*cos ☐Ø cos ☐Ø=Power Factor $$\text{Real Power} = \frac{1}{N}\sum_{n=0}^{N-1} V_{ins} * I_{ins}$$

Apparent Power=$I_{rms}*V_{rms}$ $$I_{rms} = \sqrt{\frac{\sum_{n=0}^{N-1} I^2(n)}{N}}$$

$$V_{rms} = \sqrt{\frac{\sum_{n=0}^{N-1} V^2(n)}{N}}$$

Functions of the GSM module 507 are described in further detail below.
GSM—Function Definitions
  uint8_t checkGSMPowerOnStatus (void)
  uint8_t executeGSMATCommand (const char *command, uint16_t timeout, uint8_t check, const char * checkValue, char *buf)
  uint8_t getATResultWithTimeout (char *buf, uint16_t timeout, const char *searchStr)
  uint8_t initGSM (void)
  uint8_t powerONGSM (void)
  uint8_t powerOFFGSM (void)
  uint8_t sendHTTPGet (char *data)
  uint8_t sendSMS (char *number, char *message)
  void setInitialGSMParameters (void)
  checkGSMPowerOnStatus(void)
Parameters
  Void
Return
  double: Returns 1 if the GSM module is powered on, else returns 0
Description This function reads the voltage at the 1.8 v pin of the GSM module 507. If the voltage is greater than 1.8 v, the function returns 1, else it returns 0. Voltage is read using the function getGSMVoltage( ).
executeGSMATCommand (const char *command, uint16_t timeout, uint8_t check, const char *checkValue, char *buf)
Parameters
  const char* command: AT Command
  uint16_t timeout: Timeout in milliseconds
  uint8_t check: Check flag
  cpnst char* checkValue: Check value from response
  char* buf: Response buffer
Return
  uint8_t: Number of characters in the response buffer.
Description This function is responsible for all AT command exchange with the GSM module 507. This function terminates when the GSM module 507 is not powered on. Commands are passed to the GSM module 507 via UART and if the check flag is enabled, the function will wait for a response from the GSM module 507 until one of the following conditions is true:
  The response stream matches the terminating string in checkValue.
  Timeout occurs, execution time>timeout.
  The function getATResultWithTimeout( ) is called to retrieve the response from the GSM module 507. The response stream is copied to the response buffer.
getATResultWithTimeout (char *buf, uint16_t timeout, const char *searchStr)
Parameters
  char* buf: Response buffer
  uint16_t timeout: Timeout in milliseconds
  char* searchStr: Process terminating string from the response stream.
Return
  uint8_t: Number of characters in the response buffer.
Description Once called, this function constantly monitors the response from the GSM module 507 by checking the status of UARTDataInReceiveBuffer( ). It waits until one of the following conditions is true: the response stream matches the terminating string in searchStr; or timeout occurs, execution time>timeout.

Figure 12:
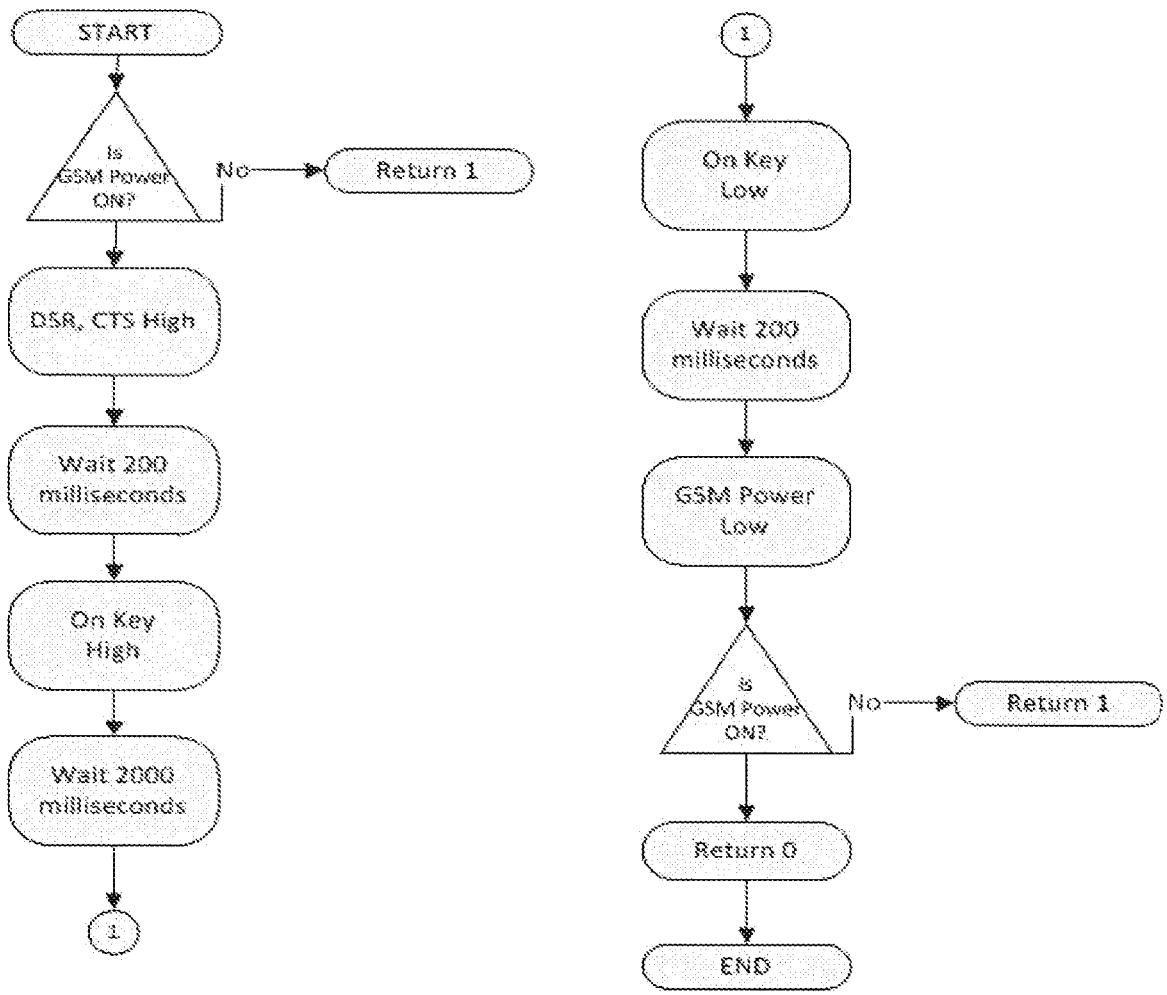
FIG. 12 is a flowchart of a GSM Power OFF sequence.
Figure 13:
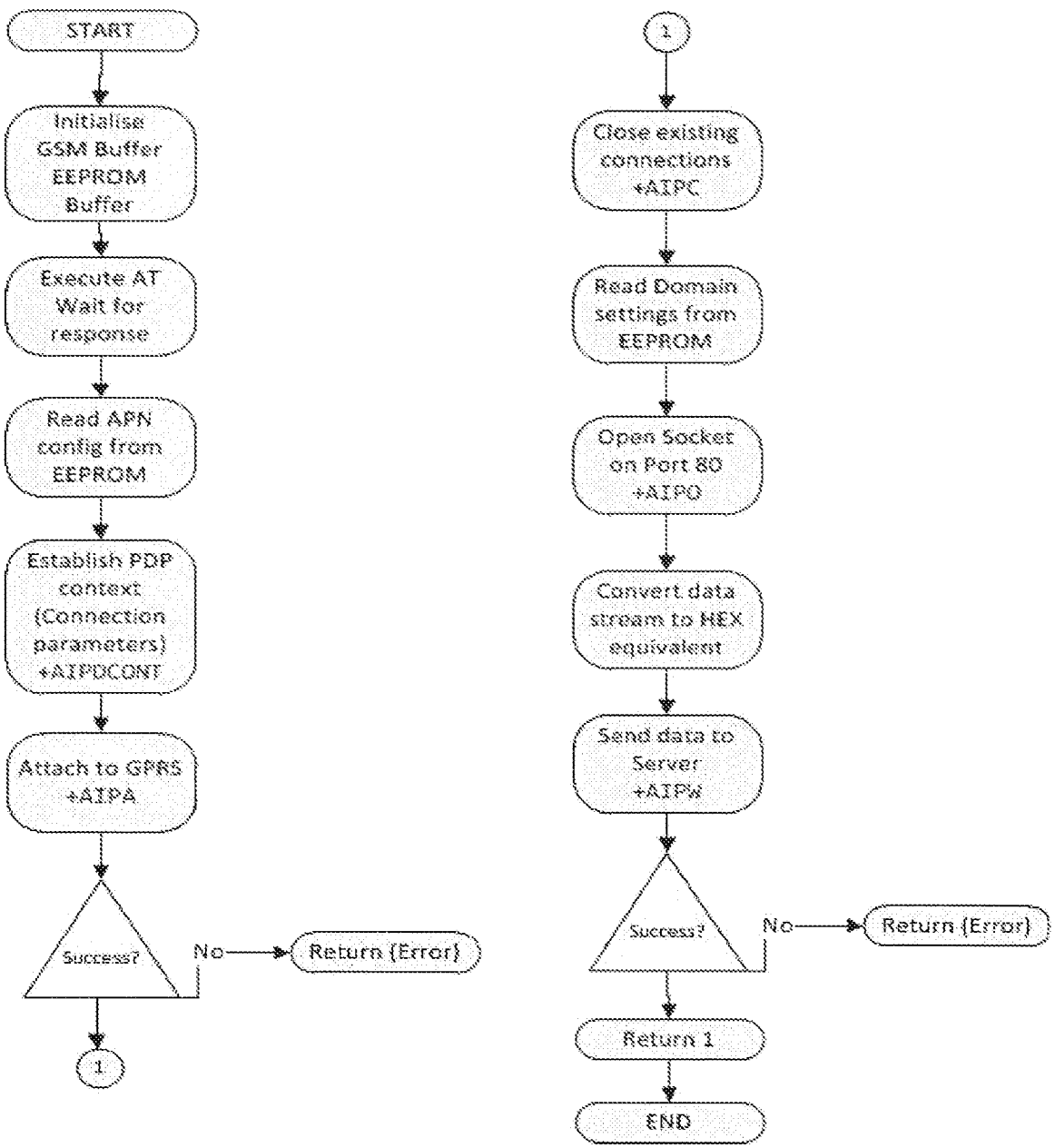
FIG. 13 is a flowchart of a method of sending data from the interface device to a remote server.
Figure 14:
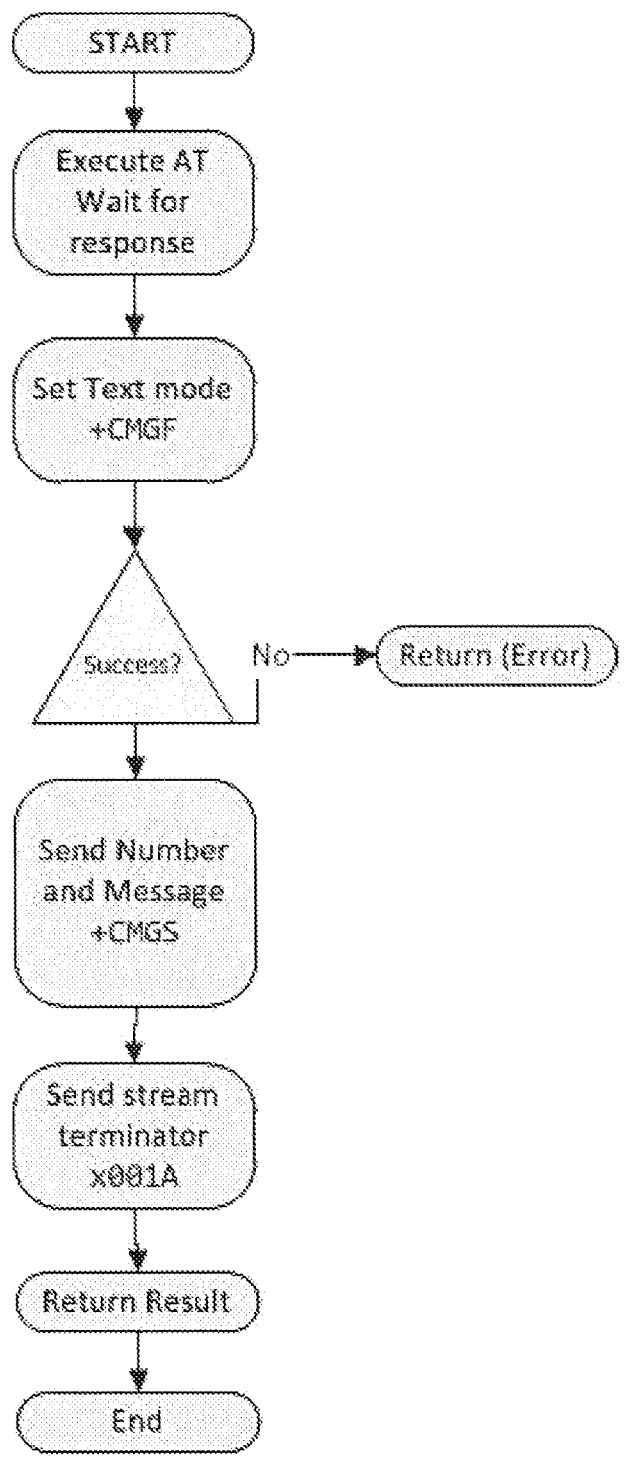
FIG. 14 is a flowchart of a method of sending a text message to a remote device or network node from the interface device.

In order to improve the string compare efficiency, each character which is read from the stream by the UART interface is compared against searchStr. Once a match is found, the searchStr index is incremented until there is a complete string match.
initGSM (void)
Parameters
  None
Return
  uint8_t: Non-zero value on successful initialisation.
Description MCU pins required for GSM communication are initialised here.

powerONGSM (void)
Parameters
　None
Return
　uint8_t: Non-zero value on successful initialisation.
Description
　This is the GSM power on sequence 1100 as depicted in FIG. 11:
powerOFFGSM (void)
Parameters
　None
Return
　uint8_t: Non-zero value on successful initialisation.
Description
　This is the GSM power off sequence 1200 as depicted in FIG. 12:
sendHTTPGet (char *data)
Parameters
　char * data: Data to be sent via HTTP to the server
Return
　uint8_t: Non-zero value if successful.
Description
　Data to the server 170 is sent by accessing the server Application Program Interface (API). This can be done by using HTTP Get or Post functions. This function implements the Get method. The GSM module 507 handles the lower layers of the TCP layer except for the application layer. The process 1300 shown in FIG. 13 depicts the application layer implementation along with the HTTP get method. The raw HTTP get format is stored on EEPROM (HTTP 1.1). The process/function calling sendHTTPGet( ) is responsible to pass a valid data stream in the correct HTTP 1.1 format.
sendSMS (char *number, char *message)
Parameters
　char * number: Destination number
　char * message: Message string
Return
　uint8_t: Non-zero value if successful.
Description
　The GSM module is set to text mode by calling +CMGF, followed by the SMS command +CMGS. Termination string x001A is sent to the GSM module 507 to end the text stream and send the message. This process 1400 is depicted in the flowchart of FIG. 14.
　Some device functions may not be described in this document. Other functions needed to implement the functions and features described herein may be readily discerned by the person of ordinary skill in the art.
readADC(uint8_t ADCchannel,uint8_t sampling,uint8_t *sign)
Parameters
　uint8_t ADCchannel: ADC channel to use
　uint8_t sampling: Sampling to use (MIN, MAX or AVG)
　uint8_t *sign: Pointer to a sign of the output reading
Return
　uint16_t: ADC reading.
Description
　It is always a good idea to read and sample ADC channels for a number of times more than just once. This increases the accuracy of the reading.
　MCU 505 supports differential voltage readings. Differential voltage reading is used when the voltage is not measured with respect to GND (0), but is measured as the difference between two voltage sources. This is particularly useful when used to measure a voltage drop across a shunt resistor, for example.
　This function uses differential voltage readings when ADC_CHANNEL_I is selected in parameter ADCchannel. The output of a differential ADC is of 10 bit resolution, two's complement. If the output is negative, the parameter *sign is set to 1. When ADC_CHANNEL_I is selected, a delay of 125 milliseconds is incorporated for MCU 505 to initialise the differential channels. 10 samples are taken and the value returned by the function depends on the parameter sampling.
　ADC_SAMPLE_MIN: Minimum value from the samples collected.
　ADC_SAMPLE_MAX: Maximum value from the samples collected.
　ADC_SAMPLE_AVG: Average value from the samples collected.
　For some embodiments of interface device 130 that are designed to additional sensors or other inputs, such as those described in relation to FIGS. 15 to 32, an expanded command set may be used, including the following:
　COMMAND: CT-VER; Return the version number of the interface device 130.
　COMMAND: CT-GON; Switch on the GSM module.
　COMMAND: CT-GOF; Switch off the GSM module.
　COMMAND: CT-AT<command text>; Send an AT command to the GSM module 507. <command text> is the at command. E.g., CT-AT+CGSN<CR> will return the IMIE of the GSM module 507.
　COMMAND: CT-SMS<number>,<message>; Send SMS via GSM module 507. <number> is recipient phone number, <message> sms message.
　COMMAND: CT-ERMR<address>,<length>; Read data from EEPROM. <address> EEPROM address, <length> size of the data to be read (Should not exceed 128).
　COMMAND: CT-ERM<address>,<data>; Write data to the EEPROM. <address> EEPROM address, <data> data to be written in the EEPROM.
　Care should be taken when writing to EEPROM not to exceed the data parameter length

| Parameter | Default Value | Address | Length |
|---|---|---|---|
| EEPROM_ADDR_INITIAL_CONFIG_FLAG | | 0 | 1 |
| EEPROM_ADDR_CT_MODEL | 100i-T-V1.1 | 1 | 15 |
| EEPROM_ADDR_GSM_PIN | 0000 | 17 | 5 |
| EEPROM_ADDR_GSM_IMEI | xxxxx | 23 | 16 |
| EEPROM_ADDR_GSM_APN | AT+AIPDCONT=\"internet\",\"\",\"\"\r | 40 | 64 |
| EEPROM_ADDR_GSM_DOMAIN | AT+AIPO=1,,\"www.ctoan.com\",80,0,,1\r | 105 | 127 |
| EEPROM_ADDR_GSM_HTTP_GET | GET /Update/Update%s HTTP/1.1\r\nHost: ct.ctoan.com:80 \r\n\r\n | 233 | 127 |
| EEPROM_ADDR_SENSORS | Default Value: 1\|0.05,0.058\|-\|240\|T\|0.5,1,0\|R\|F\|285 | 361 | 75 |

The sensor configuration is set by writing a pile delimitated (I) string to the EEPROM_ADDR_SENSORS address. The order in which the parameters appear in the string corresponds to sensors accommodated by the interface device 130. These are indicated in the table below.

| Order | Sample Values (options) | Comments |
|---|---|---|
| 1 | 1 / 3 | Single Phase / 3 Phase |
| 2 | 0.05,0.058 | Current Tolerance [xxx.xxx], Current Calibration Constant [xxx.xxx] |
| 3 | - / V | Use Voltage Constant / Sense voltage |
| 4 | 240 / 0.09 | Voltage Constant [xxx]/ Voltage Tolerance [xxx.xxx] |
| 5 | T / O / - | Thermistor / One-Wire Sensor / Disable temperature sensor |
| 6 | 0.5,1,0 | ADC Tolerance [xxx], Linear Constant B [xx.xx], Linear Constant M [xx.xx] |
| 7 | R / - | Relay Control Enabled / Relay Control Disabled |
| 8 | F / - | Flow Sensing Enabled / Flow Sensing Disabled |
| 9 | 285 | Flow sense calibration [xxx.xx] |

COMMAND: CT-ERMDEFA; Restore default values to EEPROM.
COMMAND: CT-IME; Get GSM IMEI number.
COMMAND: CT-SV1; Start Service readouts for power measurements.
COMMAND: CT-SV0; Stop Service readouts.
COMMAND: CT-POS; Run a HTTP post operation. This will post the current accumulated value of PowerWH to the server 170.
COMMAND: CT-MAN; Run maintenance cycle. Messages in the SMS buffer are processed and cleaned up.
COMMAND: CT-RON; Power on Relay.
COMMAND: CT-ROF; Power off Relay.
COMMAND: CT-LDF; Load default flags.
COMMAND: CT-RES; Reset values.
COMMAND: CT-<Other>; Send a custom message to GSM module 507.
SMS Command SET—The following command set can be activated via SMS:
COMMAND: +STATUS:
  Responds back with the current status of power, temperature, flow and relay status (if the sensors are enabled).
COMMAND: +CMD:<CT COMMAND>
  Any CT Command can be sent to the interface device 130 via SMS from the server 170 using this command.
COMMAND: +RON:
  Switch relay ON.
COMMAND: +ROF:
  Switch relay OFF.

Figure 15:
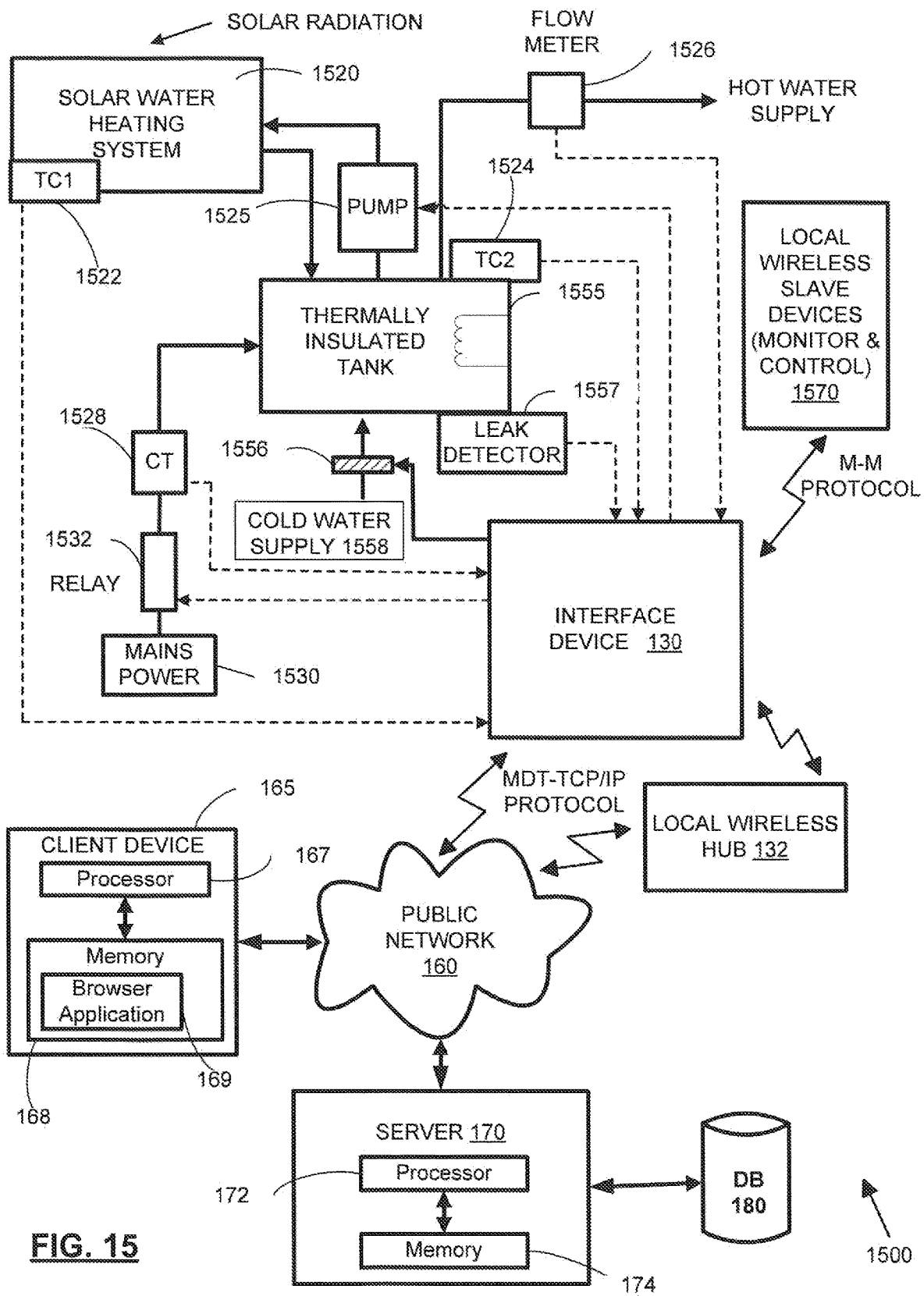
FIG. 15 is a block diagram of a system employing a solar hot water system in conjunction with an interface device according to some embodiments.

Referring now to FIG. 15, a more detailed description is provided of the solar hot water heating arrangement described above. FIG. 15 is a block diagram of a system 1500 that uses interface device 130 in combination with a solar water heating system 1520 and a thermally insulated water heating tank 1555 (booster unit) that uses a standard resistive heating element. The solar water heating system 1520 has a temperature sensor (thermocouple TC1) 1522 arranged to sense the water temperature at its outlet and provide a signal back to the interface device 130 indicative of the sensed temperature. The thermally insulated tank 1555 has a temperature sensor (thermocouple TC2) 1524 arranged to sense the water temperature in the tank (optionally near the outlet to the hot water supply conduit) and provide a signal back to the interface device 130 indicative of the sensed temperature.

The interface device 130 is configured to provide a suitable control signal to a water pump 1525 to start or stop provision of water from the tank 1555 to the solar water heating system 1520. Additionally, the interface device 130 is configured to provide a suitable control signal to a solenoid valve 1556 to close or open provision of water from the a cold water supply 1558 to the tank 1555. A leak detector sensor 1557 may also be positioned to detect water leakage from the tank 1555 and arranged to provide an output signal to interface device 130 indicative of the presence of leaked water from the tank 1555. When the signal from the sensor 1557 indicates detection of a leak, the interface device may generate an appropriate fault message and send this to server 170 for subsequent communication to an owner of system 1500. Further, the interface device 130 may shut off the cold water supply 1558 and/or the pump 1525 until appropriate maintenance can be performed. The interface device 130 also receives a signal from a flow meter 1526 in the hot water supply line indicative of the flow rate in that line.

During normal operation of the system 1500 according to some embodiments, the interface device 130 may monitor the water temperature in the tank 1555 and the solar water heating system 1520, while monitoring the provision of mains power 1530 to the water heater tank 1555 (via a current sensor 1528 in the form of a current transformer) and the flow rate of water in the hot water supply conduit. Where a software program in the EEPROM of the interface device 130 determines that the resistive heating element in the tank 1555 should be shut off, for example to control water temperature in the system 1500, interface device sends a signal to a relay 1532 to shut off mains power to the water heater 1555.

The interface device 130 can use the current sensor 1528 (and a similar voltage sensor, not shown) to determine the power used by the conventional water heater 1555 and also calculate the amount of energy used by the system 1500 using the sensed temperature data from sensors 1522, 1524 and the sensed water flow rate data from flow meter 1526.

In addition to the posting of power usage data to server 170, the interface device 130 may regularly upload sensed temperature data to the server 170, optionally at a similar regular interval to the power usage post messages. Other sensor outputs may also be sent by interface device 130 to server 170.

Interface device 130 may also be used to monitor and control other nearby non-essential devices 1570 that use power. Such devices 1570 may include a pool pump, for example, that is commonly left on. The interface device 130 may communicate locally with such devices 1570 using a low power machine-to-machine protocol or may control provision of mains power to such devices 1570 by switching a relay in the electrical supply line of the devices 1570. Thus each interface device 130 may function as a local master controller of (slave) domestic energy consumption devices and can selectively switch such devices off to save energy.

Further, since interface device 130 can receive commands from server 170 and can provide control signals to one or more local equipment parts of system 1500, interface device 130 enables remote control to be exerted over such local equipment, for example by an owner of the solar hot water heating system or possibly by a power utility company.

In some embodiments of system 1500, interface device 130 may communicate with server 170 via a local wireless hub 132 that is in wired communication with network 160. Whether or not such a communication path is used, the interface device 130 may communicate with the server 170 using a compact communication protocol, described below in further detail as a minimal data transfer (MDT) protocol.

Figure 16:
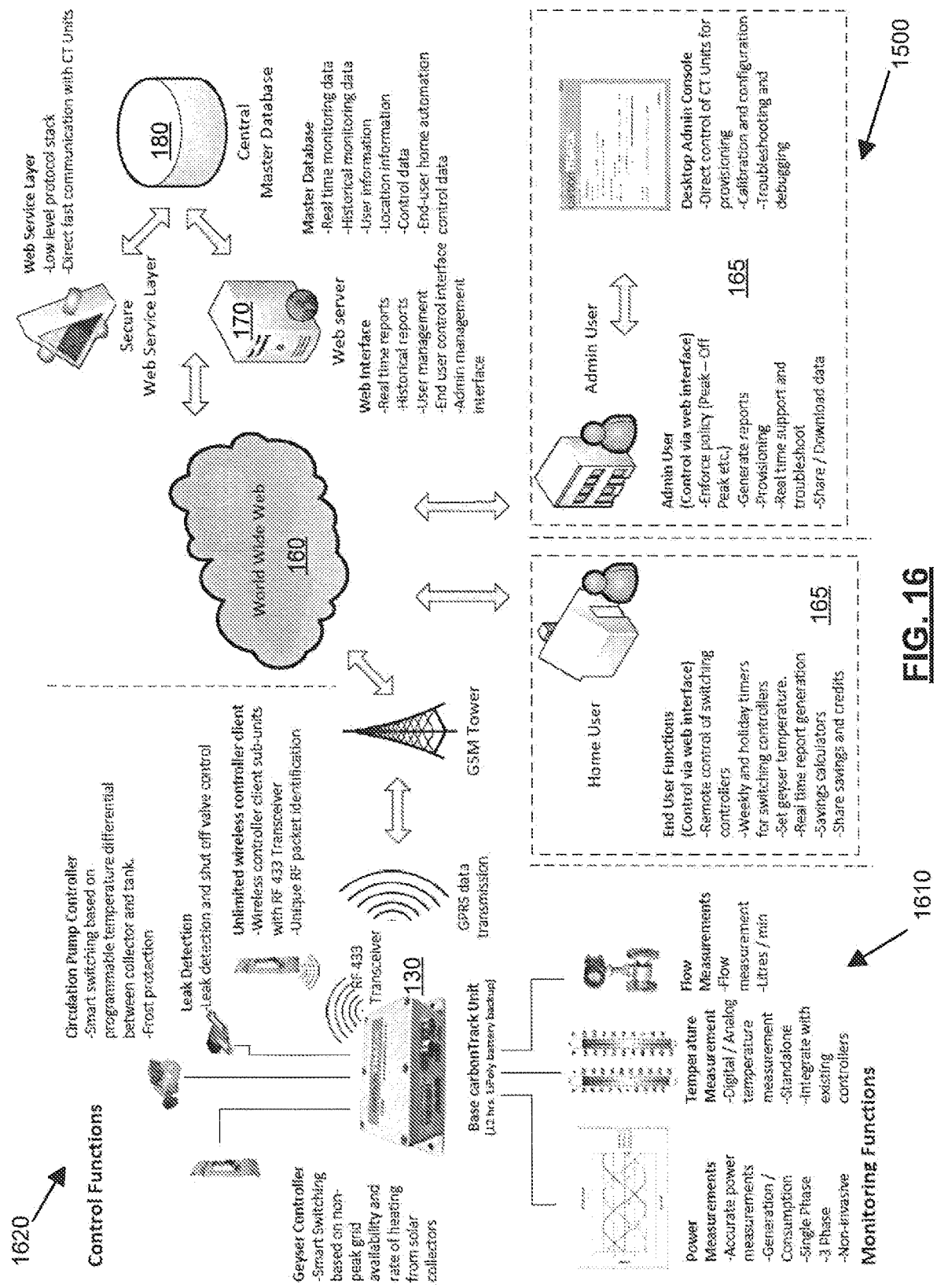
FIG. 16 is a schematic diagram illustrating a computerised control and monitoring system incorporating the system of FIG. 15.
Figure 18:
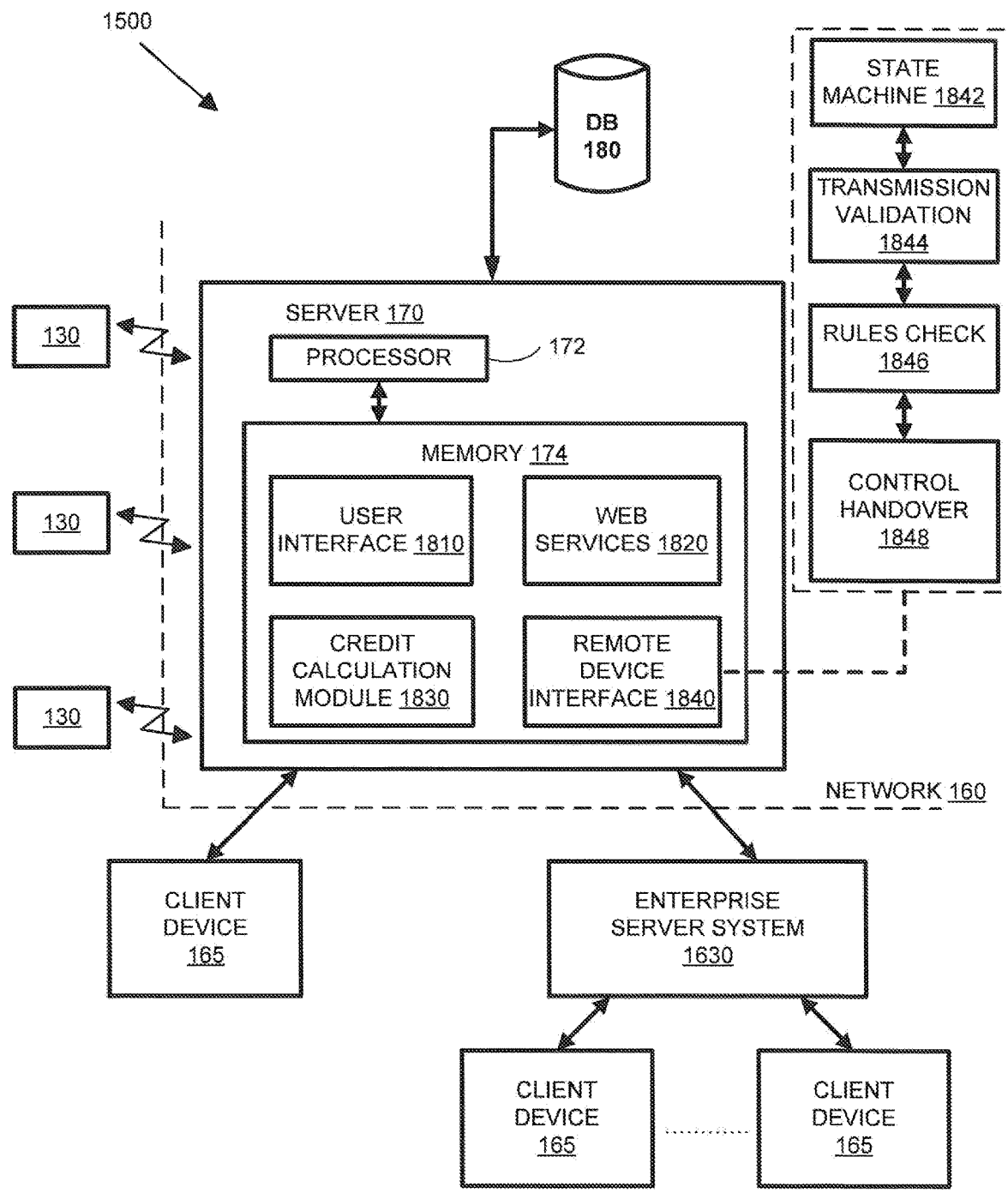
FIG. 18 is a block diagram showing aspects of a server system in further detail.

Referring also to FIGS. 16, 17 and 18, use of system 1500 for remote monitoring and/or control of multiple geographically spread interface devices 130 is described in further detail. Although only a single client device 165 is shown in FIG. 15, system 1500 comprises the server system 170 and multiple client computing devices 165 in communication with each other over the network 160. The network 160 comprises suitable mobile wireless infrastructure and may also comprise a local area network, an intranet and/or the Internet. System 1500 further comprises the data store 180, which is accessible to the server system 170 for storing data pertinent to operation of server system 170 and interface devices 130 and provision of service to the client computing devices 165.

Client computing devices 165 may comprise a desktop personal computer or a mobile or handheld computing device having at least one processor 167, one or more forms of memory 168, an operating system and a user interface including a browser application 169 operable by a user. The memory 168 may comprise volatile (e.g. RAM) and non-volatile (e.g. hard disk drive, solid state drive, flash memory and/or optical disc) storage. The user interface may comprise a display and at least one input device, such as a touch-screen, a keyboard, mouse, stylus or other peripheral device that can be used for providing user input to client computing devices 165.

A number of software applications or applets may be executing or executable by the at least one processor 167 to perform various device-related functions of each client computing device 165. Such applications may be stored in the non-volatile memory 168 of the computing device 165. At least one such software application includes the browser application 169 for enabling a user to navigate to sites accessible over the network 160 (including the IP address of server 170) to receive content therefrom. Other client software applications may execute on client devices 165 using a native operating system. Some client devices 165 may be accessible to users who are the owners, account holders or beneficiaries of one of the installed interface devices 130, while other client devices 165 may be accessible to authorised users of an organisation through an enterprise server system 1630. The organisation may be an energy distribution company, for example, such as an electricity supplier. Users within that organisation may have access to all of the information received from interface devices 130 that are in a geographical area served by the organisation or a subset of those interface devices 130.

Figure 19:
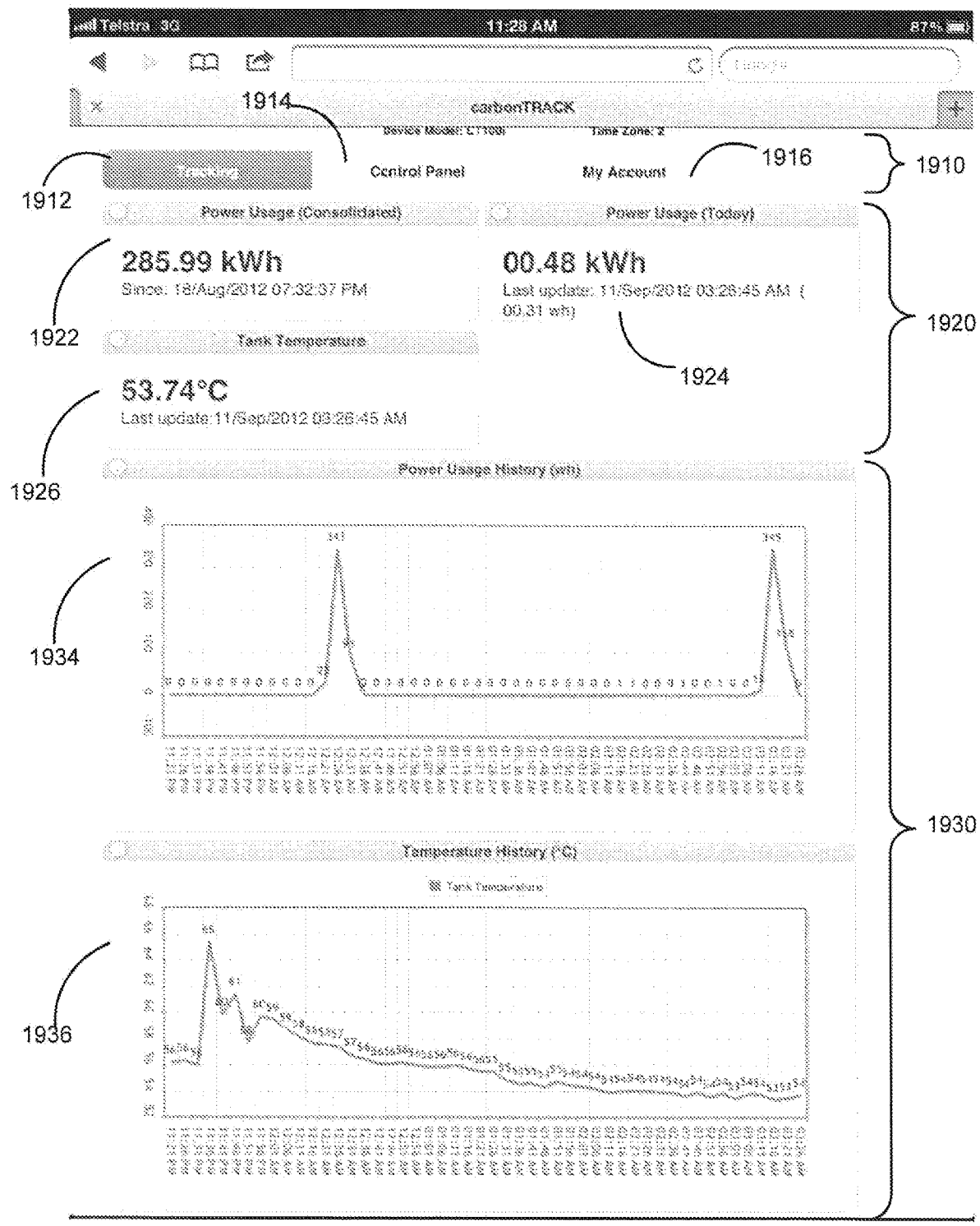
FIG. 19 is an example user interface display illustrating remote monitoring functions of the system of FIG. 16.
Figure 20:
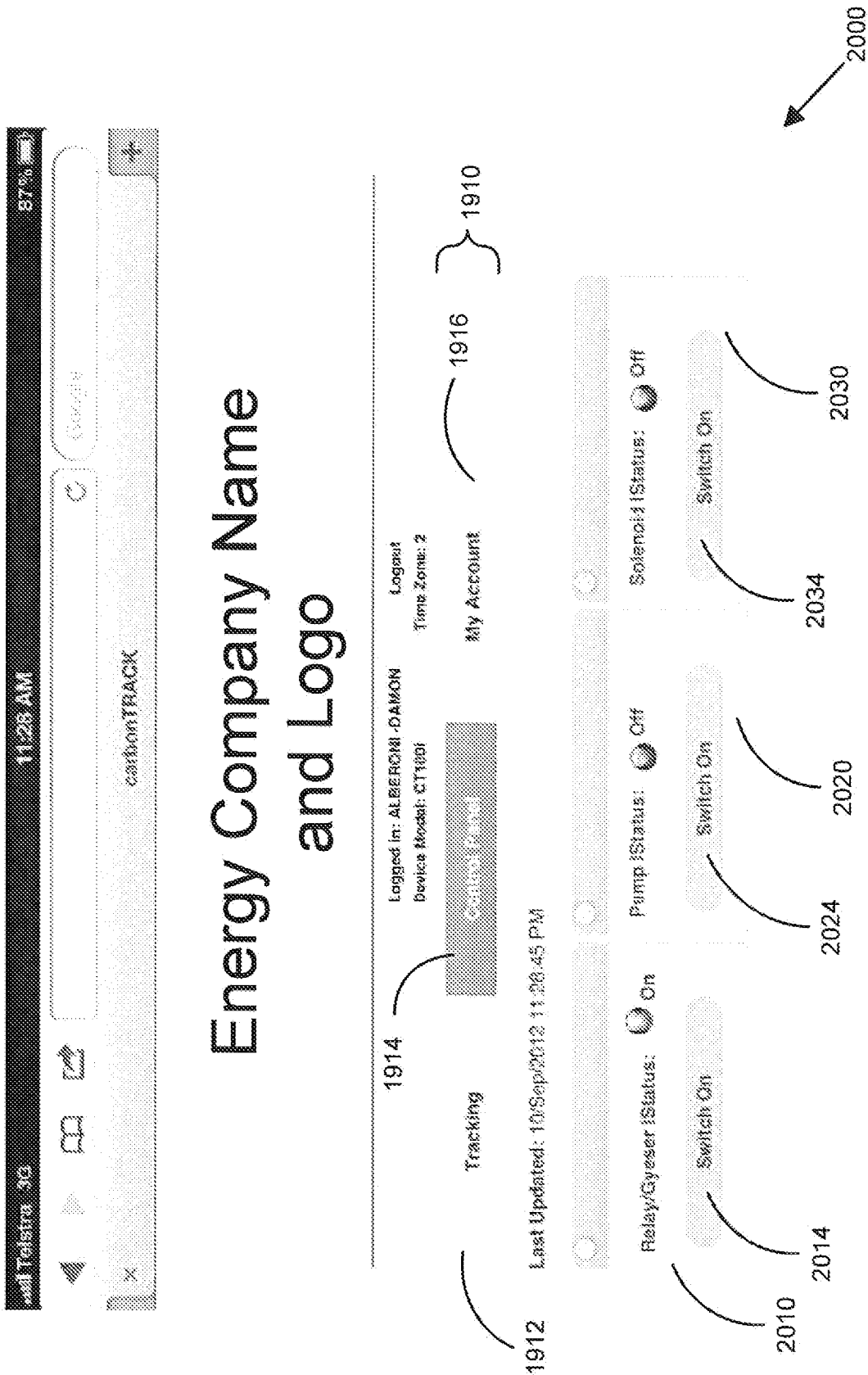
FIG. 20 is an example user interface display illustrating remote control functions of the system of FIG. 16.
Figure 21:
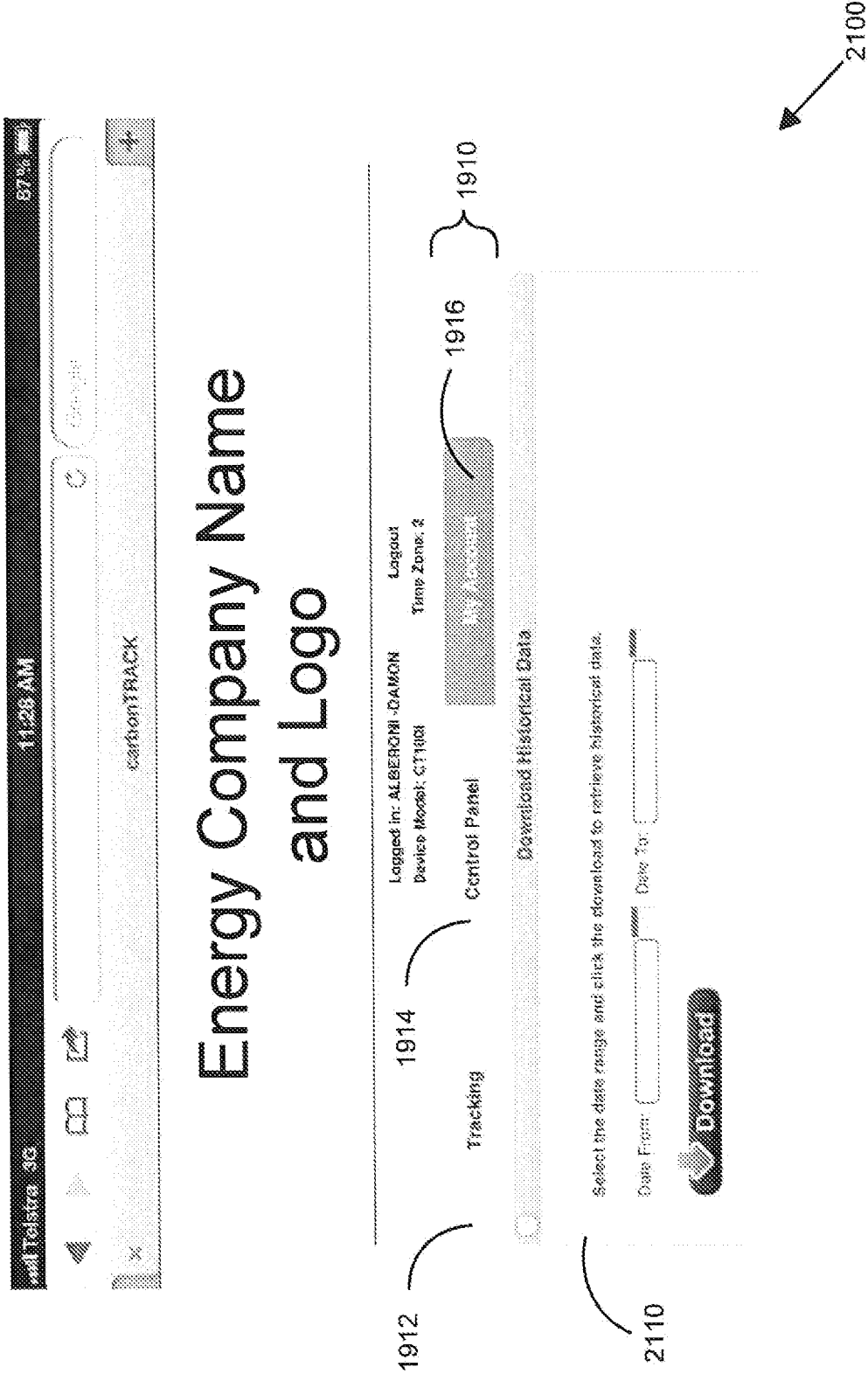
FIG. 21 is an example user interface display illustrating remote data downloading functions of the system of FIG. 16.

In the example of system 1500 illustrated in FIGS. 15, 16, 17 and 18, client browser application 169 can be used to communicate with server system 170 to request content therefrom, in the form of one or more web pages provided as program code executable by the browser application 169. According to some embodiments, server system 170 is configured to serve code to provide a remote access interface for an interface device 130 to a user viewing a computerised display generated by browser application 169. Thus, server system 170 can be considered to act as a remote access system for interface devices 130 or to act as a host for such a system. FIGS. 19 to 21 are described in further detail below and illustrate example displays of pages displayable by browser application 169 according to code received from server system 170. Server system 170 comprises at least one processing device, and may comprise multiple processing devices or multiple virtual or physical servers or server systems operating in cooperation and/or parallel. The processing devices, servers and server systems making up server system 170 may be geographically proximate or distant.

FIG. 16 is a schematic representation of system 1500 showing some further contextual detail. As shown in FIG. 16, in the context of the interface device 130 being installed at a user's home, at least one of the client devices 165 may be a user's mobile or desktop computing device. Additionally, one or more client devices 165 may be a desktop or mobile computing device provided within or by an enterprise, such as an electricity supply company, for example, and the client device 165 may be accessed by an authorised administrative user. Both of such client devices 165 may be used to access measurements from interface device 130 and remotely control certain other equipment that the interface device 130 is configured to control.

As shown in FIG. 16, system 1500 illustrates that installed interface devices 130 may be installed to provide various control functions 1620 and monitoring functions 1610. Such control functions may include controlling the circulation pump 1525, switching power to a booster unit (Geyser) 155/1555, actively controlling the fresh water supply to the water heating system (e.g. by solenoid valve 1556) and optionally also controlling local slaved electrically powered devices, such as pool pumps. The monitoring functions include measurement of power, temperature and flow, as described above in relation to FIG. 15.

Server system 170 is shown in further detail in FIG. 18. Server system 170 comprises at least one processing device 172, and may comprise multiple processing devices or multiple virtual or physical servers operating in cooperation and/or parallel to operate web server functions 1820 (e.g. using a hypertext transfer protocol daemon (HTTP)), data processing functions and data storage and retrieval functions (e.g. using structured query language (SQL) support) in conjunction with database 180. Server system 170 may also comprise scripting language support, such as Microsoft™ ASP, ASP.NET, Java/J2EE or PHP. Server system 170 may comprise or have access to suitable non-volatile data storage 174 separate to database 180 for storing executable program code to enable server system 170 to perform its functions, including those functions described herein. Such program code comprises an operating system (not shown), a user interface 1810, the web services 1820, a credit calculation module 1830 and a remote device interface 1840 supported by a suitable application framework.

User interface 1810 is responsible for providing user interface functionality to client devices 165 to allow users of those client devices 165 access (if authorised) to information about one or more selected interface devices 130. Remote device interface 1840 acts as an interface to send commands to and receive data from interface devices 130. Data received from interface devices 130 is stored in data store 180 by remote device interface 1840, thereby updating the relevant data records for the respective interface devices 130. User initiated commands, such as a command to turn on or off a booster unit 155 or water heater 1555 or to turn on or off another local slave device 1570, are passed from the user interface 1810 to the remote device interface 1840 for generation and transmission of appropriate commands to one or more interface devices 130. Credit calculation module 1830 is used to calculate carbon credits accrued from the use of each energy conversion system 120 to harvest a renewable energy source (as measured by its associated interface device 130) and thereby reduce energy consumption from the main electricity supply. Such carbon credits may be tracked and held on account for the owner of the system 100 or system 1500.

Database 180 may comprise a localised or distributed database storing data records for the various user accounts, interface devices 130, historical usage data, calculated carbon credits, etc.

Control of multiple interface devices by an energy distribution company is depicted in FIG. 17, where server 170 acts as a control centre through which administrative users in the energy distribution company use a client computing device 165 and/or server system 1630 to view real-time (or near-real-time) power usage data from the interface devices 130 and send control messages to the interface devices 130.

The user in the energy distribution company may access a control dashboard (user interface) using browser application 169 and, using searching and/or selection functions of the control dashboard, select a number of interface devices 130 in a particular geographical area. The user can view total energy usage for the water heating systems 155/1555 (to which interface devices are coupled 130) in this area or view the usage of each separate system 155/1555. If an authorised user elects to, the user can provide user input to the control dashboard on client device 165 to selectively switch on or off power to the water heating systems 155/1555. Alternatively, the switching may be performed automatically during certain times of the day, such as during peak energy demand periods. The user input at client device 165 causes suitable messages to be sent to the server 170, which in response generates and sends appropriate commands to the interface devices 130 that are arranged to switch off power (e.g. by signalling relay 1530) to the water heaters 155/1555. Alternatively, switching commands to the interface devices 130 may be generated in response to the automatic performance of a time-based switching algorithm at server 170. This switching selection can be performed simultaneously on water heaters 155/1555 in one or more geographical areas or more selectively on only a subset of such water heaters within such geographical areas. This switching may be desirable to enforce energy usage policy, for example, in order to avoid undue loads being placed on the energy supply network during peak periods.

Some embodiments of interface device 130 may employ an alternative transfer protocol to HTTP to post data to the server 170 and receive commands therefrom. For example, some embodiments may employ a customised and condensed minimal data transfer (MDT) protocol over the Internet protocol suite, such as TCP/IP (transmission control protocol/internet protocol).

The described MDT protocol is designed to reduce the amount of data that is transmitted over GPRS or another network, without compromising functional parameters including validation and security. A key criterion for the MDT protocol implementation is to minimize the size and frequency of communication between interface devices 130 and the central server 170. Higher level protocols, such as HTTP, include protocol decorations which increase the data stream size. Moreover, HTTP is a stateless protocol, which means connections should be re-established every time any data stream is sent. On some GPRS networks, providers charge a connection fee. In this case, it is cost-effective to hold the connection as long as possible.

The MDT protocol is a layer above TCP/IP and each message has the following simplified protocol format:
[<single byte header>|<data>|<validation code>]
Single byte (or word) header:
0x01: Add/Update data to server 170
0x02: Request data from server 170

Data: one or more bytes of hex data
Validation code (optional): this may be a single byte XOR resultant checksum (or other form of checksum) of all the other bytes in the message string.

Each message transmitted between the interface device 130 and the server 170 is acknowledged with a single byte ack message. The data carried by the message is not size limited and may be many bytes in length. The purpose of the MDT is to minimise the number of superfluous bits transmitted with each message.

The server side implementation of the MDT protocol performs most of the processing functions. The layers executed by the server 170 are shown in FIG. 18 and detailed below:

State Machine:

A state machine 1842 executed as part of the remote device interface 1840 establishes and holds a data connection with each of the interface devices 130. State specific data for each interface device 130 in system 1600 is held in a cache of the server 170 for a period, for example up to 24 hrs. In case there is a connection failure between the server 170 and a respective interface device 130, then upon successful reconnection, the stored state data for that interface device 130 is retrieved from the server cache. This decreases the need to fetch state information from the interface devices 130. State validity may be checked by the server 170 by transmitting a one byte state check command (0x01) to the interface device 130. The interface device 130 in turn responds with a single byte XOR based resultant CRC (cyclic redundancy check) code, which is matched with a counterpart code stored in the data store 180 accessible to the server 170.

Where remote interface devices 130 have a static IP address assigned to them, the state machine 1842 takes over the communication handling.

Transmission Validation:

Data validity is checked by a transmission validation component 1844 of the remote device interface 1840 to ensure quality of data before proceeding to the next layer. If the CRC code received from the interface device 130 fails to match the server-side code, then re-try requests to the remote device are handled in this layer. A request to resend the last post may be handled by a single command (0x02).

Rules Check:

Custom rules/treatment can be applied to the data by a rules check component 1846 upon successful validation. Primary use of this layer is to enable encryption or encoding of data streams. A failure to comply with the rules will result in a rejection of the message with a single byte response (0x03).

Control Handover:

Upon successful pass-through via the above levels, a control handover component 1848 hands over control to the remote device interface application 1840 for further processing. The control handover layer is also responsible for receiving data from the remote device interface application layer.

FIG. 19 is an example screen shot of a user interface display generated by a browser application 169 executed by a client device 165. Display 1900 includes a series of selectable options 1910 that a user can select in order to view a particular display. These selectable options 1910 include a tracking display option 1912, a control panel display option 1914 and an account display option 1916. Display 1900 is a display generated when the tracking display option 1912 is selected and includes a series of data windows 1920 generated based on posted data received from a particular interface device 130.

The user interface displays shown in FIGS. 19, 20 and 21 are generated for a particular interface device 130 that is installed to measure energy generation and/or consumption as part of a system 100 or 1500, for example. In order to view the user interface displays, the user must login as an authorised user recognised by server 170.

Data windows 1920 in display 1900 include a cumulative power usage window 1922 indicating power usage in kilowatt hours since a previous date, a recent power usage window 1924 indicating power usage only in the last day or so and, where the interface device 130 is configured to receive sensed temperature information of a hot water system, the windows 1920 also include a current temperature window 1926 to indicate the sensed water temperature.

Display 1900 also includes a graphical display section 1930 that may include one or more graphs of historical power usage (window 1934) and optionally historical tank temperatures (window 1936). Optionally, the graphical display section 1930 may also show a historical accumulation of energy savings and/or carbon credits, although this is not shown in display 1900.

FIG. 20 is an example screen shot of a display 2000 shown to a user via browser application 169 when the control panel option 1914 is selected. Display 2000 includes multiple user selectable controls, which may include a tank power control 2010, a circulation pump control 2020 and a water supply control 2030, for example. The controls may each indicate a current status of the equipment in question. For example, as shown in FIG. 20, control 2010 indicates an on status of power to the booster unit/electric water heater 155/1555. Each control 2010, 2020 and 2030 also includes a selectable switch option 2014, 2024 and 2034 respectively, to switch the relevant equipment off (if its status is on) or on (if its status is off). Selection of one of the switching options 2014, 2024 and 2034 will be transmitted as a user selection made by the browser application 169 to the server 170 over the network 160, in response to which the server 170 generates and transmits suitable commands to the interface device 130 that is authorised to be controlled by the user viewing display 2000. That interface device 130 then generates and transmits the appropriate signals to the local equipment accordingly.

FIG. 21 is a further example screen shot of a user interface display 2100 generated when the user account option 1916 is selected. This display 2100 may include various user account information and allow a degree of user configuration. In particular, display 2100 may include a download window 2110 that allows a user to download historical power usage, temperature, energy savings and/or accrued carbon credit data for a specified date range.

One of the parameters affecting the efficiency of a solar thermal system is the circulation pump. The circulation pump is responsible for pumping cold water from the storage tank through the collector system. The interface device 130 in system 1500 employs two temperature sensors 1522, 1524, one in the solar water heating system 1520 (TC1) and the other in the storage tank 1555 (TC2), to smartly control the circulation pump. The interface device 130 can be configured to switch on the pump 1525 based on a first temperature differential between TC1 and TC2 and similarly switch off the pump based on a second temperature differential between TC1 and TC2. For example, the pump 1525 may be switched on by the interface device 130 when it determines that the temperature differential is at or above 7 degrees (C.) and switched off when the temperature differential is less than 2 degrees centigrade.

The collector system of the solar water heating system 1520 can fail under extreme cold conditions. Frost can develop inside the collector system and if hot water is circulated through the tubes, the solar water heating system 1520 may fail due to cracking of glass. To prevent this, the interface device 130 may employ a frost protection mechanism by operating pump 1525 to pump water from the storage tank 1555 to the collector system 1520 when the temperature sensed by TC1 falls below a set temperature, such as 5 degrees centigrade, thereby preventing (or at least mitigating) frost or ice formation inside the collector system.

The booster unit 155 or electric water heater element 1555 is powered by electricity from the electricity supply grid 150. It should only be used if and when the received solar energy is not sufficient to heat water to the required temperature in a particular time period. Most systems available in the market today have the booster unit switched using a thermostat which is placed inside the tank. Such systems do not take into consideration the efficiency of the solar energy conversion system 120 employed. In such systems, if the temperature in the tank falls below a certain value, the thermostat switches on the booster unit 155. The described interface device 130 according to some embodiments employs a smart switching solution by continually monitoring the conversion from the solar thermal system.

Figure 22:
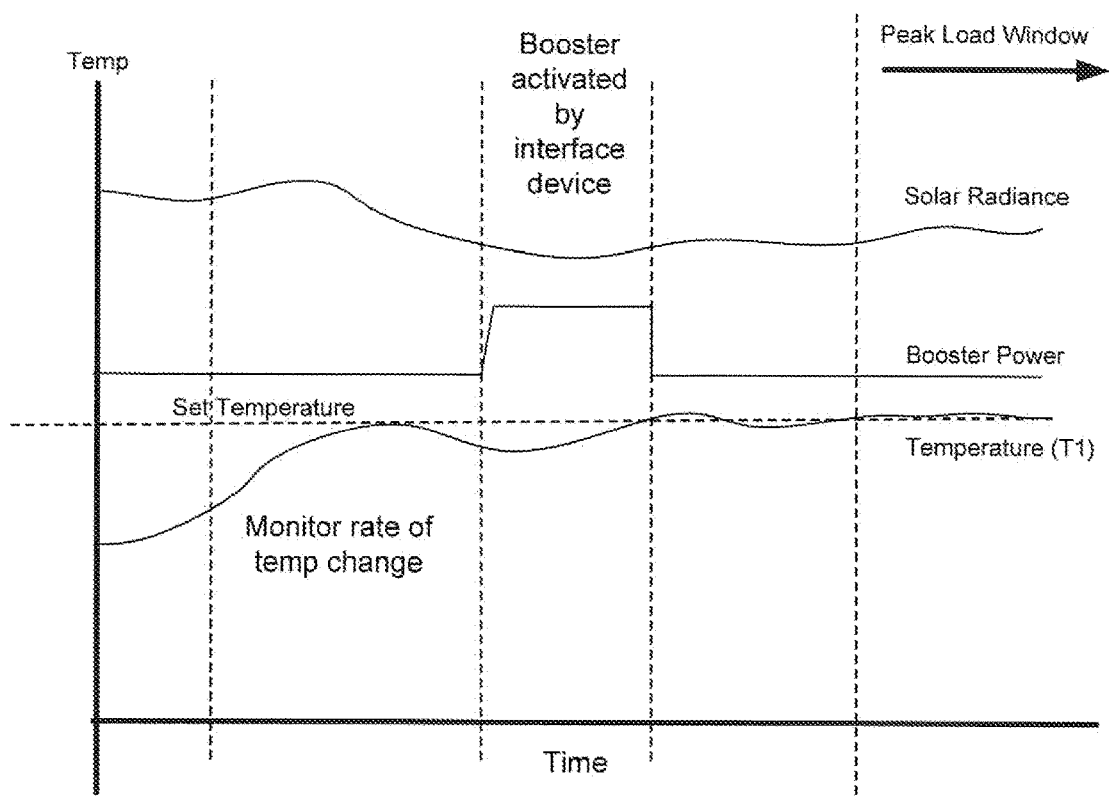
FIG. 22 is a graph illustrating temperature over time for a solar hot water system under a first scenario where a booster heater is controlled by the interface device of some embodiments.

Referring to FIG. 22, a graph of temperature versus time is shown to illustrate the scenario described below. The temperature of the tank is measured every minute (or another pre-set interval). The rate of change of heat is calculated between 2 consecutive readings. This data is used to project and calculate the time taken to heat the tank to the set temperature. If the projected time is greater than the allowed time or if the time period could cross over in to the peak load switch off period, then the booster 155 is switched on to compensate. This process repeats periodically, for example every minute. This method ensures efficient utilisation of energy from the solar conversion system 120 and only uses grid power where required to meet a temperature set-point for a particular period.

Figure 23:
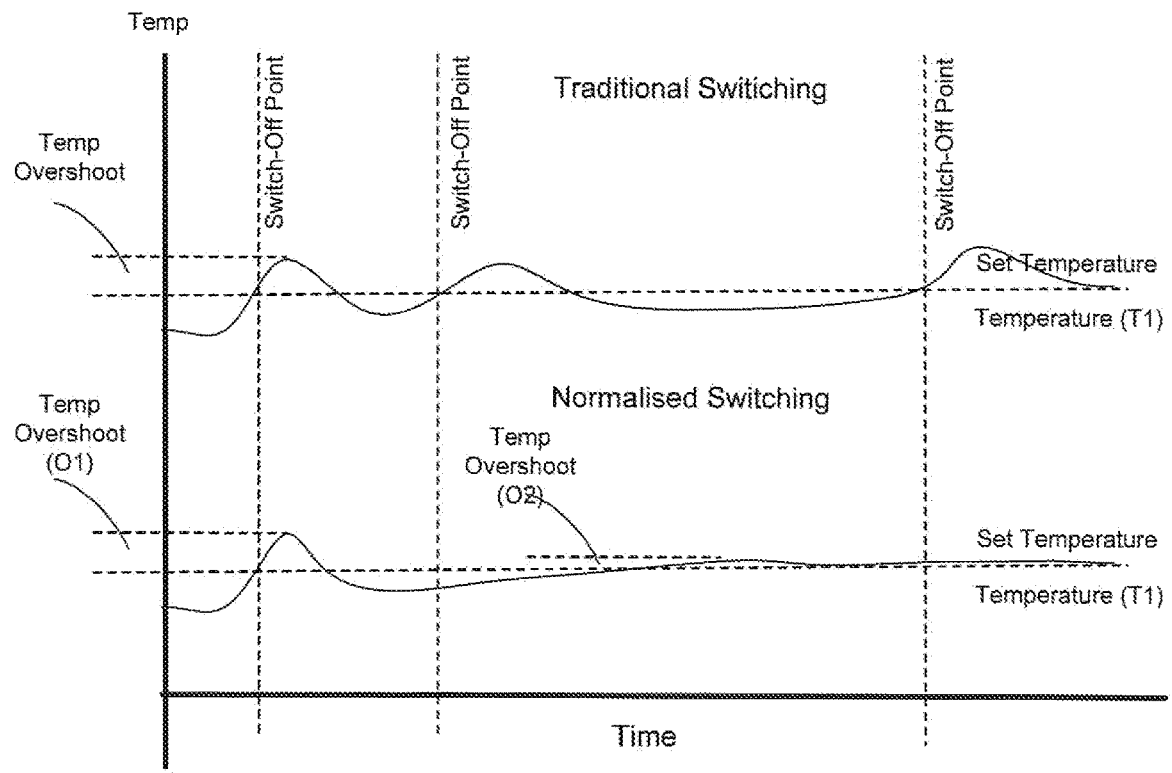
FIG. 23 is a graph illustrating temperature over time for a solar hot water system under a second scenario where a booster heater is controlled by the interface device of some embodiments.

Referring to FIG. 23, a graph of temperature versus time is shown to illustrate the scenario described below. In traditional systems which employ a thermostat to maintain the tank temperature, the thermostat will disconnect the power to the heating element. The system may include a pump which circulates water between the collector and the tank in a solar thermal system or backup/main heating coil within the tank in a grid powered heating system. In this scenario, the temperature of water in the tank will continue to rise beyond the set point known as overshoot. The maximum value of the overshoot depends on many factors, mainly the distance between the thermostat and the heating element, the ambient temperature, tank losses and tank capacity. Overshoots are not desired and could put the system under undue stress. It also wastes energy.

The interface device 130 according to some embodiments employs a normalised switching solution to overcome this scenario. The continuous monitoring function in interface device 130 records the overshoot (O1) and offsets the switch off point to a value below the set temperature. Doing this as an iterative process (O2), the interface device 130 is able to calculate the ideal switch-off point where the tank temperature is maintained as close to the set temperature as possible. This is a self-calibrating system where the switch-off point is recalculated by the interface device 130 every cycle.

Referring now to FIGS. 24 to 34, there are shown example schematic circuit diagrams of circuit components of an interface device 130 according to some embodiments. The circuitry of such components is configured for use with an interface device 130 configured for installation as part of system 1500. The circuit components of interface device 130 shown in FIGS. 24 to 34 generally perform in a similar manner to the circuitry functions of the interface device 130 described above in relation to FIGS. 5 to 14, except that circuitry components shown in FIGS. 24 to 34 have added circuitry to accommodate the additional monitoring and control functionality of the embodiments of interface device 130 shown and described in the context of FIGS. 15 to 23.

FIG. 24 is a schematic circuit diagram of a microcontroller (MCU) 2405 that is similar in function to MCU 505 described above. MCU 2405 may use the expanded command set described above and may be configured to respond to the SMS based control commands received from server 170, as described above. FIG. 24 also shows a three volt precision voltage reference circuit 2435 to provide an accurate reference voltage to MCU 2405. Additionally, MCU 2405 may accommodate red and green status and power LED's 2437 that light (or do not light) to indicate the appropriate status of the interface device 130.

Figure 25:
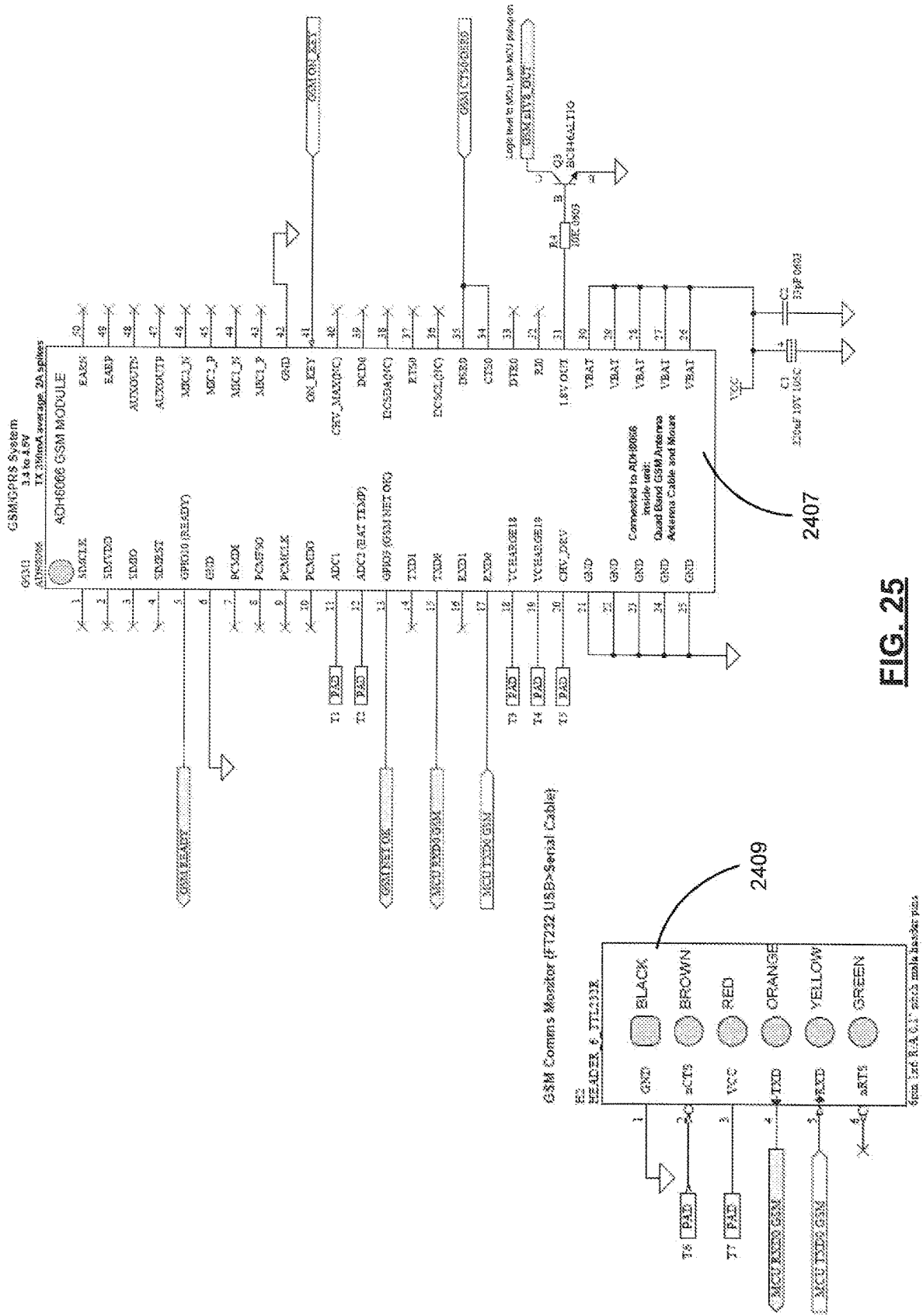
FIG. 25 is a schematic circuit diagram of a communication module of the interface device according to some embodiments.

FIG. 25 is a schematic circuit diagram of a GSM module 2407 and a GSM communications monitor header-block 2409. The GSM module 2407 performs similar functions to the GSM module 507 described above and is coupled to a quad-band GSM antenna via a suitable antenna cable and mount.

Figure 26:
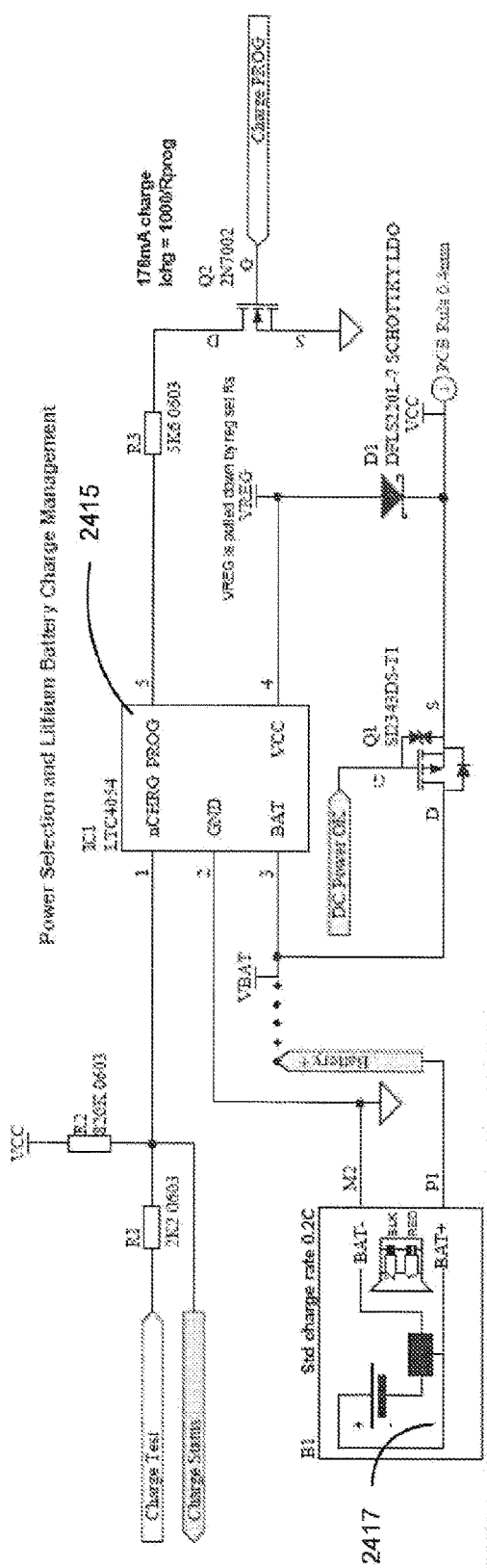
FIG. 26 is a schematic circuit diagram of power and battery management circuitry of the interface device according to some embodiments.
Figure 27:
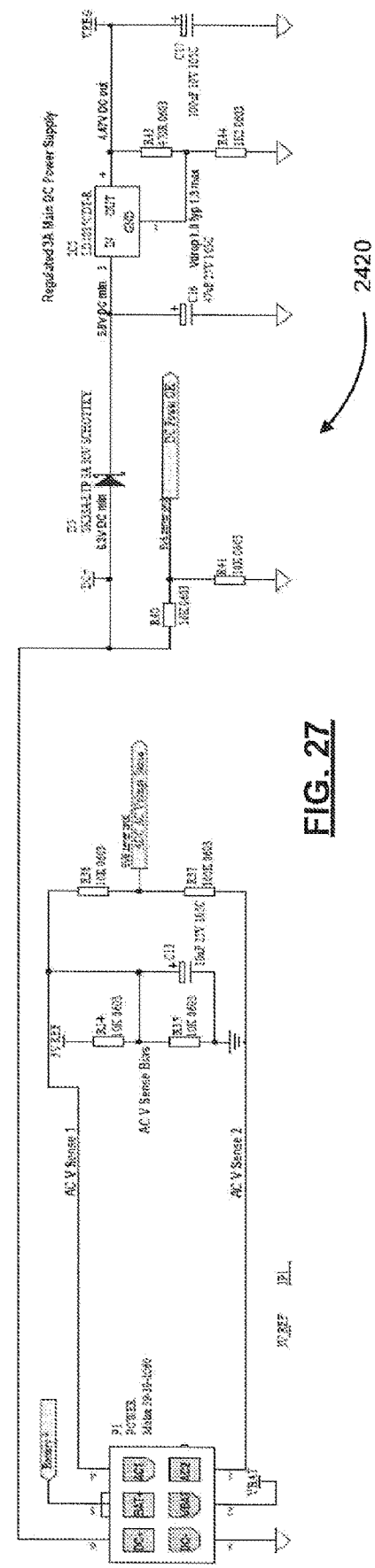
FIG. 27 is a schematic circuit diagram of a regulated power supply circuit of the interface device according to some embodiments.
Figure 28:
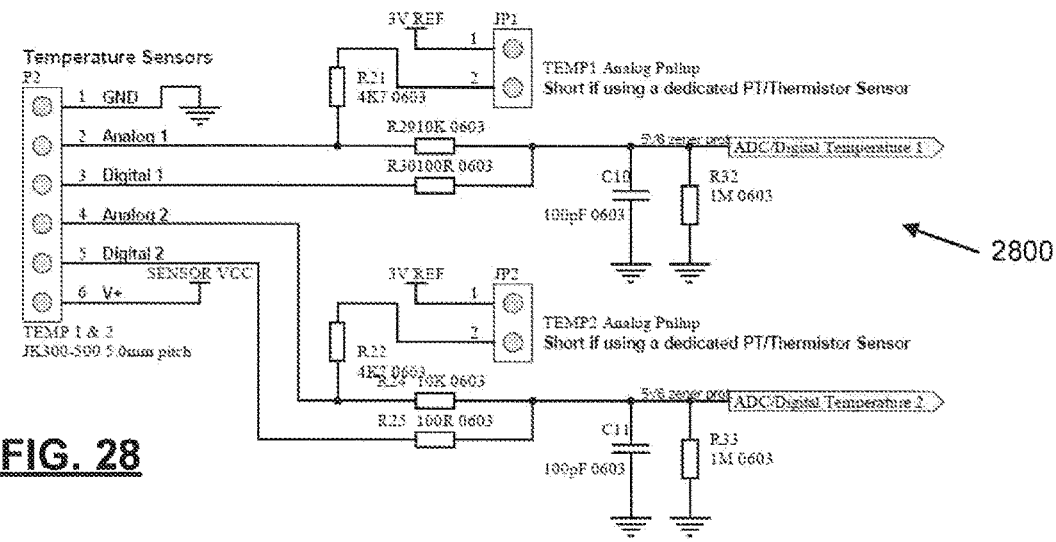
FIG. 28 is a schematic circuit diagram of temperature sensor interface circuitry of the interface device according to some embodiments.
Figure 29:
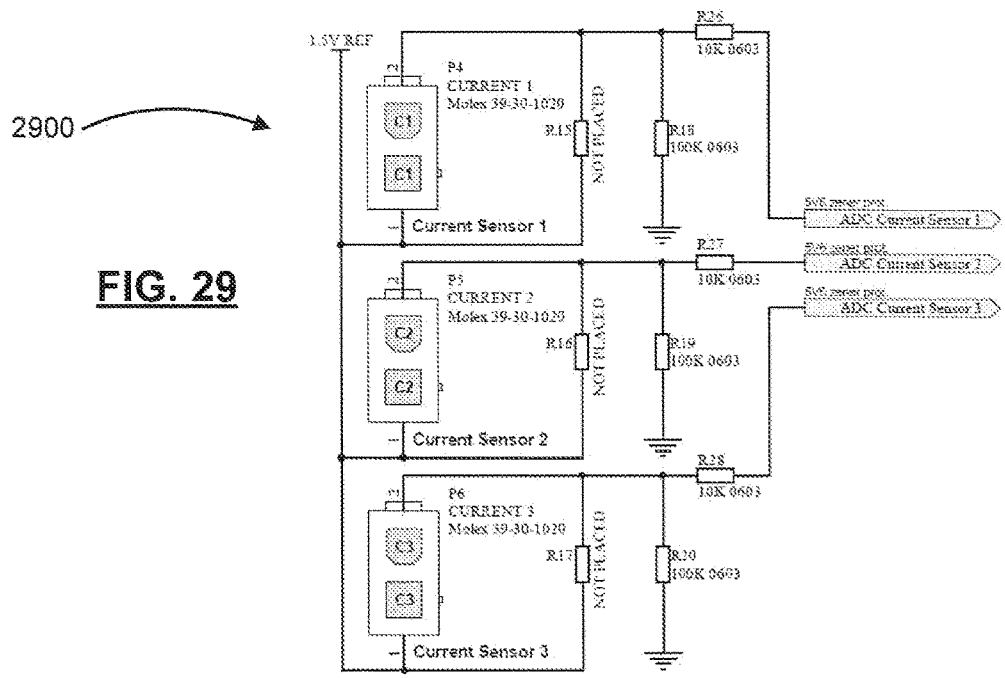
FIG. 29 is a schematic circuit diagram of current sensor interface circuitry of the interface device according to some embodiments.
Figure 30:
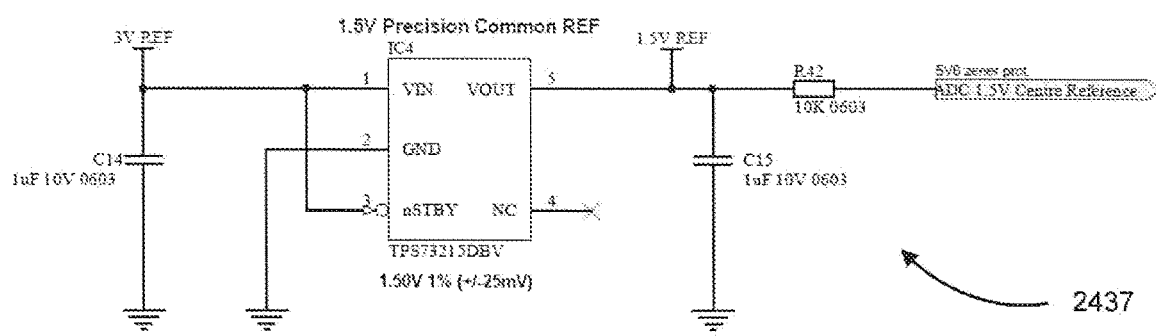
FIG. 30 is a schematic circuit diagram of a precision voltage reference circuit of the interface device according to some embodiments.

FIG. 26 is a schematic circuit diagram of a battery management module 2415 and a battery 2417. FIG. 27 is a schematic circuit diagram of a regulated DC power supply to act as a power supply for internal components for the interface device 130, based on either the battery 2417 of the power supply or an external power supply. FIG. 28 is a schematic circuit diagram of a temperature sensor connection block and input circuitry 2800 for the temperature sensors TC1 and TC2. FIG. 29 is a schematic circuit diagram of connector blocks and input circuitry 2900 for three current sensors. FIG. 30 is a schematic circuit diagram of a 1.5 volt precision common reference voltage circuit 2437 that provides a further precision reference voltage to the MCU 2405.

Figure 31:
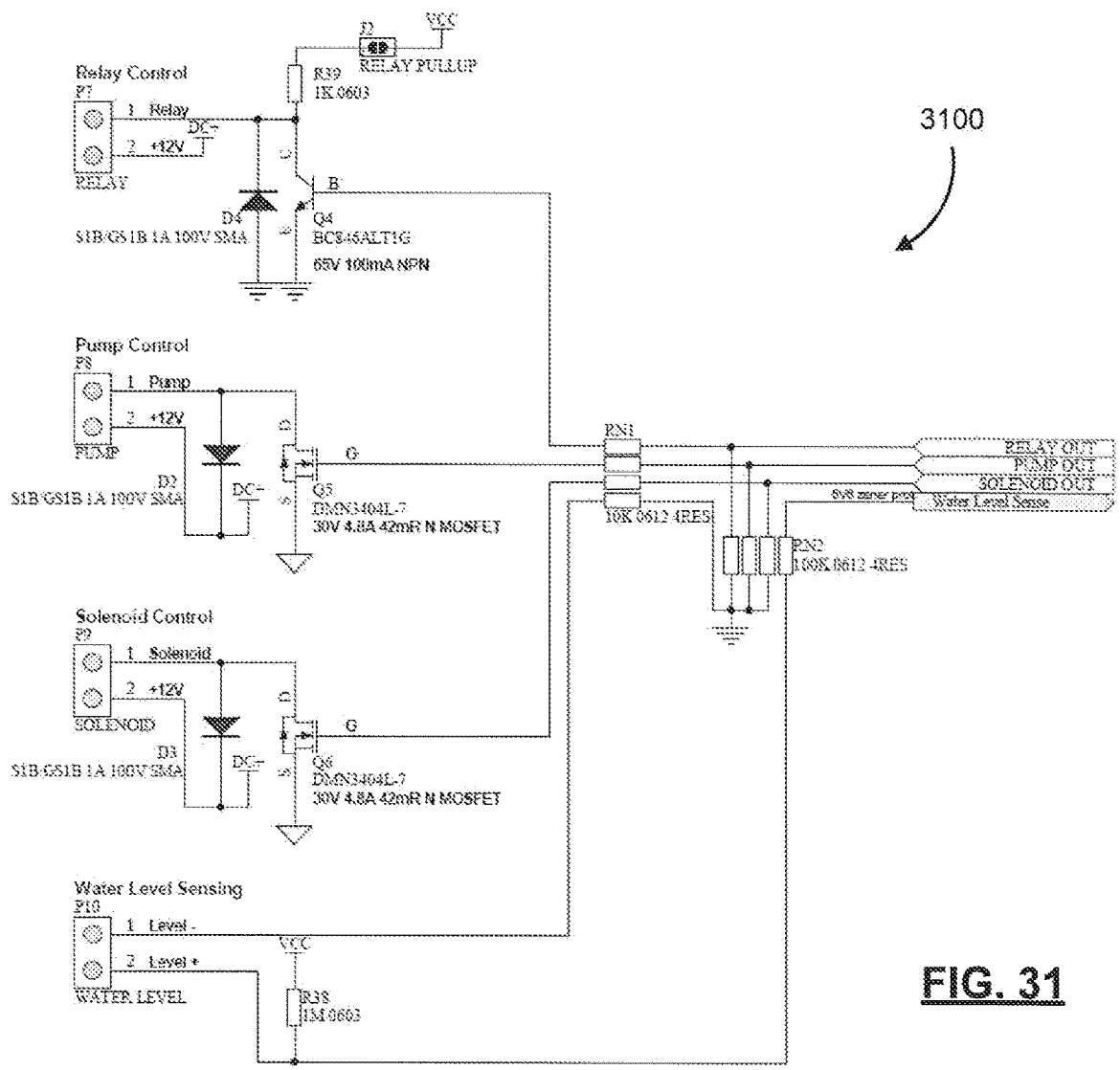
FIG. 31 is a schematic circuit diagram of control and sensor interface circuitry of the interface device according to some embodiments.
Figure 32:
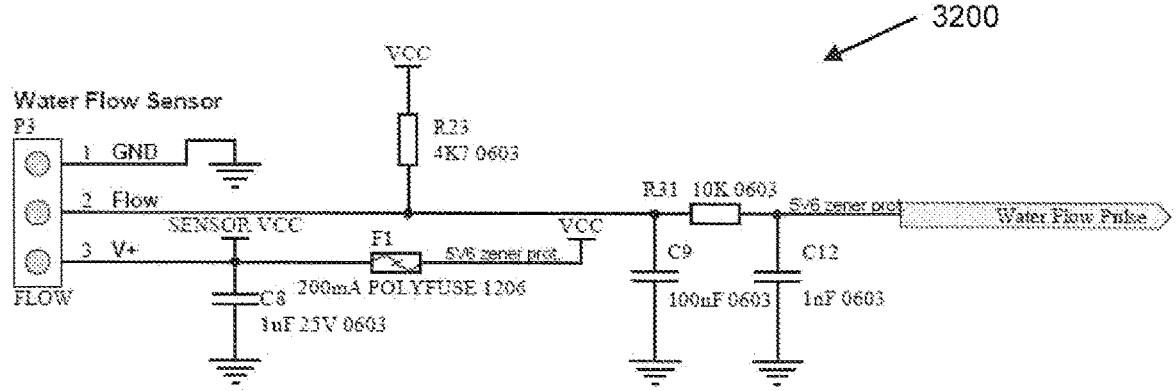
FIG. 32 is a schematic circuit diagram of flow sensor interface circuitry of the interface device according to some embodiments.
Figure 33:
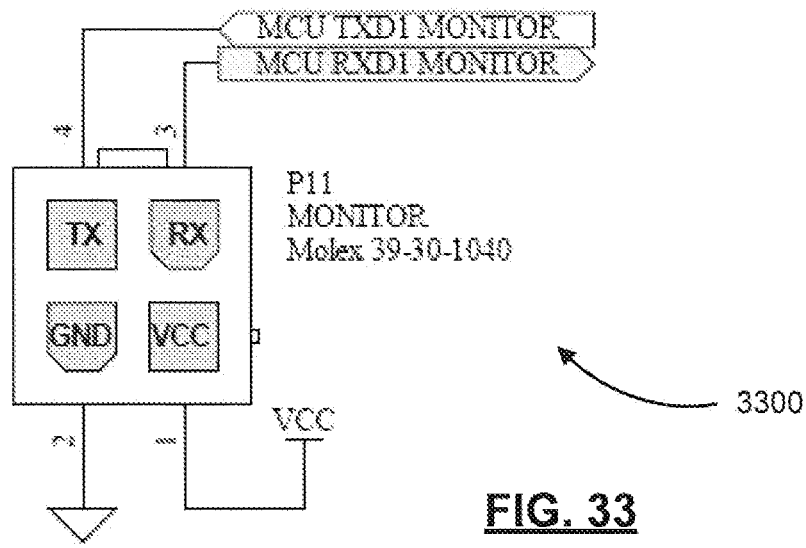
FIG. 33 is a schematic circuit diagram of a serial monitor port of the interface device according to some embodiments.
Figure 34:
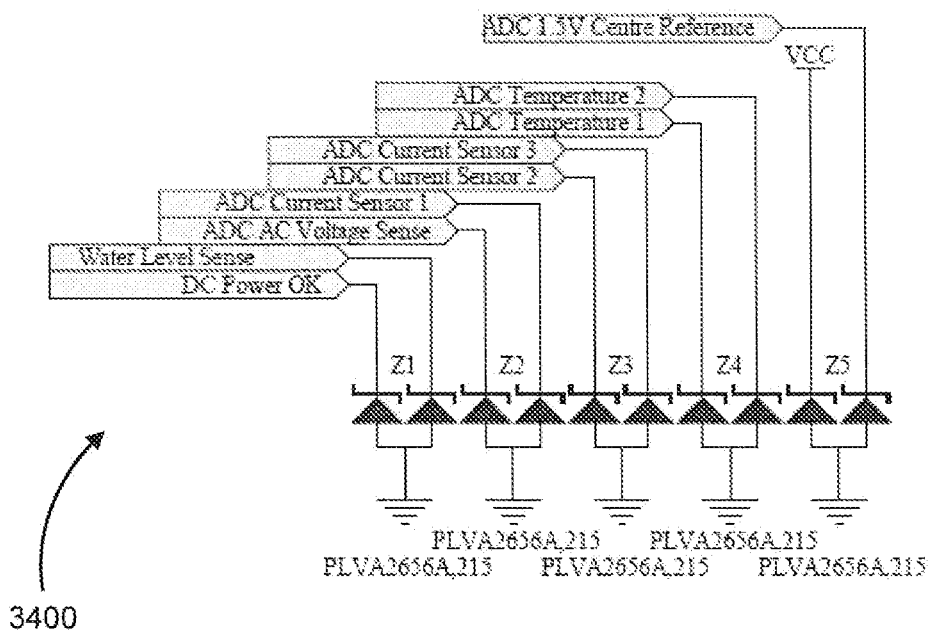
FIG. 34 is a schematic circuit diagram of spike protection circuitry of the interface device according to some embodiments.

FIG. 31 is a schematic circuit diagram of connector blocks and circuitry 3100 to allow the MCU 2405 to interface with the relay 1532, the pump 1525 and the solenoid valve 1556, as well as an optional water level sensor as the leak detector 1557. FIG. 32 is a schematic circuit diagram of a connection block and input circuitry 3200 to enable the micro-controller 2405 to interface with the flow meter 1526. FIG. 33 is a schematic circuit diagram of a serial monitor port to act as a serial interface with the MCU 2405, such that external devices can be coupled to the interface device 130 for monitoring and testing purposes. FIG. 34 is a schematic circuit diagram of circuitry 3400 to protect against electrical spikes or electrostatic discharge.

Described systems, methods and interface devices not only reduce dependence on electrical energy from the electricity supply grid, but also allow the calculation of carbon credits generated due to the use of a renewable energy conversion system. The information stored by the server 170 (in data store 180) about each interface device 130, including its GPS coordinates, regularly received calculated energy (and optionally temperature data) and other data (such as is described below), allows the server 170 to calculate accrued carbon credits from the use of such systems 100 or 1500. These accrued carbon credits can be redeemed for a monetary value by the householder where the system 100 or 1500 is installed or another owner or sponsor of the system 100 or 1500. The eligibility for and quantification of carbon credits, also termed renewable energy credits (RECs), for solar water heating systems is based on how much energy they are deemed to generate in terms of kWh/day of energy in the hot water. The deemed performance over the effective guaranteed operating life of the systems are generally driven by:

a. A Q-factor as measured by an approved test facility in terms of an approved thermal performance test procedure. Q is a measure of the solar to electrical conversion efficiency of the system in kWh per day. The system quality factor Q is determined through testing (by a Bureau of Standards of a particular country where the system 100 or 1500 is installed) as a measure of the effectiveness of the specified system to convert solar to thermal energy, which is effectively the primary energy considered to be produced by the system on a typical day.

b. The commissioning certification inspection of the installation quality to ensure compliance and functionality. This is conducted once by the installation team and includes provision of a single image, along with GPS coordinates of the system at the time of commissioning.

c. The operational status per system in the utility is signified by a single check integer (1—True and 0—False) recorded at a period of daily intervals and submitted to the issuing body at a particular email or IP address monthly within 7 days of the end of the recorded month in question.

d. The installed effective collector area of each solar water heating system within the utility in square metres.

e. The solar radiation at the location of the installation.

f. Confirmation of an agreed (and reasonable) operating lifetime for the systems 100 or 1500.

The system quality factor Q is determined through testing by an approved standards body as a measure of the effectiveness of the specified renewable energy harvesting system to offset the use of electrical energy from the normal mains power supply. The standards body may determine a Q factor for every system tested by that body. This Q factor will indicate the kWh (energy) to be saved by the renewable energy harvesting system on a typical day.

Results from experimental trials indicated the following daily electricity consumption by a solar water heater supported by an electrical heating system:
3.3 kWh—For a solar water heater with a controllable electrical feed to the electrical heating system
4.6 kWh—For a solar water heater without timed controlling
10.3 kWh—For a comparative electric water heater (without a solar water heater)

The energy savings can be improved by approximately 30% where the electrical power supplied to the electrical booster unit in solar water heater systems is controllable. Remote electronic control of such water heating systems in full control mode offer significant electrical energy savings across a larger population of solar water heating systems.

Considering these results, it is easy to estimate that average daily consumption savings for an energy supply utility can be significant by switching from conventional electric water heater to solar water heaters over a given period. Upon provision of appropriate accreditation, which may be obtained based on auditing of the data received and stored by the server 170 and testing of the interface devices 130, renewable energy credits (RECs) may be issued on a regular basis, such as quarterly.

Figure 35:
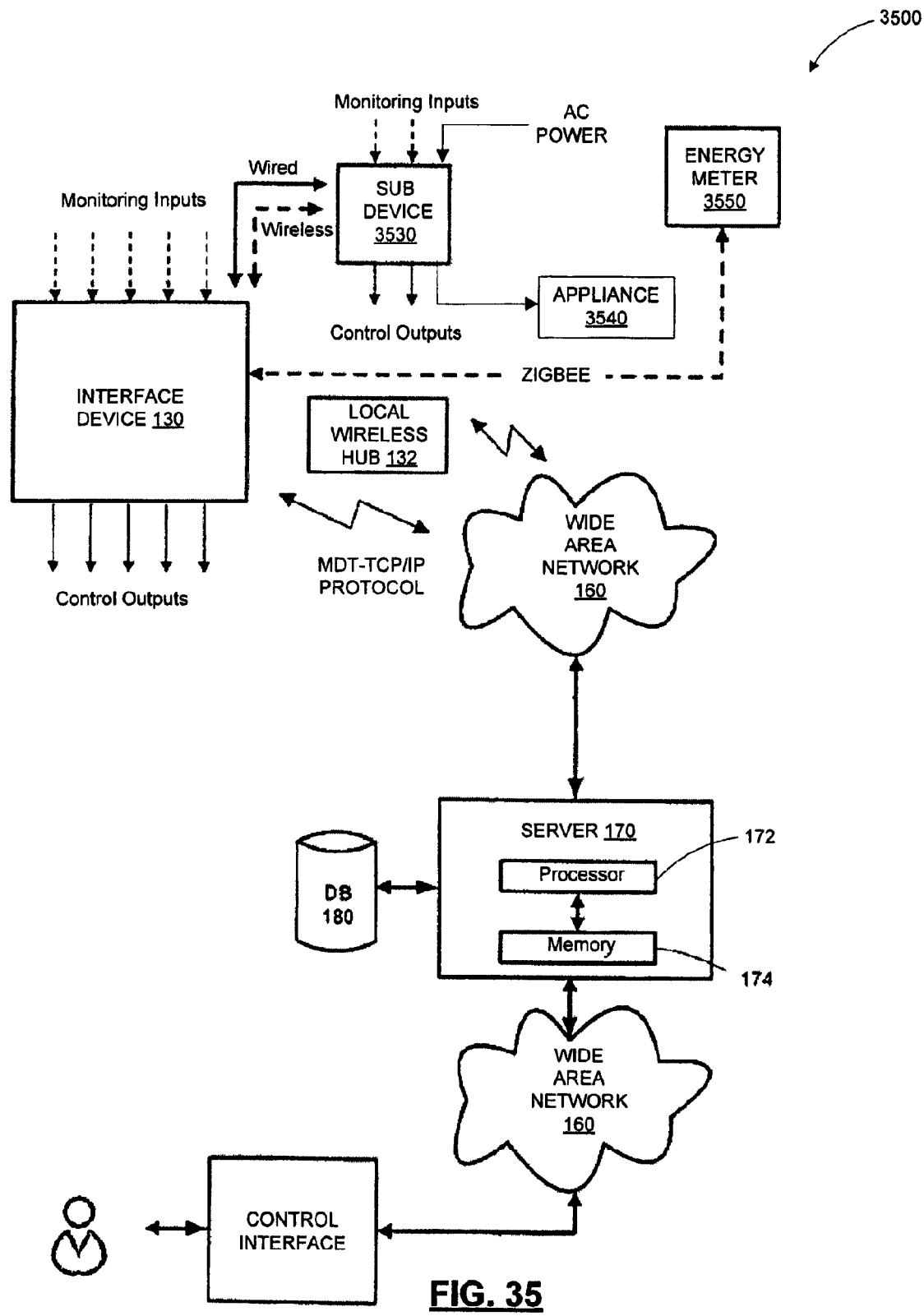
FIG. 35 is a block diagram of a system for monitoring and controlling an appliance.

Some embodiments relate to a system that allows adaptive learning of user/consumer power usage/consumption or appliance use in order to efficiently monitor and control switching of power to such appliances. Such a system is shown schematically in block diagram form in FIG. 35 as power usage monitoring and control system 3500. System 3500 may include all of the features of system 1500.

Power usage and control system 3500 is the same as system 1500 in that it comprises the interface device 130 and the server 170 in communication over a network 160, optionally via a local wireless hub 132. However, system 3500 also has one or a plurality of control units 3530 installed in the same local domestic area as the interface device 130 and responsive to wired or wireless commands from the interface device 130 to control switching of power from a mains power supply 3605 (FIG. 36) to one or more appliances 3540. Additionally, the system 3500 may include a smart power metering device 3550 measuring total domestic power consumption independently of interface device 130 and equipped with a local wireless communication function such as a Zigbee enabled wireless connection to allow the interface device 130 to determine the applicable energy tariff at a given time and to check the measured total domestic power consumption.

Figure 36:
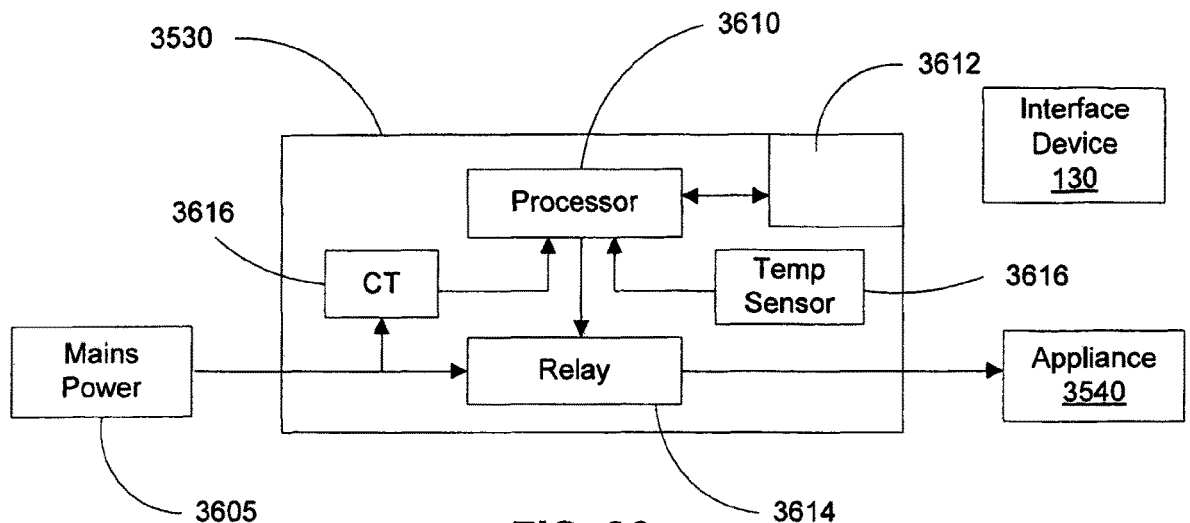
FIG. 36 is a block diagram showing a control unit of the system of FIG. 35 in more detail.

FIG. 36 shows the control unit 3530 in more detail. Each control unit 3530 is like a cut-down (reduced functionality) version of the interface device 130, without any GPRS capability, without a back-up power supply (i.e. no battery, since it can draw power from the mains power supply 3605) and without much data storage capacity. The control unit 3530 has only enough memory to store code to allow it to execute the sensing, switching and communication functions described herein.

Each control unit 3530 has a processor 3610, a communication module 3612, a relay (or other switching device) 3614, preferably a current sensor 3616 (in the form of a current transformer, for example) and optionally a temperature sensor 3618. The control unit 3530 is configured to activate the relay to turn mains power on or off to the appliance 3540, responsive to control commands received from the interface device 130 via the communications module 3612.

Additionally, system 3500 has an adaptive learning function hosted by the server 170 and applied to control of appliances 3540. This function is provided by server-side user interface features made available to authorised users over network 160 through a control interface (FIG. 35), such as client device 165. The control interface may be provided by a combination of a browser application 169 on a client device 165 with the server-side user interface features. The control interface enables the interface device 130 hardware and the server 170 software to cooperate to allow a user to change the configuration and behaviour of household appliances based on the user's goals and preferences with regards to power consumption and lifestyle.

By gathering power usage data and other monitored data or conditions using the interface device 130 and storing it in data store 180 via the server 170, system 3500 learns and generates profiles from the relevant user's power and appliance usage and behaviour. The interface device 130 is configured to measure inputs and outputs over a period of time and then control, switch and optimise the savings and/or utilisation of power within a household. The interface device 130 in combination with the server 170 provides the ability to learn a user's behaviour and to then switch on or off appliances 3540 local to the interface device, which is an advantageous feature of the system 3500.

To provide the described configuration and control functionality, the server 170 comprises an adaptive learning module that has a user interface extension for authorised users, so that such users can set environmental and/or economic goals, such as setting a financial budget for expenditure within the user's household. By installing multiple control units 3530 (and logically discovering them to the interface device 130 via a suitable device discovery process initiated automatically by interface device 130 or by a user via the control interface), each interposed between the mains power supply 3605 and the input power cable or port of the appliance, authorised users can configure rooms and devices within areas of the household, such as air conditioning, heating or washing and laundry. The user can then use the control interface to set a budget for power consumption and expenditure for each of those respective areas and devices.

The system 3500 can then proactively manage power consumption and shut down power to certain areas. For example, system 3500 may be configured to allow operation of some appliances only within a period determined by the system to correspond with a low tariff (off-peak) energy pricing period. In another example, the system can be configured to shut off some appliances when others are on or off (but after a suitable time hysteresis), such as when lights may be off in a house at night and the air conditioning unit remains on. System 3500 can also be configured to choose the most energy efficient and cost efficient means of performing a task for the user. For example, system 3500 may be configured to use off peak power at night time to run an energy-consuming process such as running a washing machine, dishwasher or clothes dryer.

In another example, system 3500 may be configured to select an appropriate source of energy for the appliances from available sources. For example, in an environment where a battery backed solar system is available, system 3500 may select to run appliances on energy from grid or mains power supply 3605 and charge the batteries when the tariff is at its lowest and may select to use energy from the storage batteries when the tariff exceeds a threshold value. In one embodiment, if a storage capacity of the batteries is full, energy may be diverted back to the grid or may be employed to run non essential appliances and/or run heaters or coolers to pre-heat/cool an environment based on user preference and usage pattern. For example, system 3500 may be configured to communicate or interface directly or indirectly with energy meters and/or solar system and may employ historical learning data relating to usage patterns in a given environment to determine an appropriate action.

Referring now to FIGS. 37 to 40, an example control methodology of the interface device 130 is described. A main program loop 3700 executed by the interface device 130 is first described with reference to FIG. 37. Using the control interface to interact with the server 170, adaptive control can be set by an authorised user for any appliances 3540 logically (communicatively) connected to the interface device 130. Once the user has configured an appliance to be controlled by the interface device 130 at 3710 (by installing a control unit 3530 at the mains power supply to the appliance and causing or allowing the control unit to be discovered by the interface device 130), the program main loop 3700 executed by the interface device 130 checks at 3720 whether any adaptive control flags are set in the memory of the interface device 130. If yes, then one or more automated control functions are called from the main loop 3700, depending on the type of adaptive control flags that are set in the interface device 130.

Each connected appliance 3540 can be set to be automatically controlled by adaptive learning in one or more categories. Examples of control categories may include utility control (e.g. for utility appliances, such as washers, dryers, water heaters, pumps, etc.), temperature control (e.g. for heaters and/or coolers), energy saving control and (user configurable) custom control.

Figure 38:
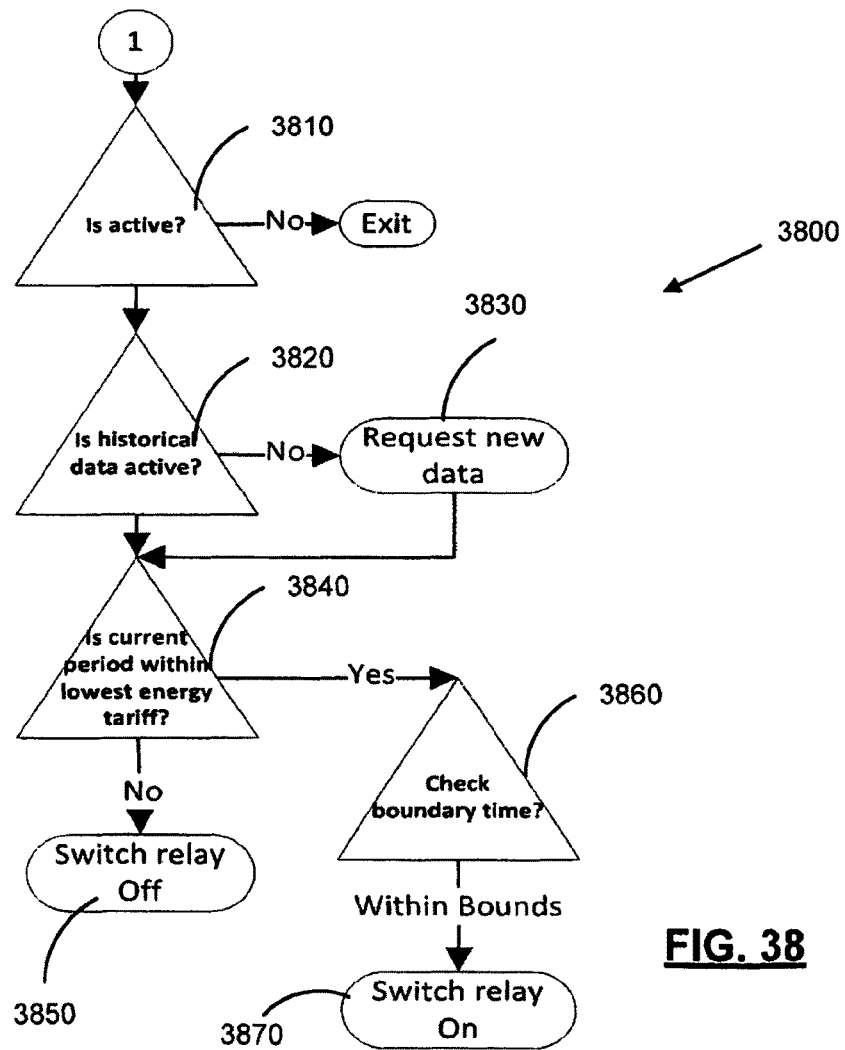
FIG. 38 is a flowchart of a utility control process.
Figure 37:
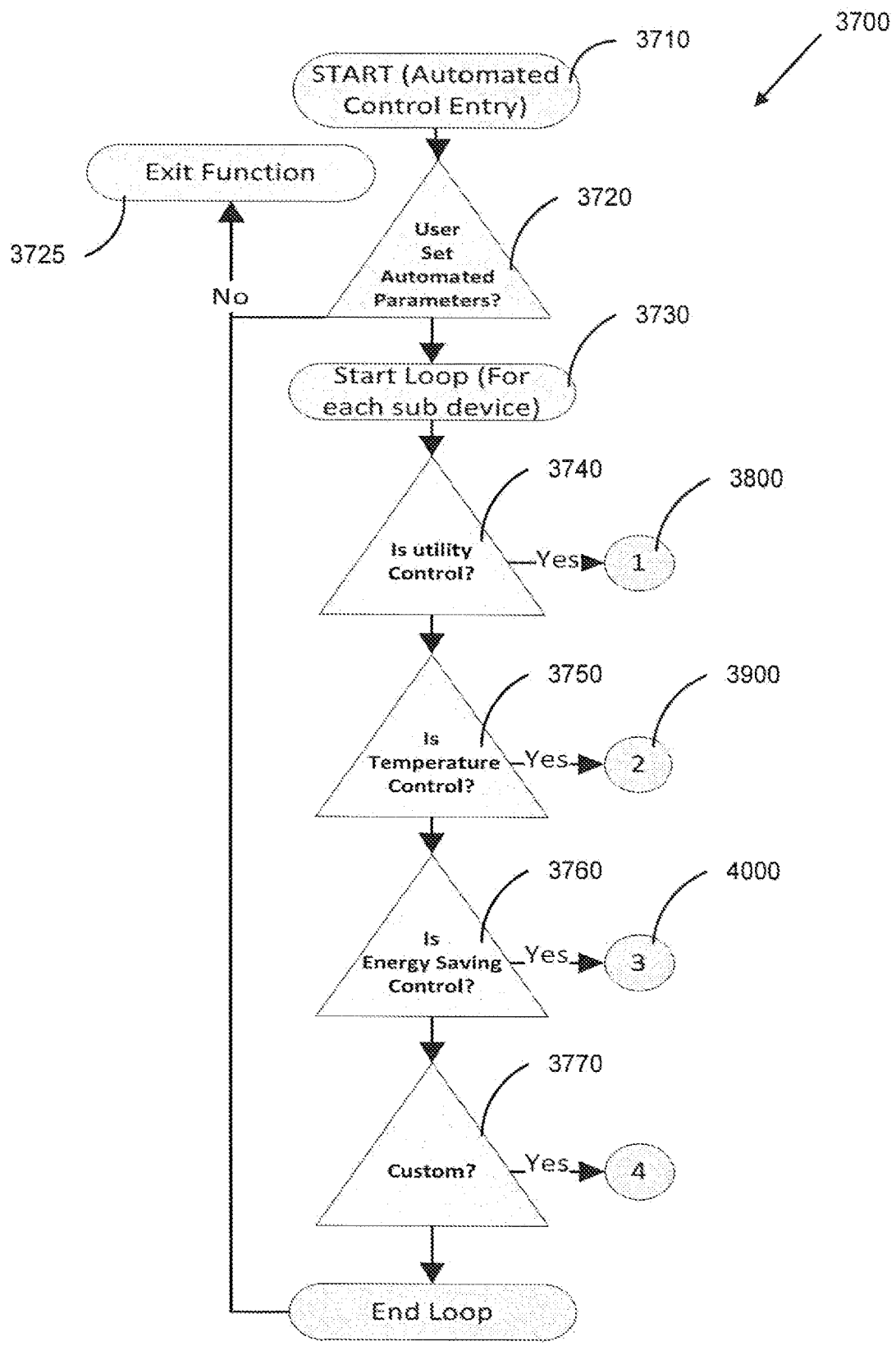
FIG. 37 is a flowchart of a main loop of an adaptive control process.
Figure 39:
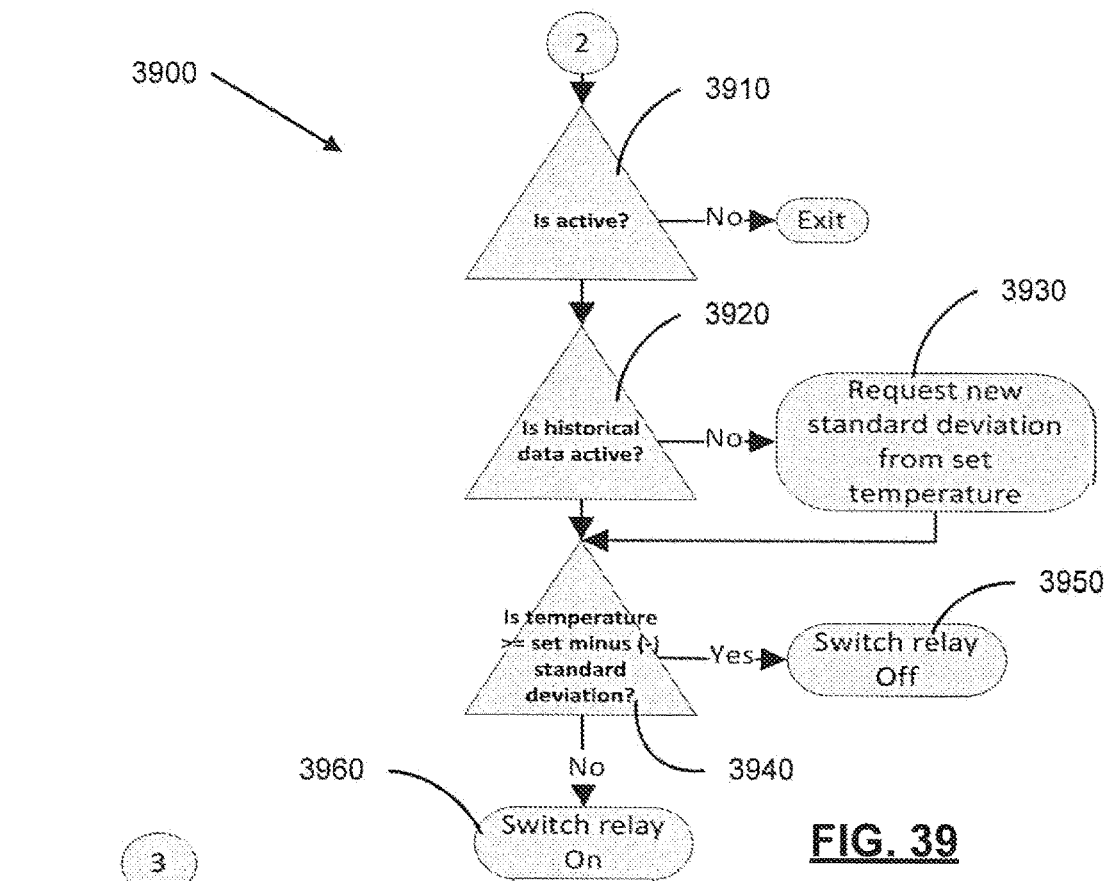
FIG. 39 is a flowchart of a temperature control process.
Figure 40:
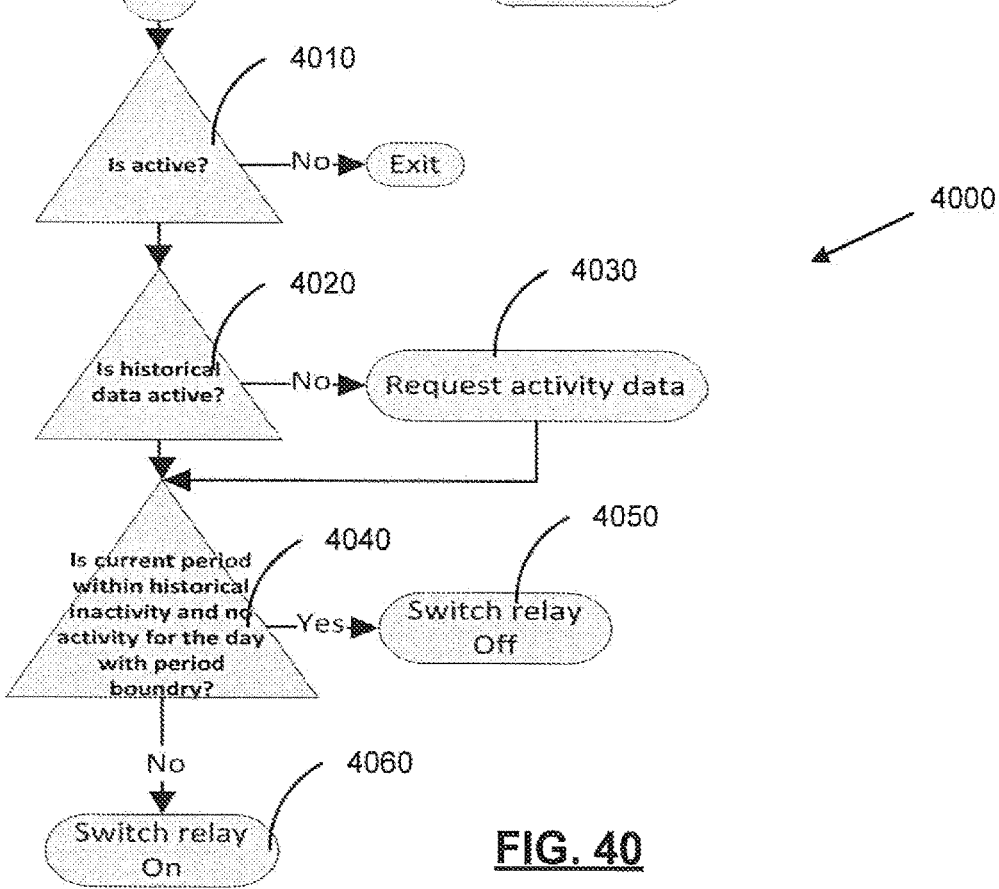
FIG. 40 is a flowchart of an energy saving process.

At 3730, the interface device 130 loops through steps 3740, 3750, 3760 and 3770 for each connected appliance and checks for the control category or categories stored in interface device 130 for each such appliance and then executes each applicable control function. At 3740, the interface device determines whether a utility control has been set and, if so, performs control process 3800 (FIG. 38). At 3750, the interface device determines whether a temperature control has been set and, if so, performs control process 3900 (FIG. 39). At 3760, the interface device determines whether an energy saving control has been set and, if so, performs control process 4000 (FIG. 40). At 3770, the interface device determines whether a custom control has been set and, if so, performs a pre-configured and stored control process.

In order for the interface device 130 to perform (adaptive) control based on the measurements it has taken over time and sent off to the server 170 for logging, the historical data is provided back to the interface device 130 from the server 170 and is cached on the interface device 130 in a suitable memory. In this context, "historical data" may include a sequence of values relating to data logged with the server 170 over time and/or it may comprise one or more values derived or calculated from such logged data. Such derived or calculated values may include, for example, an average value, a standard deviation value and/or a standard deviation value calculated relative to a set-point, such as a temperature set-point. Caching of the historical data at the interface device 130 is performed in order to avoid storing that data at the (computationally relatively weak) interface device 130 and to reduce network traffic and improve execution efficiency.

Any historical data downloaded from the server 170 has an active period specified for it, such that data that is outside its active period is considered to be not sufficiently current for use and is to be discarded or ignored. For each control category, the interface device 130 checks if the historical data is active. In other words, historical data cached on the interface device 130 has a shelf life set when the data is downloaded from the server 170. If this shelf life (active period) has expired when the control category is invoked at 3800, 3900 or 4000, updated historical data is requested from the server 170.

Referring also to FIG. 38, utility control process 3800 is described. Utilities such as pool pumps, washing machines and dryers can be controlled in this process. If this process is determined to be active at 3810, the interface device 130 checks at 3820 whether the historical data is active and if not, requests updated historical data from the server 170 at 3830. At 3840, the interface device 130 checks whether the current period has the lowest energy tariff applied. If yes, and the boundary time is determined at 3860 to be adequate to allow the desired operation of the appliance (e.g. 1 hour to finish a wash cycle), the respective relay 3614 is turned on at 3870, which in turn will power the connected appliance 3540. Otherwise, the relay 3614 is switched off at 3850 by a signal from interface device 130 to processor 3610, which provides a suitable control signal to relay 3614. End users can set the boundary parameters such as number of hours etc.

Referring also to FIG. 39, temperature control process 3900 is described. Utilities such as water heaters 1555, coolers and air conditioners can be controlled in this process. If this process is determined to be active at 3910, the interface device checks at 3920 whether the historical data (which may be or include a standard deviation value calculated based on the temperature set-point for the particular temperature control device) is active and if not, requests updated historical and/or standard deviation data from the server 170 at 3830. The interface device 130 checks at 3940 whether the current temperature is greater than or equal to the set temperature minus (−) the standard deviation from the set temperature, assuming the appliance is a heating device. Otherwise, the test is whether the current temperature is less than or equal to the set temperature plus a standard deviation value. If yes, the respective relay 3614 is turned off at 3950 by a signal from interface device 130 to processor 3610, which provides a suitable control signal to relay 3614 to turn power to the appliance off.

The standard deviation used in process 3900 is calculated on the server 170 and is downloaded and cached on the interface device 130 when the previous cached standard deviation and/or historical data expires. In some embodiments, a predetermined or pre-configured proportion (e.g. 1.1 or 0.8) of the standard deviation may be provided as the threshold value for step 3940. Use of a standard deviation instead of a set threshold or a percentage amount advantageously allows for seasonal variations in ambient temperature. The standard deviation is calculated as follows:

$$S = \sqrt{\frac{\Sigma(x-T)^2}{n-1}}$$

S: Standard Deviation
X: Temperature readings
T: Set temperature
n: Number of readings Referring also to FIG. 40, energy saving control process 4000 is described. During normal operation, the interface device 130 collects and transmits to the server 170 data collected from all connected control units 3530 periodically every 5 minutes (or any other pre-set period) to the server. If the energy saving process is determined to be active at 4010, the interface device 130 checks at 4020 whether the historical data is active and if not, requests updated historical data from the server 170 at 4030. The server 170 may determine periods of inactivity (observed as prolonged periods of low power usage, for example) from historical data every 24 hours, for example. When the interface device 130 makes an historical data request to server 170, this data is downloaded and cached on the interface device 130. If the energy saving control is determined at 4010 to be active for a connected appliance 3540, the interface device 130 checks at 4040 whether the current time period falls within the historically observed period of inactivity at the household. If this is true and there has been no activity thus far within that period for the current day, then at 4050 the respective relay is turned off. Otherwise, the relay 3614 is switched on at 4060.

Example: If the historical data suggests that no water is drawn from the water heater 1555 from 10:00 AM-4:00 PM, the water heater 1555 can be turned off during that period. This will save power and also increase the life of the water heater 1555.

When ZigBee or other local 802.11 standard local area network or personal area network communication protocols are widely used in household/commercial utilities, this function can be extended to directly communicate control commands from the interface device 130 to the appliances 3540, rather than requiring the interposition of the control unit 3530 for switching the relay 3614.

Figure 41:
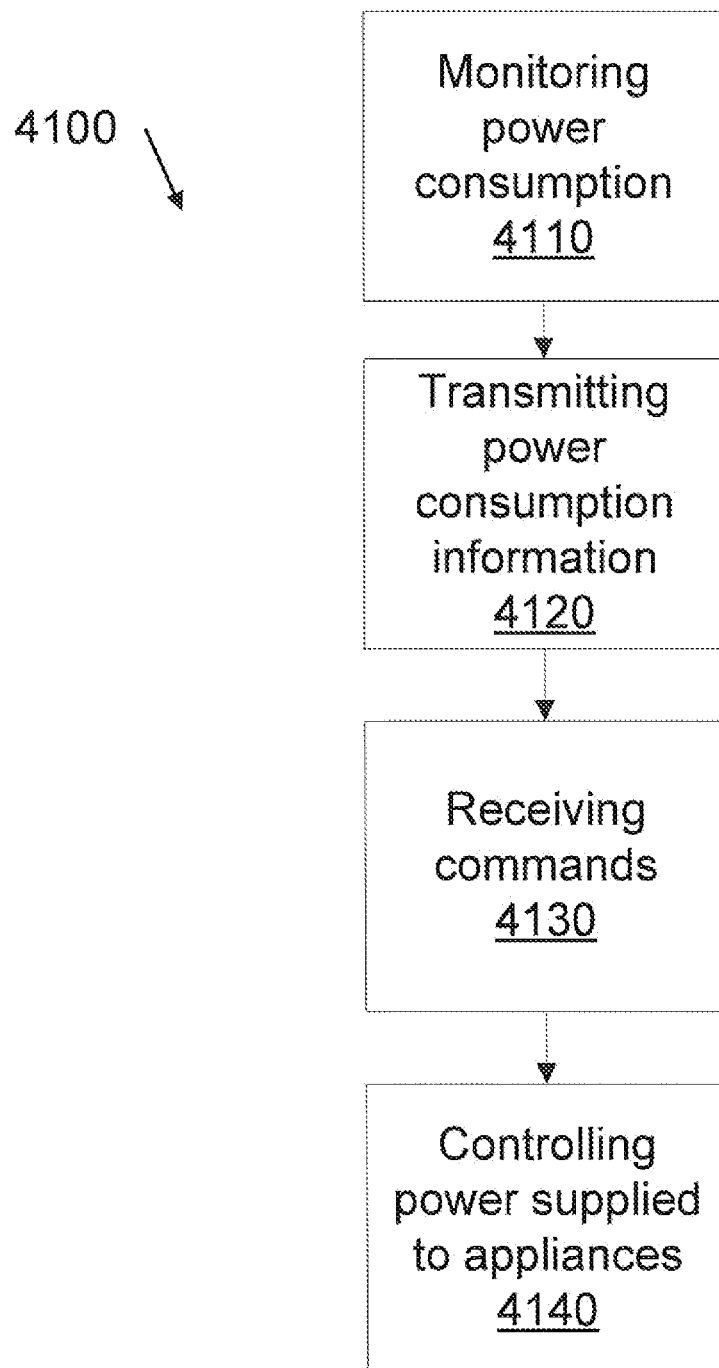
FIG. 41 is a flowchart of a process for controlling power supplied to at least one appliance performed by the interface device of FIG. 1.

FIG. 41 shows a process 4100 for controlling power supplied to at least one appliance performed by interface device 130. At step 4110, interface device 130 monitors the power consumption of the at least one appliance. This may be through receiving power consumption data from at least one electronic control unit 3530, where control unit 3530 is in communication with the interface device 130. Control unit 3530 may have a current sensor to monitor current drawn by the at least one appliance when power to the at least one appliance is switched on. Interface device 130 may monitor power consumption of the at least one appliance by receiving monitored current data from control unit 3530. At step 4120, interface device 130 transmits power consumption information relating to the power consumption of the at least one appliance to the server system 170. At step 4130, interface device 130 may receive one or more commands from server system 170. At step 4140, interface device 130 may control power to the at least one appliance based on the one or more commands received at step 4130. This may include sending one or more control commands to control unit 3530, where control unit 3530 may be arranged to control the power supplied (e.g. using relay 3614 to switch power on or off) to the at least one appliance 3540 in response to the one or more control commands.

Figure 42:
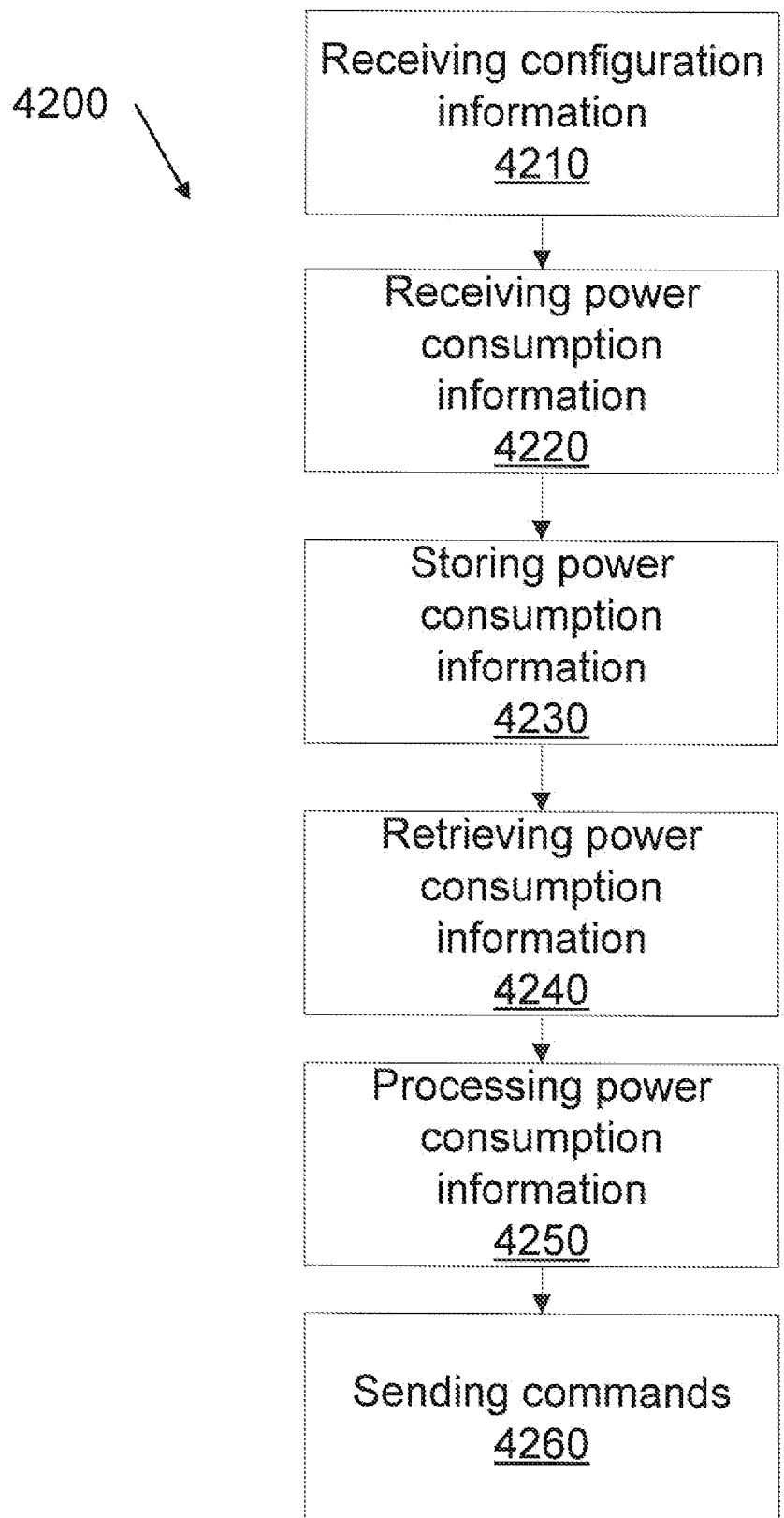
FIG. 42 is a flowchart of a process for controlling power supplied to at least one appliance performed by the server system of FIG. 1.

FIG. 42 shows a process 4200 for controlling power supplied to at least one appliance performed by server system 170. At step 4210, server system 170 receives configuration information. This information may be received from a client device executing a client interface module to enable user input to be received at the client device and forwarded to the server system 170. The configuration information may include information relating to the configuration of monitoring and control functions of interface device 130.

At step 4220, server system 170 receives appliance power consumption information relating to the at least one appliance from interface device 130. At step 4230, server system 170 stores the information in a relevant use or customer record in data store 180. At step 4240, server system 170 may retrieve the power consumption information from data store 180. At step 4250, server system 170 may process the power consumption information and the configuration information to generate one or more commands. At step 4260, server system 4260 may send the one or more commands to interface device 130 to cause interface device 130 to control power to the at least one appliance. Interface device 130 may send one or more control commands to control unit 3530, and control unit 3530 may be arranged to control power to the at least one appliance in response to the one or more control commands It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

The invention claimed is:

1. A system for monitoring and control of at least one appliance, the system comprising:
   an electronic interface device geographically co-located with and configured to monitor power consumption of the at least one appliance and to control supply of power to the at least one appliance;
   a computer server system installed remotely from the electronic interface device and in wireless communication with the electronic interface device, the computer server system adapted to periodically receive power consumption data from the electronic interface device and to transmit to the electronic interface device at least one of data and commands; wherein the computer server system is configured to access a data store to store and retrieve at least historical power consumption data of the at least one appliance received from the electronic interface device;
   the data store accessible to the computer server system to store and provide historical power usage data based on power usage data periodically received from the interface device, wherein the computer server system is configured to calculate statistical data from the historical power usage data and to transmit at least some of the calculated statistical data to the interface device in response to a request received from the interface device; and
   wherein the electronic interface device further comprises an adaptive learning module configured to generate commands for the interface device to control power to the at least one appliance based on configuration information and historical power consumption data, the historical power consumption data being valid for an active period and downloaded from the data store and the computer server system to be cached in the electronic interface device on request of the electronic interface device.

2. The system of claim 1, wherein the at least some statistical data comprises a standard deviation about an appliance set point.

3. The system of claim 1, wherein the computer server system comprises a client interface module to allow a user to interact with the computer server system via a client device that is in communication with the computer server system, wherein the computer server system is configured to allow, via the client interface module, configuration of monitoring and control functions of the interface device.

4. The system of claim 1, wherein the server system hosts the adaptive learning module.

5. The system of claim 1, wherein the configuration information is received by the adaptive learning module from a client device.

6. The system of claim 1, wherein the computer server system comprises a client interface module to allow a user to interact with the computer server system via a client device that is in communication with the computer server system, wherein the computer server system receives the configuration information via the client interface module, the configuration information comprising information relating to the configuration of monitoring and control functions of the interface device.

7. The system of claim 1, further comprising at least one electronic control unit in communication with the electronic interface device and arranged to control power to the at least one appliance.

8. The system of claim 7, wherein the at least one electronic control unit is in wireless communication with the interface device using a local area communication protocol.

9. The system of claim 7, wherein the at least one electronic control unit comprises a current sensor to monitor current drawn by the at least one appliance when power to the at least one appliance is switched on, wherein the electronic control unit is configured to communicate monitored current data to the interface device.

10. The system of claim 1, wherein the at least some statistical data comprises a standard deviation about an appliance set point.

11. The system of claim 1, wherein the computer server system executes a state machine to establish and hold a data connection with the electronic interface device.

12. The system of claim 1, wherein the computer server system establishes a data connection with the electronic interface device to transmit and receive the data and commands, and holds the data connection open between transmissions.

13. A method of controlling power supplied to at least one appliance, the method comprising the steps of:
providing at least one interface device geographically co-located with the at least one appliance and monitoring power consumption of the at least one appliance;
the at least one interface device transmitting power consumption information relating to the power consumption of the at least one appliance to a server system;
the at least one interface device receiving commands from the server system;
the at least one interface device controlling power to the at least one appliance based on the received commands;
the server system accessing a data store to store and retrieve historical power usage data based on power usage data periodically received from the at least one interface device; and
an adaptive learning module of the at least one interface device generating commands for the at least one interface device to control power to the at least one appliance based on configuration information and the historical power usage data, the historical power usage data being valid for an active period and downloaded from the data store and server system to be cached in the at least one interface device on request of the at least one interface device, wherein an at least one electronic control unit comprises a current sensor to monitor current drawn by the at least one appliance when power to the at least one appliance is switched on, and wherein the step of monitoring power consumption of the at least one appliance comprises the at least one interface device receiving monitored current data from the at least one electronic control unit.

14. The method of claim 13, wherein the step of monitoring the power consumption comprises receiving power consumption data from the at least one electronic control unit in communication with both the at least one appliance and the at least one interface device.

15. The method of claim 14, wherein the step of controlling the power comprises sending one or more control commands to the at least one electronic control unit, the electronic control unit being arranged to control power to the at least one appliance in response to the one or more control commands.

16. The method of claim 15, wherein the configuration information is received from a client device via a client interface module, the configuration information comprising information relating to the configuration of monitoring and control functions of the interface device.

17. The method of claim 13, further comprising the server system executing a state machine to establish and hold a data connection with the interface device.

18. The method of claim 13, further comprising the server system establishing a data connection with the interface device to transmit and receive the data and commands, and holding the data connection open between transmissions.

* * * * *